United States Patent
Vermeulen et al.

(10) Patent No.: US 9,799,017 B1
(45) Date of Patent: Oct. 24, 2017

(54) CROSS-DATA-STORE OPERATIONS IN LOG-COORDINATED STORAGE SYSTEMS

(71) Applicant: Amazon Technologies, Inc., Reno, NV (US)

(72) Inventors: Allan Henry Vermeulen, Corvallis, OR (US); Omer Ahmed Zaki, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 496 days.

(21) Appl. No.: 14/491,454

(22) Filed: Sep. 19, 2014

(51) Int. Cl.
  G06Q 20/14 (2012.01)
  G06F 17/30 (2006.01)

(52) U.S. Cl.
  CPC ..... *G06Q 20/145* (2013.01); *G06F 17/30598* (2013.01)

(58) Field of Classification Search
  None
  See application file for complete search history.

(56) References Cited

U.S. PATENT DOCUMENTS

| | | | |
|---|---|---|---|
| 7,668,876 B1 | 2/2010 | Kulkarni | |
| 7,730,034 B1 | 6/2010 | Deflaux et al. | |
| 7,949,662 B2 | 5/2011 | Farber et al. | |
| 8,019,849 B1 | 9/2011 | Lopilato et al. | |
| 8,078,582 B2 | 12/2011 | Wang et al. | |
| 8,108,343 B2 | 1/2012 | Wang et al. | |
| 8,510,270 B2 | 8/2013 | Pareek et al. | |
| 8,548,945 B2 | 10/2013 | Dwyer et al. | |
| 8,650,155 B2 | 2/2014 | Corbin et al. | |
| 8,676,752 B2 | 3/2014 | Kundu et al. | |
| 2007/0162516 A1 | 7/2007 | Thiel et al. | |
| 2012/0166407 A1 | 6/2012 | Lee et al. | |

OTHER PUBLICATIONS

International Search Report and Written Opinion, Date of mailing Dec. 7, 2015, Amazon Technologies, Inc., pp. 1-11.
U.S. Appl. No. 14/537,788, filed Nov. 10, 2014, Lei Ye.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/753,475, filed Jun. 29, 2015, Allan Henry Vermeulen, et al.

(Continued)

*Primary Examiner* — Ryan Zeender
*Assistant Examiner* — Denisse Ortiz Roman
(74) *Attorney, Agent, or Firm* — Robert C. Kowert; Meyertons, Hood, Kivlin, Kowert & Goetzel, P.C.

(57) ABSTRACT

Data stores that are to be configured as members of a storage group on behalf of a client are identified. The client indicates one or more types of cross-data-store operations to be performed. A transaction manager that makes acceptance decisions for write requests directed to the members based at least partly on contents of a log is instantiated, and respective write transformers are set up for at least some of the types of cross-data-store operations. During a particular time period, the workload at the storage group is monitored, and the number and types of cross-data-store operations is determined. The results of the monitoring are used to determine a billing amount for the client based on a selected pricing policy.

21 Claims, 52 Drawing Sheets

(56) References Cited

OTHER PUBLICATIONS

U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
Invitation to Pay Additional Fees for PCT/US2015/049470, Dated of mailing Dec. 1, 2015, Amazon Technologies, Inc., pp. 1-10.
Ozgur Ulusoy, "Processing Real-Time Transactions in a Replicated Database System", Distributed and Parallel Datebases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.
U.S. Appl. No. 14/316,674, filed Jun. 26, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/136,645, filed Dec. 20, 2014, Marvin Michael Theimer.
U.S. Appl. No. 14/231,077, filed Mar. 31, 2014, Jacob A. Strauss.
U.S. Appl. No. 14/230,378, filed Mar. 31, 2014, Jacob A. Strauss.
"ChainReaction: a Causal + Consistent Datastore based on Chain Replication" Sergio Almeida, et al., Apr. 15-17, 2013, pp. 85-98.
"Chain Replication in Theory and in Practice", Scott Lystig Fritchie, Sep. 30, 2010, pp. 1-11.
"Chain Replication for Supporting High Throughput and Availability", Robbert van Renesse, Fred B. Schneider, 2004, pp. 91-104.
U.S. Appl. No. 14/482,668, filed Sep. 10, 2014, Allan Henry Vermeulen.
U.S. Appl. No. 14/482,661, filed Sep. 10, 2014, Allan Henry Vermeulen.

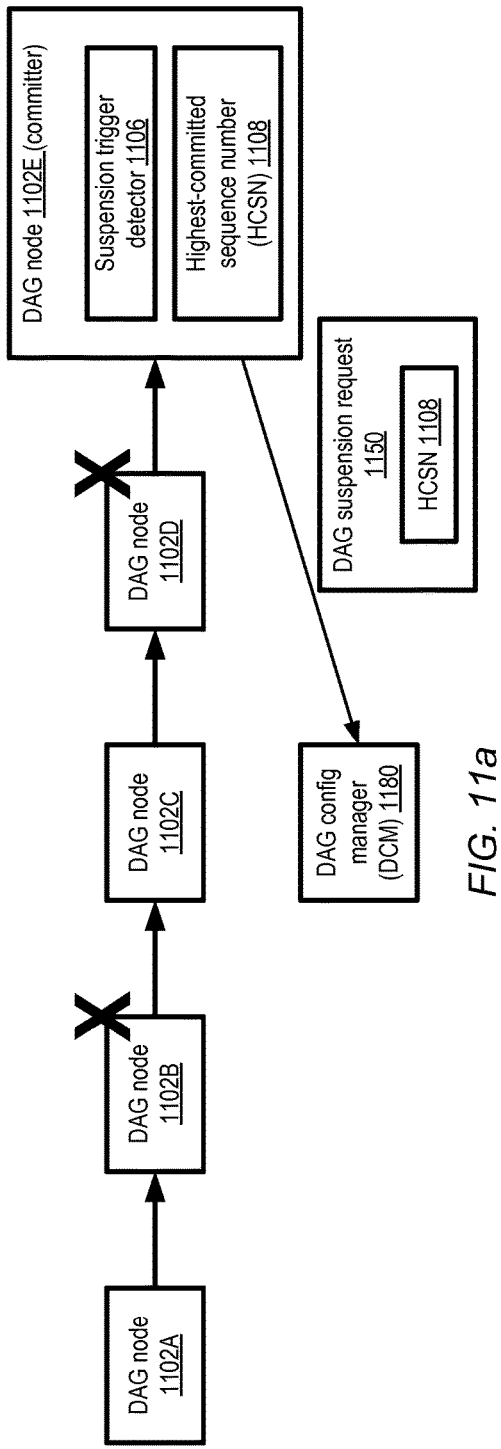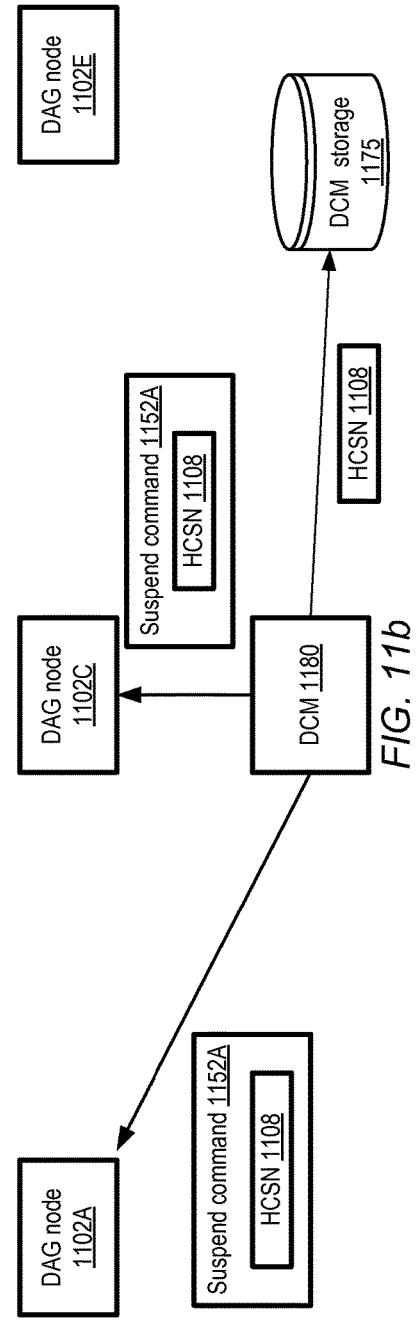

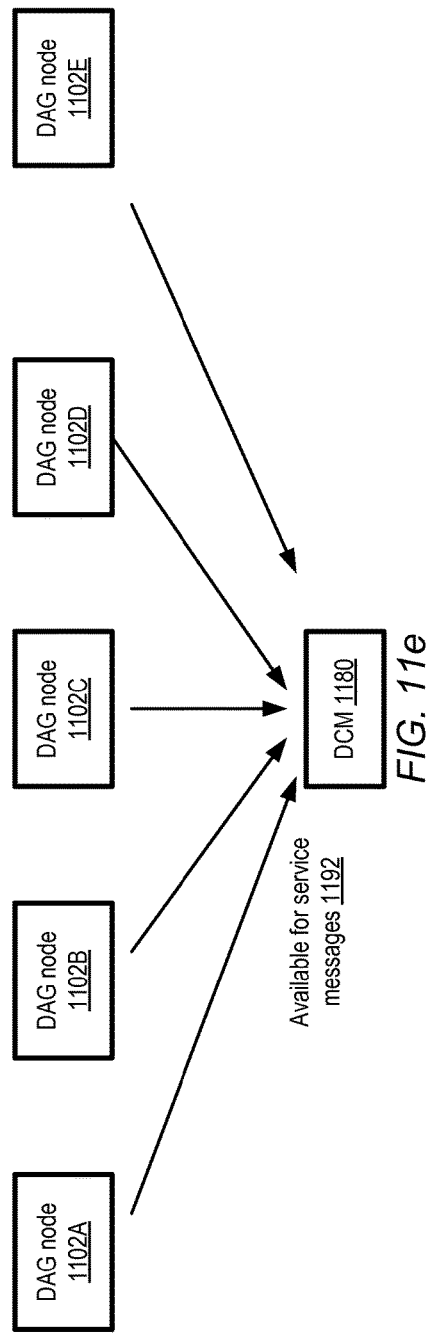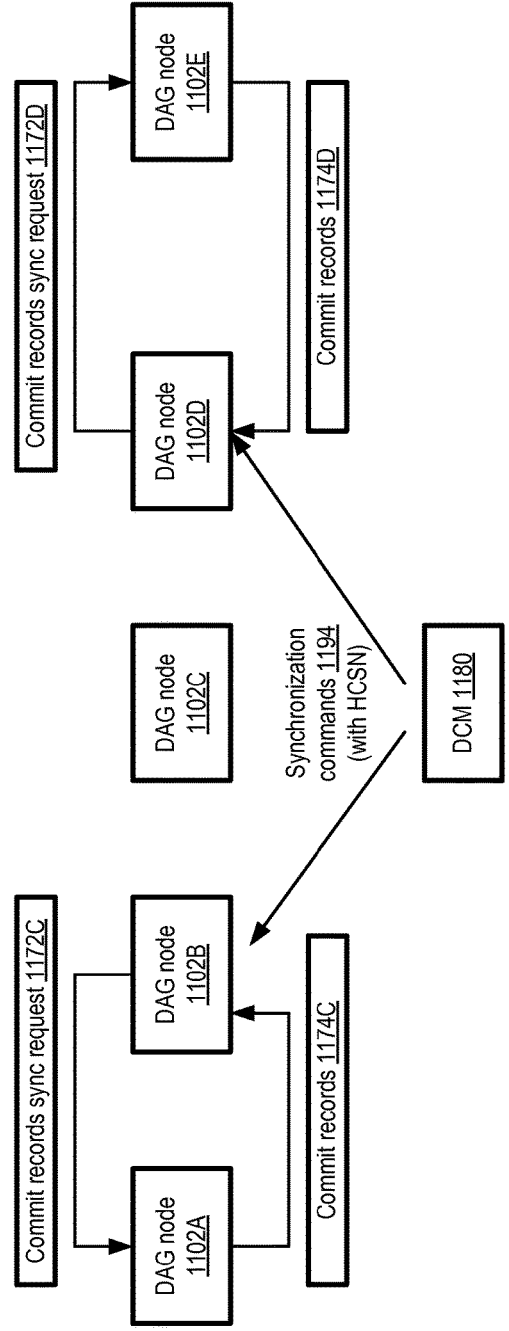

2901 https://<some-web-site>.com/LCSGpricing

Dear <userName>,

2904

The cost of using a log-coordinated storage group will vary with the number and types of data stores of the group, the rates and types of your transaction requests, and the total bandwidth used for the group. We also support two modes of resource allocation: best-effort (in which the resources may be selected from shared pools) and provisioned (in which resources will be reserved for your storage group). Please indicate the preferences for your storage group below. The approximate billing amount per month based on your preferences is shown .

| | |
|---|---|
| Number of NoSQL DB instances | 1 (default) |
| Number of Relational DB instances | 1 (default) |
| Number of in-memory DB instances | 1 (default) |
| Click here to add additional data stores | 0 (default) |

2907

| | |
|---|---|
| Preferred resource allocation mode (all data stores); click here to specify data-store-specific modes | Provisioned throughput (default) |

2910

| | |
|---|---|
| Expected single-data-store NoSQL DB writes/sec | 0-1000 (default) |
| Expected single-data-store Relational DB writes/sec | 0-1000 (default) |
| Expected single-data-store in-memory DB writes/sec | 0-1000 (default) |

2913

| | |
|---|---|
| Expected cross-data-store writes/sec (NoSQL → in-memory); click here to add other types of cross-data-store writes | 0-100 (default) |

2916

| | |
|---|---|
| Expected total network bandwidth usage/day | <20GB (default) |

2919

| | |
|---|---|
| Click here to indicate custom preferences for latency, data durability or availability, which can also affect the cost | |

2922

| | |
|---|---|
| Approximate monthly billing amount | US$ A.bb |

CROSS-DATA-STORE OPERATIONS IN LOG-COORDINATED STORAGE SYSTEMS

BACKGROUND

In recent years, more and more computing applications are being implemented in distributed environments. A given distributed application may, for example, utilize numerous physical and/or virtualized servers spread among several data centers of a provider network, and may serve customers in many different countries. As the number of servers involved in a given application increases, and/or as the complexity of the application's network increases, failure events of various types (such as the apparent or real failures of processes or servers, substantial delays in network message latency, or loss of connectivity between pairs of servers) are inevitably encountered at higher rates. The designers of the distributed applications are therefore faced with the problem of attempting to maintain high levels of application performance (e.g., high throughputs and low response times for application requests) while concurrently responding to changes in the application configuration state.

Some traditional techniques for managing state information may involve locking the state information to implement application state changes in a consistent manner. Unfortunately, the locking mechanisms used for application state and/or data can themselves often become performance bottlenecks as the application increases in size and complexity. Other techniques may avoid locking, but may have to pause normal operations to propagate changed state information among the application's components. Such "stop-the-world" periods may be problematic, however, especially for latency-sensitive applications that are used for mission-critical workloads by hundreds or thousands of customers spread in different time zones across the world. Even some techniques that avoid locks and stop-the-world pauses may run into bottlenecks when handling very high rates of state transitions.

BRIEF DESCRIPTION OF DRAWINGS

FIG. 11a-11h collectively illustrate an example sequence of operations that may be performed at a replication DAG during a coordinated suspension procedure, according to at least some embodiments.

FIG. 29 illustrates an example web-based interface that may be used to indicate pricing policy options to a user of a service implementing log-coordinated storage groups, according to at least some embodiments.

Figure 1:
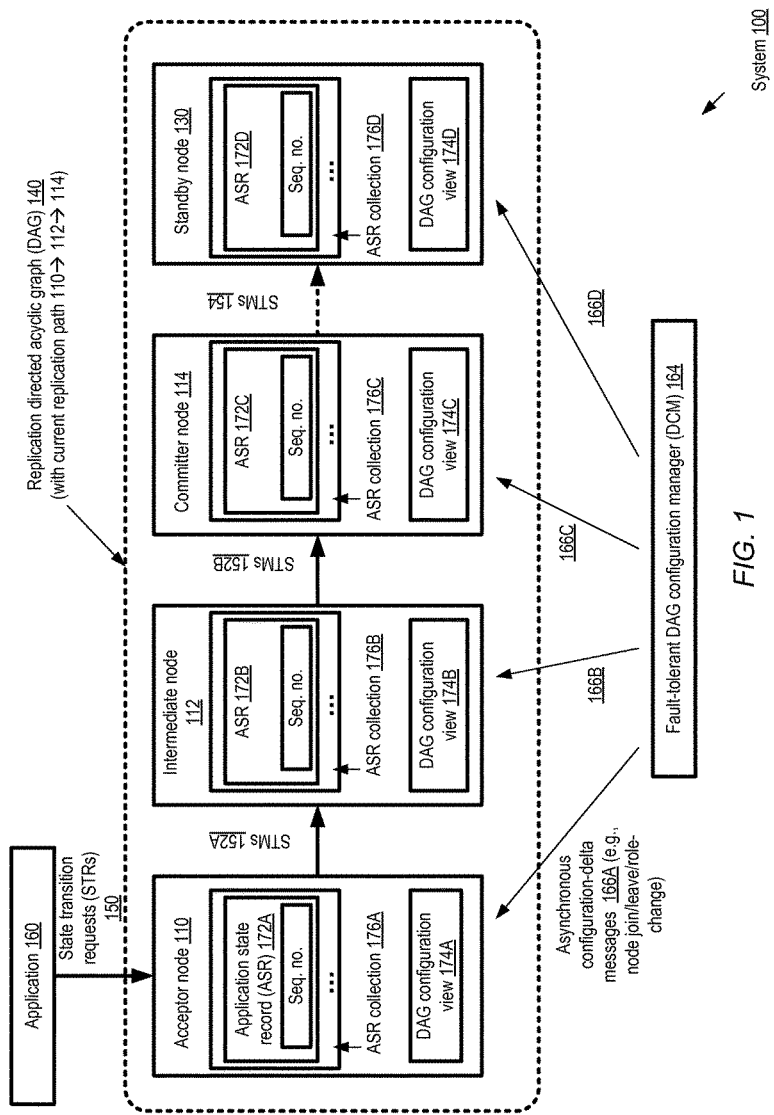
FIG. 1 illustrates an example system environment in which a dynamic DAG (directed acyclic graph) of replication nodes is established for managing application state changes, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing distributed application state using replication nodes organized as a graph, and of deploying such graphs to implement a logging service that can be used for transaction management, are described. According to some embodiments, a replicated state machine for building a fault-tolerant distributed application may be implemented using a plurality of replication nodes arranged in a directed acyclic graph (DAG). In some implementations, a particular replication DAG may include one or more acceptor nodes, one or more committer nodes, zero or more intermediary nodes each positioned along a replication pathway comprising DAG edges leading from an acceptor node to a committer node, and zero or more standby nodes that are configured to quickly take over responsibilities of one of the other types of nodes in the event of a node failure. Acceptor, intermediary and standby nodes of a replication DAG may collectively be referred to as "non-committer" nodes herein. "Acceptor", "intermediary", "committer", and "standby" may be referred to collectively as the set of roles that a DAG node may assume. In some embodiments, acceptor nodes may also be referred to as "head" nodes of the DAG, and committer nodes may also be referred to as "tail" nodes.

In general, in at least some embodiments, each node of a particular replication DAG may be responsible for replicating state information of at least a particular application, e.g., in the form of state transition records written to a local disk or other similar storage device. Application state information may be propagated along a set of edges from an acceptor node to a committer node of the DAG, referred to herein as a replication pathway or a commit pathway. Each state transition message propagated within the DAG may include a respective sequence number or a logical timestamp that is indicative of an order in which the corresponding state transition request was processed (e.g., at an acceptor node). Sequence numbers may be implemented using any of a variety of techniques in different embodiments—e.g., a simple N-bit counter maintained by an acceptor node may be used, or a monotonically increasing logical timestamp value (not necessarily related to a time-of-day clock) generated by an administrative component of the DAG such as the DAG's configuration manager may be used. When a particular state transition record reaches a committer node, e.g., after a sufficient number of replicas of the state transition record have been saved along a replication pathway, the transition may be explicitly or implicitly committed. The state of the application as of a point in time may be determined in some embodiments as a logical accumulation of the results of all the committed state transitions up to a selected sequence number. A configuration manager may be responsible for managing changes to DAG configuration (e.g. when nodes leave the DAG due to failures, or join/re-join the DAG) by propagating configuration-delta messages asynchronously to the DAG nodes as described below. In some embodiments, each replication node may implement a respective deterministic finite state machine, and the configuration manager may implement another deterministic finite state machine. The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for application state transition processing may work correctly even if some of the nodes along a replication pathway have a different view of the current DAG configuration than other nodes. It may thus be the case, in one simple example scenario, that one node A of a DAG continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of state transition nodes in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein.

Under most operating conditions, the techniques used for propagating DAG configuration change information may eventually result in a converged consistent view of the DAG's configuration at the various member nodes, while minimizing or eliminating any downtime associated with node failures/exits, node joins or node role changes. Formal mathematical proofs of the correctness of the state management protocols may be available for at least some embodiments. In at least some embodiments, the replication DAG's protocols may be especially effective in dealing with false-positive failure detections. For example, in the above example, node D may have been informed by the configuration manager that node C has failed, even though node C has not actually failed. Thus, state transitions may still be processed correctly by C (and by its neighbors B and D) for some time after the false positive failure detection, in the interval before the configuration-delta messages indicating C's exit are received at A, B and D, enabling the application whose state is being replicated to make progress despite the false-positive failure detection. Upon eventually being informed that it has been removed from the DAG, C may indicate to the configuration manager that it is in fact available for service, and may be allowed to re-join the DAG (e.g., as a standby node or in some other position along the modified replication pathway).

In some embodiments, an acceptor node may be responsible for receiving application state transition requests from a client of the replication DAG, determining whether a particular requested transition should be accepted for eventual commit, storing a local replica of an accepted state transition record, and transmitting accepted state transition records to a neighbor node along a replication pathway of the DAG towards a committer node. Depending on the use case, a state transition record may include a write payload in some embodiments: e.g., if the application state comprises the contents of a database, a state transition record may include the bytes that are written during a transaction corresponding to the state transition. The acceptor node may also be responsible in at least some embodiments for determining or generating the sequence number for an accepted state transition. An intermediary node may be responsible for storing a local replica of the accepted state transition record, and transmitting/forwarding a message indicating the accepted state transition to the next node along the pathway to a committer node. The committer node may store its own replica of the state transition record on local storage, e.g., with an indication that the record has been committed. A record indicating that a corresponding state transition has been committed may be referred to herein as a "commit record", while a record that indicates that a corresponding state transition has been accepted but has not yet necessarily been committed may be referred to as an "accept record". In some embodiments, and depending on the needs of the application, the committer node may initiate transmission of a commit response (e.g., via the acceptor node) to the client that requested the state transition. In at least one embodiment, the committer node may notify some or all of the nodes along the replication pathway that the state transition has been committed. In some embodiments, when an indication of a commit is received at a DAG node, the accept record for the now-committed state transition may be replaced by a corresponding commit record, or modified such that it now represents a commit record. In other embodiments, a given DAG node may store both an accept record and a commit record for the same state transition, e.g., with respective sequence numbers. In some implementations, separate commit record sets and accept record sets may be stored in local storage at various DAG nodes, while in other implementations, only one type of record (accept or commit) may be stored at a time for a given state transition at a given DAG node.

A configuration manager may be designated as the authoritative source of the DAG's configuration information in some embodiments, responsible for accepting changes to DAG configuration and propagating the changes to the DAG nodes. In at least some embodiments, the configuration manager may itself be designed to be resilient to failures, e.g., as a fault-tolerant cluster of nodes that collectively approve DAG configuration changes (such as removals or additions of nodes) via consensus and replicate the DAG configuration at a plurality of configuration manager storage devices. As implied by the name "configuration-delta", a message sent to a DAG node by the configuration manager may include only an indication of the specific change (e.g., a change caused by a node joining the DAG or leaving the DAG, or a change to a role/position of an existing node of the DAG), and need not include a representation of the DAG's configuration as a whole, or list the entire membership of the DAG. A given recipient of a configuration-delta message may thus be expected to construct its own view of the DAG configuration, based on the specific set or sequence of configuration-delta messages it has received thus far. In some implementations, sequence numbers may also be assigned to configuration-delta messages, e.g., to enable a recipient of a configuration-delta message to determine whether it has missed any earlier configuration-delta messages. Since the configuration manager may not attempt to guarantee the order or relative timing of receiving the configuration-delta messages by different DAG nodes, the current views of the DAG's configuration may differ at different nodes in some embodiments, at least for some periods of time as indicated by the example above.

According to one embodiment, the actions taken by DAG nodes in response to configuration-delta messages may differ based on whether the configuration change affects an immediate neighbor of the recipient. Consider another example scenario in which a DAG comprises an acceptor node A, an intermediary node B, and a committer node C at a point of time T0, with the initial replication pathway A-to-B-to-C. At a time T1, the DAG's configuration manager DCM1 becomes aware that B has left the DAG, e.g., as a result of an apparent failure or loss of connectivity. DCM1 may send respective asynchronous configuration-delta messages D1 and D2 respectively to remaining nodes A and C, without requesting any pause in state transition request processing. If C receives D2 at time T2, before A receives D1 at time T3, A may continue sending state transition messages directed to B for some time interval (T3-T2) (although, if N has in fact failed, the messages send by A may not be processed by B). Similarly, if A receives D1 at T2, before C receives D2 at T3, C may continue to process messages it receives from B that were in flight when B failed, for some time (T3-T2) before C becomes aware of B's departure from the DAG. When node A receives D1, if it has not yet been contacted by C, node A may establish connectivity to C as its new immediate successor in the newly-configured replication pathway (A-to-C) that replaces the older replication pathway (A-to-B-to-C). Similarly, when C receives D2, it may establish connectivity to A (if A has not already contacted C) as its new immediate predecessor, and at least in some embodiments, C may submit a request to A for re-transmissions of state transition records that may have been transmitted from A to B but have not yet reached C. For example, C may include, within the re-transmission request, the highest sequence number HSN1 of a state transition record that it has received thus far, enabling A to re-transmit any state transition records with sequence numbers higher than HSN1.

In at least some embodiments, the configuration manager may rely on a health detection mechanism or service to indicate when a DAG node has apparently become unhealthy, leading to a removal of the apparently-unhealthy node from the DAG configuration. At least some health detection mechanisms in distributed environments may depend on heartbeats or other lower-level mechanisms which may not always make the right decisions regarding node health status. At the same time, the configuration manager may not be in a position to wait indefinitely to confirm actual node failure before sending its configuration-delta messages; instead, it may transmit the configuration-delta messages upon determining that the likelihood of the node failure is above some threshold (e.g., 80% or 90%), or use some other heuristics to trigger the DAG configuration changes and corresponding delta messages. As mentioned earlier, the state management protocols used at the replication DAG may alleviate the negative impact of false positive failure "detections", e.g., by avoiding "stop-the-world" pauses. As a result, it may be possible to use faster/cheaper (although potentially less reliable) failure-checking mechanisms when replication DAGs are employed than would have been acceptable if other state replication techniques were used.

In at least one embodiment, a coordinated suspension technique may be implemented for replication DAGs. Under certain conditions, e.g., if a large-scale failure event involving multiple DAG resources or nodes is detected, the configuration manager may direct the surviving nodes of the DAG to stop processing further state transitions, synchronize their application state information with each other, store the synchronized application state information at respective storage locations, and await re-activation instructions. In some implementations, after saving application state locally, the DAG nodes may each perform a clean shutdown and restart, and report to the configuration manager after restarting to indicate that they are available for service. If a node that had failed before the suspend command was issued by the configuration manager reports that it is available for service, in some embodiments the configuration manager may direct such a node to synchronize its application state with another node that is known (e.g., by the configuration manager) to be up-to-date with respect to application state. The configuration manager may wait until a sufficient number of nodes are (a) available for service and (b) up-to-date with respect to application state, determine a (potentially new) DAG configuration, and re-activate the DAG by sending re-activation messages indicating the DAG configuration to the member nodes of the configuration. Such a controlled and coordinated suspension/restart strategy may allow more rapid and dependable application recovery after large-scale failure events than may have been possible otherwise in some embodiments. The coordinated suspension approach may also be used for purposes other than responding to large-scale failures—e.g., for fast parallel backups/snapshots of application state information from a plurality of the replication nodes.

DAG-based replicated state machines of the type described above may be used to manage a variety of different applications in various embodiments. In some embodiments, a logging service may be implemented, at which one or more data stores (e.g., relational or non-relational databases) may be registered for transaction management via an instance of a persistent change log implemented using a replication DAG. As described below in further detail, an optimistic concurrency control mechanism may be used by such a log-based transaction manager in some embodiments. A client of the logging service may perform read operations on one or more source data stores and determine one or more data store locations to which write operations are to be performed (e.g., based on the results of the reads) within a given transaction. A transaction request descriptor including representations of the read sets, write sets, concurrency control requirements, and/or logical constraints on the transaction may be submitted to a conflict detector of the logging service (e.g., conflict detection logic associated with an acceptor node of the corresponding replication DAG). The conflict detector may use records of previously-committed transactions together with the contents of the transaction descriptor to determine whether the transaction request is acceptable for commit. If a transaction is accepted for commit, a replication of a corresponding commit record may be initiated at some number of replication nodes of the DAG established for the log. The records inserted into a given replica of the log may thus each represent respective application state transitions. A number of different logical constraints may be specified in different embodiments, and enforced by the log-based transaction manager, such as de-duplication requirements, inter-transaction commit sequencing requirements and the like. Such a log-based transaction management mechanism may, in some embodiments, enable support for multi-item transactions, or multi-database transactions, in which for example a given transaction's write set includes a plurality of write locations even though the underlying data stores may not natively support atomicity for transactions involving more than one write. The writes corresponding to committed transactions may be applied to the relevant data stores asynchronously in at least some embodiments—e.g., a record that a transaction has been committed may be saved in the persistent change log at some time before the corresponding writes are propagated to the targeted data stores. The persistent change log may thus become the authoritative source of the application state in at least some embodiments, with the data stores catching up with the application state after the log has recorded state changes.

Replication DAGs may also be used for replicated database instances, for managing high-throughput data streams, and/or for distributed lock management in various embodiments. In some embodiments, replication DAGs may be used within provider networks to manage state changes to virtualized resources such as compute instances. In at least some embodiments, in addition to propagating committed writes to registered data stores (from which the results of the writes can be read via the respective read interfaces of the data stores), a logging service may also define and implement its own separate access interfaces, allowing interested clients to read at least a portion of the records stored for a given client application directly from a persistent log instance.

Example System Environment

FIG. 1 illustrates an example system environment in which a dynamic DAG (directed acyclic graph) of replication nodes is established for managing application state changes, according to at least some embodiments. As shown, in system 100, replication DAG 140 established for managing state transitions of an application 160 comprises a replication pathway with three nodes: an acceptor node 110, an intermediate node 112 and a committer node 114. In addition, DAG 140 includes a standby node 130 in the depicted embodiment, available to take over the responsibilities of any of the other nodes if needed. Other combinations of nodes may be deployed for other replication DAGs—e.g., more than one intermediate node may be used for some applications, no intermediate nodes may be used for other applications, or standby nodes may not be established. Changes to the configuration of the DAG 140 may be coordinated by a fault-tolerant DAG configuration manager (DCM) 164 as described below.

The acceptor node 110 may receive application state transition requests (STRs) 150 via one or more programmatic interfaces such as APIs (application programming interfaces) in the depicted embodiment. The acceptor node 110 may accept a requested transition for an eventual commit, or may reject the request, using application-dependent rules or logic. If a transition is accepted, a sequence number may be generated by the acceptor node 110, e.g., indicative of an order in which that transition was accepted relative to other accepted transitions. As mentioned above, in some embodiments the sequence number may comprise a counter that is incremented for each accepted transition, while in other embodiments a logical clock or timestamp value provided by the configuration manager may be used. A collection 176A of application state records (ASRs) 172A including corresponding sequence numbers may be stored in local persistent storage by the acceptor node. In some embodiments, the application state records may comprise both transition accept records and transition commit records (with a commit record being stored only after the acceptor node is informed that the corresponding transition was committed by the committer node). In other embodiments, at least some nodes along the replication pathway may only store accept records. After storing a state transition record indicating acceptance, the acceptor node may transmit a state transition message (STM) 152A indicating the approval to its successor node along the replication pathway, such as intermediate node 112 in the illustrated configuration. The intermediate node may store its own copy of a corresponding ASR, 172B, together with the sequence number, in its local ASR collection 176B. The intermediate node may transmit its own STM 152B to its neighbor along the current replication pathway, e.g., to committer node 114 in the depicted embodiment. In at least some implementations, the STMs 152 may include an indication of which nodes have already stored replicas of the ASRs—e.g., the message 152B may indicate to the committer node that respective replicas of the application state record indicating acceptance have been stored already at nodes 110 and 112 respectively.

In response to a determination at the committer node that a sufficient number of replicas of the application state record have been stored (where the exact number of replicas that suffice may be a configuration parameter of the application 160), the transition may be committed. The ASR collection 176C of the committer node may comprise records of transaction commits (as opposed to approvals) in the depicted embodiment; thus, ASR 172C may indicate a commit rather than just an acceptance. In at least some embodiments, the committer node 116 may transmit indications or notifications to the acceptor node and/or the intermediate node indicating that the transition was committed. In other embodiments, the acceptor and/or intermediate node may submit requests (e.g., periodically) to the committer node 116 to determine which transitions have been committed and may update their ASR collections accordingly. For some applications, explicit commits may not be required; thus, no indications of commits may be stored, and each of the DAG nodes along the pathway may simply store respective application state records indicating acceptance. In the depicted embodiment, post-commit STMs 154 may be transmitted from the committer node to the standby node 130 to enable the standby node to update its ASR collection 176D (e.g., by storing a commit ASR 172D), so that if and when the standby node is activated to replace another DAG node, its application state information matches that of the committer node. The fact that standby nodes are kept up-to-date with the latest committed application state may enable the configuration manager to quickly activate a standby node for any of the other three types of roles in some embodiments: e.g., as an acceptor node, an intermediate node, or a committer node.

A fault-tolerant DAG configuration manager (DCM) 164 may be responsible for propagating changes to the DAG configuration or membership in the form of configuration-delta messages 166 (e.g., messages 166A, 166B, 166C and 166D) to the DAG nodes as needed in the depicted embodiment. When a given DAG node leaves the DAG 140, e.g., as a result of a failure, a corresponding configuration-delta message 166 may be sent to one or more surviving nodes by the DCM 164, for example. Similarly, when a new node joins the DAG (e.g., after a recovery from a failure, or to increase the durability level of the application 160), a corresponding configuration-delta message indicating the join event, the position of the joining node within the DAG, and/or the role (e.g., acceptor, intermediate, committer, or standby) granted to the joining node may be transmitted by the DCM to one or more current member nodes of the DAG. The configuration-delta messages 166 may be asynchronous with respect to each other, and may be received by their targets in any order without affecting the overall replication of application state. Each node of the DAG may be responsible for constructing its own view 174 of the DAG configuration based on received configuration-delta messages, independently of the configuration views 174 that the other nodes may have. Thus, for example, because of the relative order and/or timing of different configuration-delta messages received at respective nodes 110, 112, 114 and 130, one or more of the configuration views 174A, 174B, 174C and 174D may differ at least for some short time intervals in some embodiments. In at least some embodiments, each DAG node may store representations or contents of some number of the configuration-delta messages received in respective local configuration change repositories. In the depicted embodiment, the DCM 164 may not enforce stop-the-world pauses in application state processing by the DAG nodes—e.g., it may allow the nodes to continue receiving and processing application state transition messages regardless of the timing of configuration-delta messages or the underlying DAG configuration changes. Examples of the manner in which DAG nodes respond to configuration-delta messages are discussed below with reference to FIG. 2a-2h.

It is noted that although FIG. 1 shows a DAG with a single linear replication pathway or "chain" with one node of each type, in at least some embodiments a replication DAG may include branched pathways and/or multiple nodes for each role. That is, several acceptor, intermediate, committer and/ or standby nodes may coexist in the same DAG, and the DAG's replication pathways may include join nodes (nodes at which transition requests from multiple predecessor nodes are received) or split nodes (nodes from which transition requests are sent to multiple successor nodes). If either the acceptor node 110 or the committer node 116 rejects a requested state transition (e.g., either because the acceptor node determines a set of application-specific acceptance criteria are not met, or because an insufficient number of replicas of an accepted transition have been made by the time the committer node receives the accepted state transition request message), in some embodiments the client that requested the transition may be informed that the transition was not committed. The client may then retry the transition (e.g., by submitting another state transition request), or may decide to abandon the request entirely. In some implementations, intermediate nodes may also be permitted to abort transition requests.

Figure 2A:
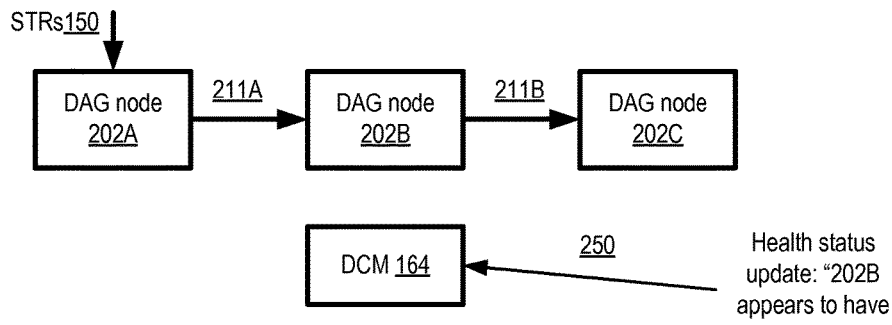
FIG. 2a-2h collectively illustrate an example sequence of operations that may be performed at a replication DAG in response to a detection that one of the nodes of the DAG may have failed, according to at least some embodiments.

FIG. 2a-2h illustrate an example sequence of operations that may be performed at a replication DAG in response to a detection that one of the nodes of the DAG may have failed, according to at least some embodiments. FIG. 2a shows an initial state of the DAG configuration, including three nodes 202A, 202B and 202C. State transition requests (STRs) 150 are received at node 202A. Accepted state transition records are replicated at nodes 202A (after local approval of the STRs) and 202B (after node 202B receives approved STMs 211A), and committed at 202C (after node 202C receives approved STMs 211B). The DCM 164 may receive a health status update 250 indicating that node 202B has apparently failed. The health status update regarding node 202B's status may be received from any of a variety of sources in different embodiments, e.g., from one of the other nodes (202A or 202B), or from a health monitoring service external to the DAG (e.g., a general-purpose resource health monitoring service established at a provider network where the DAG nodes are instantiated). In at least one implementation, the health status update may be generated by a subcomponent of the DMC 164 itself, such as a monitoring process that periodically sends heartbeat messages to the DAG nodes and determines that a given node is in an unhealthy state if no response is received within an acceptable time window to some number of successive heartbeat messages.

Figure 2B:
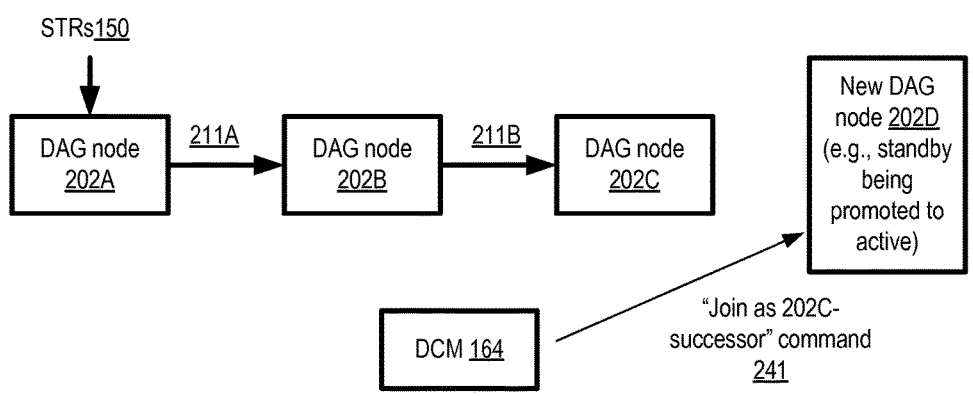
Figure 2C:
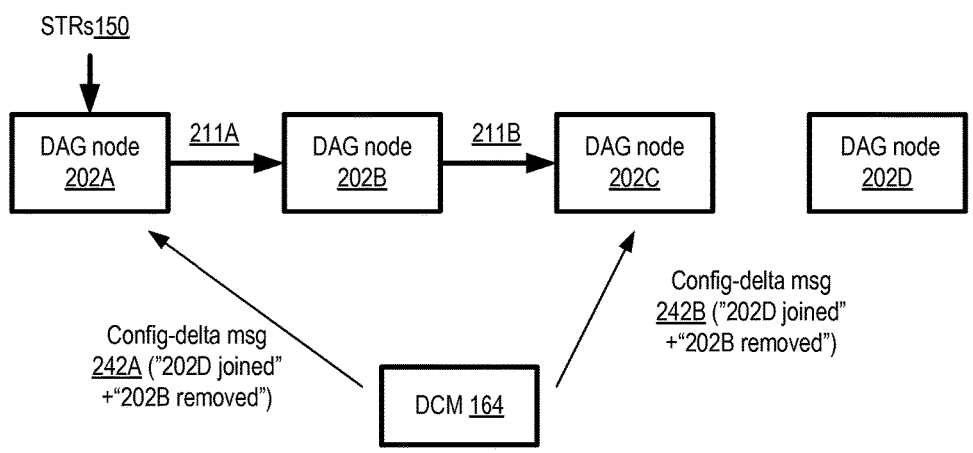
Figure 2D:
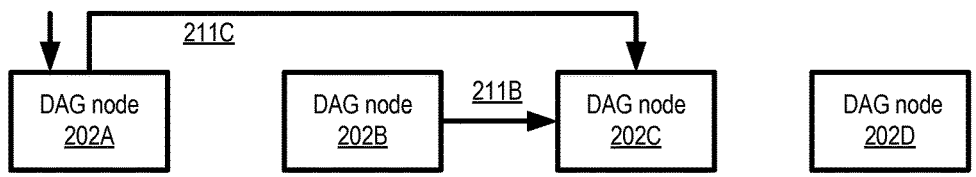

In the depicted embodiment, the DCM 164 may decide on the basis of the health status update that node 202B should be removed from the DAG, and a new node 202D should be added as a successor to node 202C. The new node may, for example, comprise a standby node being promoted to active status as the new committer node of the DAG. After deciding the new configuration of the DAG (i.e., that the DAG should now comprise a replication chain 202A-to-202C-to-202D), and saving a representation of the new configuration in a persistent repository, DCM 164 may issue a command 241 to node 202D to join the DAG as a successor to node 202C. It is noted that at least in some embodiments, a removal of a node such as 202B from a DAG may not necessarily be accompanied by an immediate addition of a replacement node (especially if the number of DAG nodes that remain online and connected after the removal exceeds the minimum number of nodes needed by the application whose state is being replicated); the addition of node 202D is illustrated simply as one of the ways in which the DCM may respond to a node failure (or at least an apparent node failure). As shown in FIG. 2b, it may be the case that node 202B has not actually failed (i.e., that the health update was in error regarding 202B's failure). In such a false-positive scenario, state transition messages may continue to be transmitted from 202A towards 202B, and from 202B to 202C, allowing the application to continue making progress for at least some time after the DCM 164 makes the removal decision.

In at least some embodiments, when a node such as 202B is removed from a DAG, and the immediate successor (e.g., 202C) of the removed node remains in the DAG, the role that was previously assigned to the removed node may be transferred to the immediate successor. Thus, node 202C, which may have been a committer node, may be made an intermediate node upon node 202B's departure, and the newly-activated node 202D may be designated as the new committer node. If the removed node had no immediate successor (e.g., if node 202C had been removed in the depicted example instead of node 202B), the newly-activated standby node may be granted the role that was assigned to the removed node in some embodiments. In other embodiments, roles may not be transferred in a such a sequential/linear fashion—e.g., the configuration manager may decide which roles should be granted to a given node without taking the relative position of the node vis-à-vis a removed node into account.

After deciding that node 202B should be removed from the DAG, the DCM 164 may send respective asynchronous configuration-delta messages 242A and 242B to nodes 202A and 202C in the depicted embodiment. As shown, each of the delta messages may indicate that 202B has left the DAG, and that 202D has joined. Although the two changes to the configuration are indicated in a single configuration-delta message in the depicted embodiment, in other embodiments separate configuration delta messages may be sent for the removal of 202B and the join of 202D. The configuration-delta messages may indicate only the changes to the DAG configuration, and may not comprise a representation of the DAG's entire configuration in the depicted embodiment. Until node 202A receives the configuration-delta message 242A or otherwise becomes aware that 202B has left the DAG (e.g., due to termination of a network connection), STMs may continue to be directed from node 202A to node 202B. In the scenario where 202B has not actually failed, node 202B may continue processing state transition requests and sending messages 211B towards node 202C until it becomes aware that it has been removed from the DAG (e.g., if either 202A or 202C stop communicating with 202B).

Since the configuration-delta messages 242 are sent using an asynchronous messaging mechanism, they may arrive at their destinations at different times. If node 202A receives configuration-delta message 242A before node 202C receives configuration-delta message 242B, the scenario depicted in FIG. 2*d* may be reached (in which the DAG at least temporarily contains a branch). In response to message 242A, node 202A may save the indication of the configuration change in local storage and stop sending any further messages to node 202B. Furthermore, node 202A may determine that its new successor node is 202C, and may therefore establish network connectivity with node 202C and start sending node 202C new state transition messages 211C. In the embodiment depicted, state transition processing activities may continue at various nodes of the DAG even as the message indicating the removal of 202B makes its way to the remaining nodes. In a scenario in which node 202B is assumed to have failed but in fact remains functional, for example, even after node 202A learns that node 202B has been removed from the DAG, one or more in-flight state transition messages may be received from node 202A at node 202B. Upon receiving such an in-flight message, node 202B may replicate the state transition information indicated in the message in local storage and attempt to transmit another similar STM to node 202C. If node 202C has not yet learned of node 202B's removal (or at least has not yet closed its connection with node 202B), node 202C may receive and process the message from node 202B, allowing the application to make progress, even though node 202B has been removed from the DAG configuration by the configuration manager.

Figure 2E:
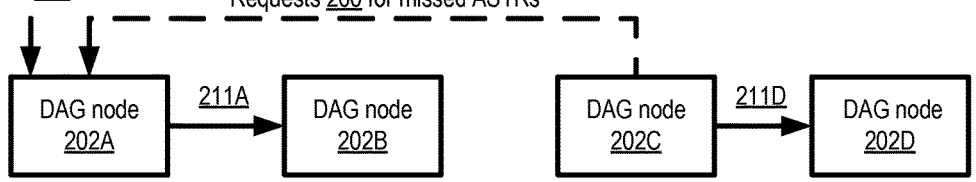

If node 202C receives configuration-delta message 242B before node 202A received configuration-delta message 242A, the scenario illustrated in FIG. 2*e* may be reached. Upon receiving message 242B, node 202C may stop receiving new messages sent from node 202B (e.g., by terminating its connection with node 202B if the connection is still in service). Upon realizing that node 202A is its new immediate predecessor in the DAG pathway, node 202C may establish connectivity to node 202A. Node 202C may also determine the highest sequence number HSN1 (from among the sequence numbers for which approved STMs have already been received at node 202C), and send a request 260 to node 202A to re-transmit any approved state transition messages that 202C may have missed (i.e., any approved STMs with higher sequence numbers than HSN1) in the depicted embodiment. Furthermore, node 202C may also establish connectivity to its new successor node 202D, and may start sending subsequent approved STMs 211D to node 202D.

Figure 2F:
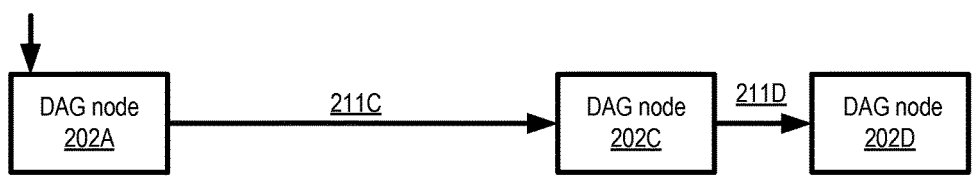

After both nodes 202A and 202C have been informed about the DAG configuration change, the DAG's new replication pathway illustrated in FIG. 2*f* (i.e., 202A-to-202C-to-202D) may be used for new incoming state transition requests. It is noted that because of the timing of the configuration-delta messages 242, it may be the case that node 202A learns about the configuration change from node 202C before the configuration-delta message 242A is received at node 202A. Similarly, node 202C may learn about the new configuration from node 202A (or even node 202D) in some embodiments. Thus, there may be multiple ways in which information about the new configuration may reach any given node of the DAG, and at least in some embodiments the DAG nodes may start using portions of the new replication pathway even before the configuration-delta messages have reached all of their targeted recipients.

Figure 2G:
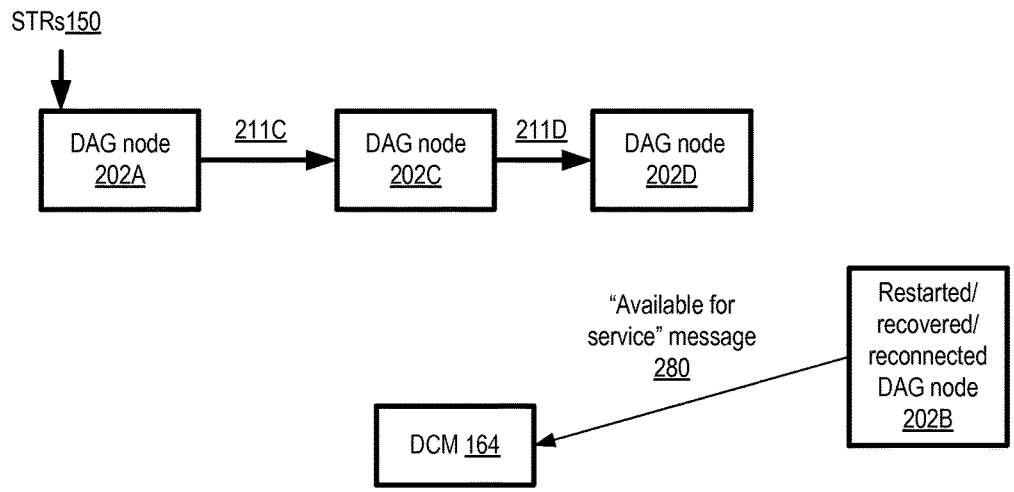
Figure 2H:
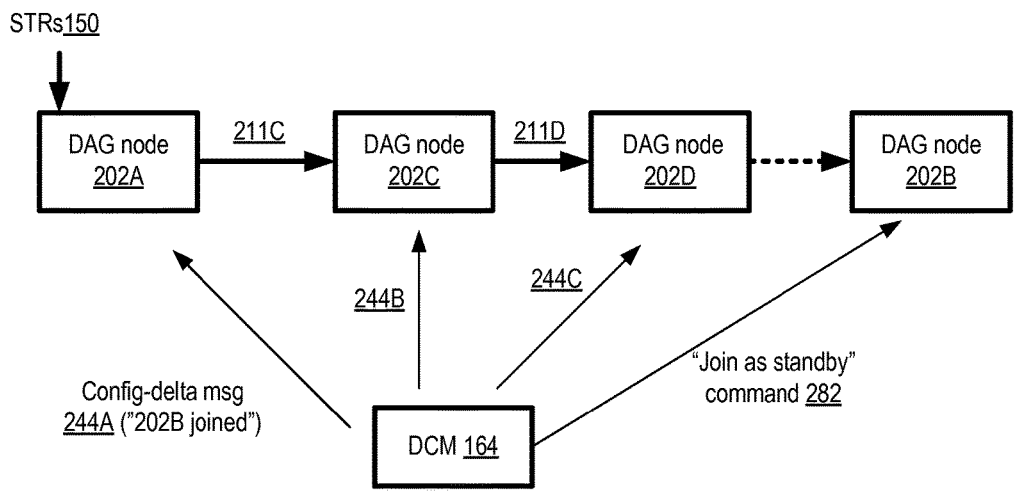

As shown in FIG. 2*g*, at some point after it has been removed from the DAG (e.g., either due to an actual failure or due to a false positive failure detection), node 202B may optionally indicate to the DCM 164 that it is ready for service. In the case of an actual failure, for example, node 202B may eventually be repaired and restarted and may perform some set of recovery operations before sending the "available for service" message 280. In the case of a network connectivity loss, the "available for service" message may be sent after connectivity is reestablished. In response, in the depicted embodiment, the DCM 164 may decide to add node 202B back as a standby node of the DAG. Accordingly, as shown in FIG. 2*h*, the DCM may send a join command 282 to node 202B, and a new set of configuration-delta messages 244A, 244B and 244C to nodes 202A, 202B and 202D respectively to inform them of the addition of node 202B. It is noted that the sequence of operations illustrated in FIG. 2*a*-2*h* is provided as an example, and that the DAG nodes and the DCM may perform a different sequence of operations than that illustrated in FIG. 2*a*-2*h* in response to an apparent failure of node 202B in various embodiments. For example, no new node may be added to the DAG in some embodiments as a successor to node 202C. Also, in some embodiments, node 202B may not necessarily re-join the same DAG after it becomes available for service; instead, for example, it may be deployed to a different DAG or may be kept in a pool of nodes from which new DAGs may be configured.

Although a detection of a failure is shown as triggering a DAG configuration changes in FIG. 2*a*-2*h*, in general, any of a number of different considerations may lead to modifications of DAG configurations in various embodiment. For example, an application owner (or the DCM) may decide to add a node to a DAG to enhance data durability or for availability reasons. Configuration-delta messages indicating the addition of a new node may be propagated in a similar asynchronous fashion to other DAG nodes as the removal-related propagation described above in some embodiments, without requiring "stop-the-world" pauses in state transition processing. A DAG node may have to be taken offline for maintenance-related reasons in some embodiments, e.g., for a software upgrade, for debugging software errors, or for hardware modifications. In at least one embodiment, a DAG's configuration may be changed as a result of a determination that the workload level (e.g., the number of state transitions being processed per second) at one or more of the nodes has reached a threshold level, and that more performant (or less performant) hardware/software stacks should be utilized than are being used currently. In some embodiments, a DAG configuration change may involve changing the position or role of a particular DAG node, without necessarily adding or removing a node. For example, a configuration manager may switch the role of committer to a node that was previously an intermediate node, and make the old committer node an intermediate node in the new configuration. Such a role change may be implemented (and the corresponding configuration-delta messages propagated), for example, for load balancing purposes, especially in a multi-tenant environment in which the same host is being used for nodes of several different DAGs. Such multi-tenant environments are described below in further detail.

State Transition Records and Configuration-Delta Messages

Figure 3:
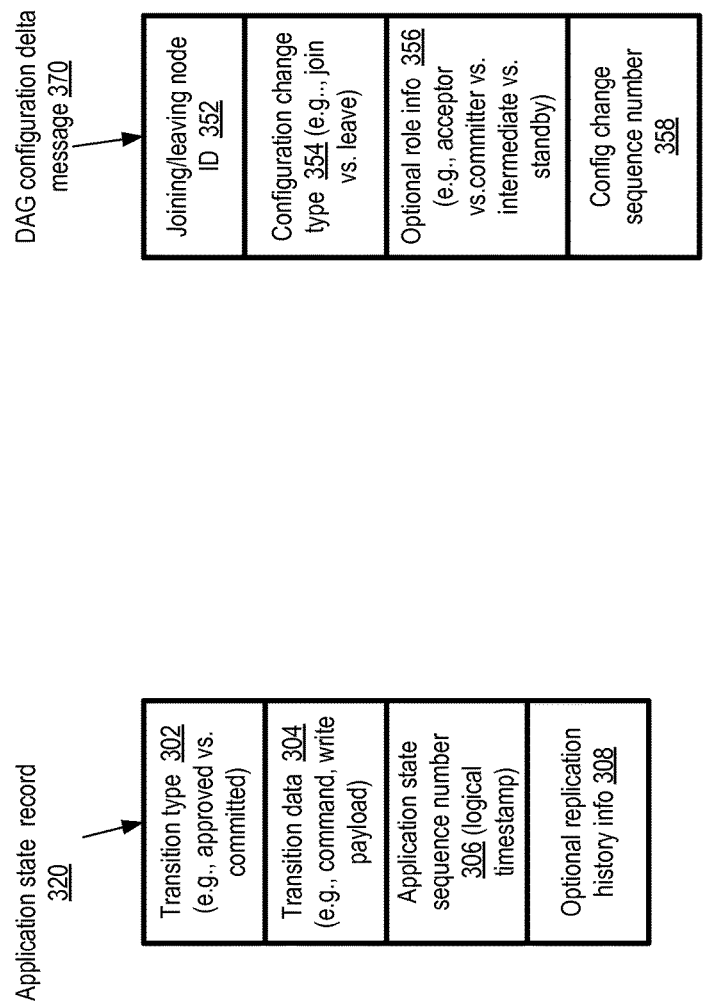
FIG. 3 illustrates example components of application state records and DAG configuration-delta messages that may be generated at a dynamic replication DAG according to at least some embodiments.

FIG. 3 illustrates example components of application state records (ASRs) and DAG configuration-delta messages that may be generated at a dynamic replication DAG according to at least some embodiments. As indicated earlier, copies of application state records, each representing an approved or committed state transition, may be stored at each of several nodes along a replication pathway of a DAG in at least some embodiments Application state records may also be referred to as state transition records herein. As shown, an application state record 320 may comprise an indication of the type 302 of the transition—e.g., whether an approval of a requested state transition is being recorded, or whether a commit of an approved state transition is being recorded. In some embodiments, as noted earlier, each DAG node may store both approval and commit records, while in other embodiments, only one type of state transition record may be stored. For example, in one scenario, approval records may be replicate initially at non-committer nodes, and the approval records may be changed to commit records after the transaction is eventually committed by the committer node. In at least one embodiment, a separate transition type field 302 may not be included in an ASR or in the message that leads to the generation of the ASR—instead, the type of the transition may be inferred by a DAG node based on the node's knowledge of its current role and/or the role of the source DAG node from which the message is received. For example, a non-committer node that receives a state transition message may infer that the message represents an approved state transition.

The state transition records 320 records may include transition data 304 in the depicted embodiment. The nature of the contents of the transition data component 304 may differ depending on the application whose state is being managed. In some cases, for example, a state transition request may include a write payload (indicating some number of bytes that are to be written, and the address(es) to which the bytes are to be written), and the write payload may be included in the transition record. For other applications, each state transition may indicate a respective command issued by an application client, and a representation of the command may be included in the ASR. The ASR 320 may also include a sequence number 306 (which may also be considered a logical timestamp) corresponding to the state transition. The sequence number may, for example, be generated at an acceptor node when a state transition request is approved, or at a committer node when the state transition is committed. In at least some embodiments, the current state of the application being managed using the DAG may be determined by applying, starting at some initial state of the application, transition data of committed state records (e.g., write payloads, commands, etc.) in order of increasing sequence numbers. In some embodiments, replication history information 308 of a transition may also be included in an ASR—e.g., indicating which DAG nodes have already stored a respective ASR for the same transition, and/or the order tin which those records have been replicated. Such replication history information may, for example, be used by a committer node in some implementations to confirm that a sufficient number of nodes have recorded a given state transition for a commit. In some embodiments, an ASR message may indicate the identity of the acceptor node where the corresponding state transition request was received, but need not include information regarding other nodes along the replication pathway. In at least one implementation, a committer node may not be required to confirm that a sufficient number of nodes have replicated a state transition record before committing an approved state transition.

A DAG configuration-delta message 370 may indicate an identifier 352 of the node (or nodes) joining or leaving the configuration in the depicted embodiment, and the type of change 354 (e.g., join vs. leave) being implemented. In some implementations, role information 356 about the joining (or leaving) node may optionally be included in the configuration-delta message. In at least some embodiments, just as application state sequence numbers are associated with application state transitions, DAG configuration change sequence numbers 358 may be included with configuration-delta messages. Such sequence numbers may be used by a recipient of the configuration-delta messages to determine whether the recipient has missed any prior configuration changes, for example. If some configuration changes have been missed (due to network packets being dropped, for example), the recipient node may send a request to the DCM to re-transmit the missed configuration-delta messages. The configuration change sequence numbers 358 may be implemented as counters or logical timestamps at the DCM in various embodiments. In some implementations in which the DCM comprises a cluster with a plurality of nodes, a global logical timestamp maintained by the cluster manager may be used as a source for the configuration change sequence numbers 358.

Replication DAG Deployments in Provider Network Environments

Figure 4:
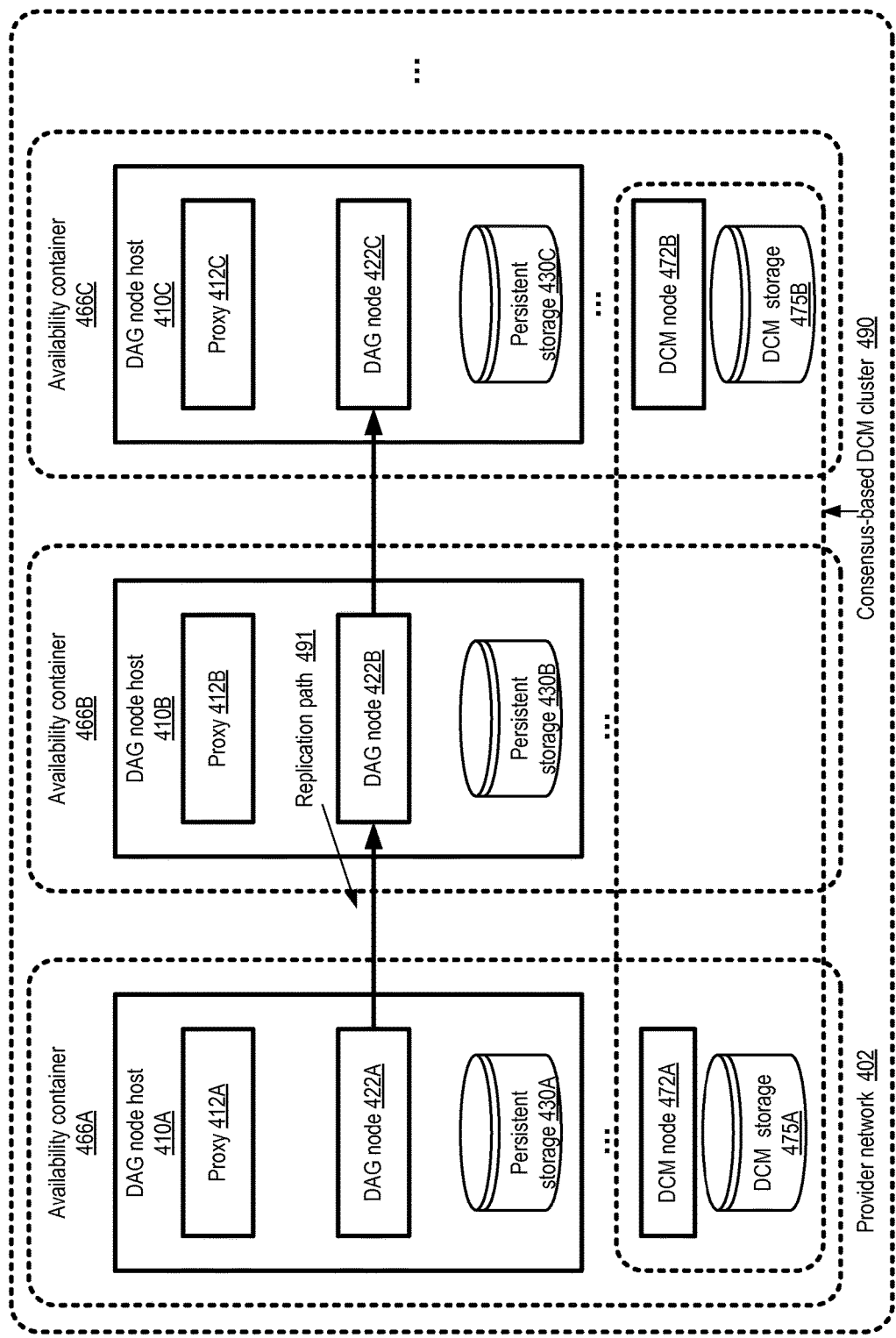
FIG. 4 illustrates an example replication DAG whose member nodes are distributed across a plurality of availability containers of a provider network, according to at least some embodiments.

FIG. 4 illustrates an example replication DAG whose member nodes are distributed across a plurality of availability containers of a provider network, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

In some embodiments a provider network may be organized into a plurality of geographical regions, and each region may include one or more availability containers, which may also be termed "availability zones". An availability container in turn may comprise one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or virtualized server is intended to be independent of the availability profile of other hosts or servers in a different availability container.

One or more nodes of a replication DAG may be instantiated in a different availability container than other nodes of the DAG in some embodiments, as shown in FIG. 4. Provider network 402 includes three availability containers 466A, 466B and 466C in the depicted embodiment, with each availability container comprising some number of node hosts 410. Node host 410A of availability container 466A, for example, comprises a DAG node 422A, local persistent storage (e.g., one or more disk-based devices) 430A, and a proxy 412A that may be used as a front end for communications with DAG clients. Similarly, node host 410B in availability container 466B comprises DAG node 422B, local persistent storage 430B, and a proxy 412B, and node host 410C in availability container 466C includes DAG node 422C, local persistent storage 430C and a proxy 412C. In the depicted embodiment, DAG nodes 422 (and/or proxies 412) may each comprise one or more threads of execution, such as a set of one or more processes. The local persistent storage devices 430 may be used to store local replicas of application state information along replication path 491 (and/or DAG configuration-delta message contents received at the DAG nodes 422 of the replication path 491) in the depicted embodiment.

The DCM of the DAG depicted in the embodiment of FIG. 4 itself comprises a plurality of nodes distributed across multiple availability containers. As shown, a consensus-based DCM cluster 490 may be used, comprising DCM node 472A with DCM storage 475A located in availability container 466A, and DCM node 472B with DCM storage 475B located in availability container 466B. The depicted DCM may thus be considered fault-tolerant, at least with respect to failures that do not cross availability container boundaries. The nodes of such a fault-tolerant DCM may be referred to herein as "configuration nodes", e.g., in contrast to the member nodes of the DAG being managed by the DCM. Changes to the DAG configuration (including, for example, node removals, additions or role changes) may be approved using a consensus-based protocol among the DCM nodes 472, and representations of the DAG configuration may have to be stored in persistent storage by a plurality of DCM nodes before the corresponding configuration-delta messages are transmitted to the DAG nodes 422. The number of availability containers used for the DCM and/or for a given replication DAG may vary in different embodiments and for different applications, depending for example on the availability requirements or data durability requirements of the applications. In some embodiments, replication DAGs may be used to manage the configuration of resources of other services implemented at a provider network. For example, changes to the state of compute instances (virtual machines) or instance hosts (physical hosts) used by a virtualized computing service may be managed using a replication DAG in one embodiment.

Figure 5:
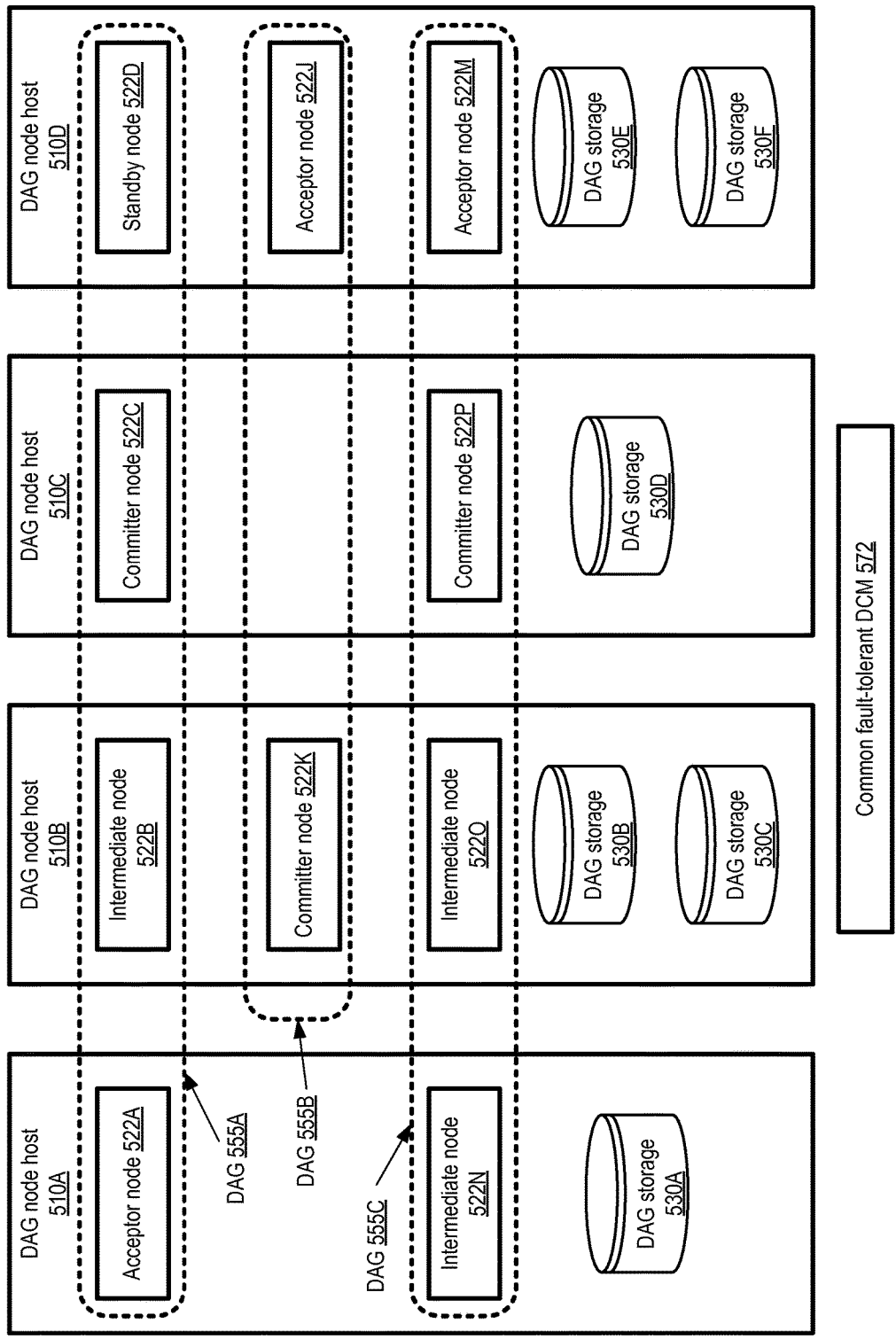
FIG. 5 illustrates an example configuration in which nodes of a plurality of replication DAGs may be implemented at a single host in a multi-tenant fashion, according to at least some embodiments.

FIG. 5 illustrates an example configuration in which nodes of a plurality of replication DAGs may be implemented at a single host in a multi-tenant fashion, according to at least some embodiments. As shown, nodes of three replication DAGs 555A, 555B and 555C are distributed among four DAG node hosts 510A, 510B, 510C and 510D. In general, the node hosts may differ in their resource capacities—e.g., the computing, storage, networking and/or memory resources of one host may differ from those of other hosts. For example, node host 510B has two storage devices 530B and 530C that can be used for DAG information, node host 510D has two storage devices 530E and 530F, while node hosts 510A and 510C have one storage device (530A and 530D respectively).

Host 510A comprises an acceptor node 522A of DAG 555A, and an intermediate node 522N of DAG 555C. Host 510B comprises an intermediate node 522B of DAG 555A, a committer node 522K of DAG 555B, and an intermediate node 522O of DAG 555C. Committer node 522C of DAG 555A and committer node 522P of DAG 555C may be implemented at host 510C. Finally, standby node 522C of DAG 555A, acceptor node 522J of DAG 555B, and acceptor node 522M of DAG 555C may be instantiated at host 510D. Thus, in general, a given host may be used for nodes of N different DAGs, and each DAG may utilize M different hosts, where M and N may be configurable parameters in at least some embodiments. Nodes of several DAGs established on behalf of respective application owners may be implemented on the same host in a multi-tenant fashion in at least some embodiments: e.g., it may not be apparent to a particular application owner that the resources being utilized for state management of their application are also being used for managing the state of other applications. In some provider network environments, a placement service may be implemented that selects the specific hosts to be used for a given node of a given application's replication DAG. Node hosts may be selected on the basis of various combinations of factors in different embodiments, such as the performance requirements of the application whose state is being managed, the available resource capacity at candidate hosts, load balancing needs, pricing considerations, and so on. In at least some implementations, instantiating multiple DAG nodes per host may help to increase the overall resource utilization levels at the hosts relative to the utilization levels that could be achieved if only a single DAG node were instantiated. For example, especially in embodiments in which a significant portion of the logic used for a DAG node is single-threaded, more of the processor cores of a multi-core host could be used in parallel in the multi-tenant scenario than in a single-tenant scenario, thereby increasing average CPU utilization of the host.

Methods for Implementing Dynamic DAG-Based State Replication

Figure 6:
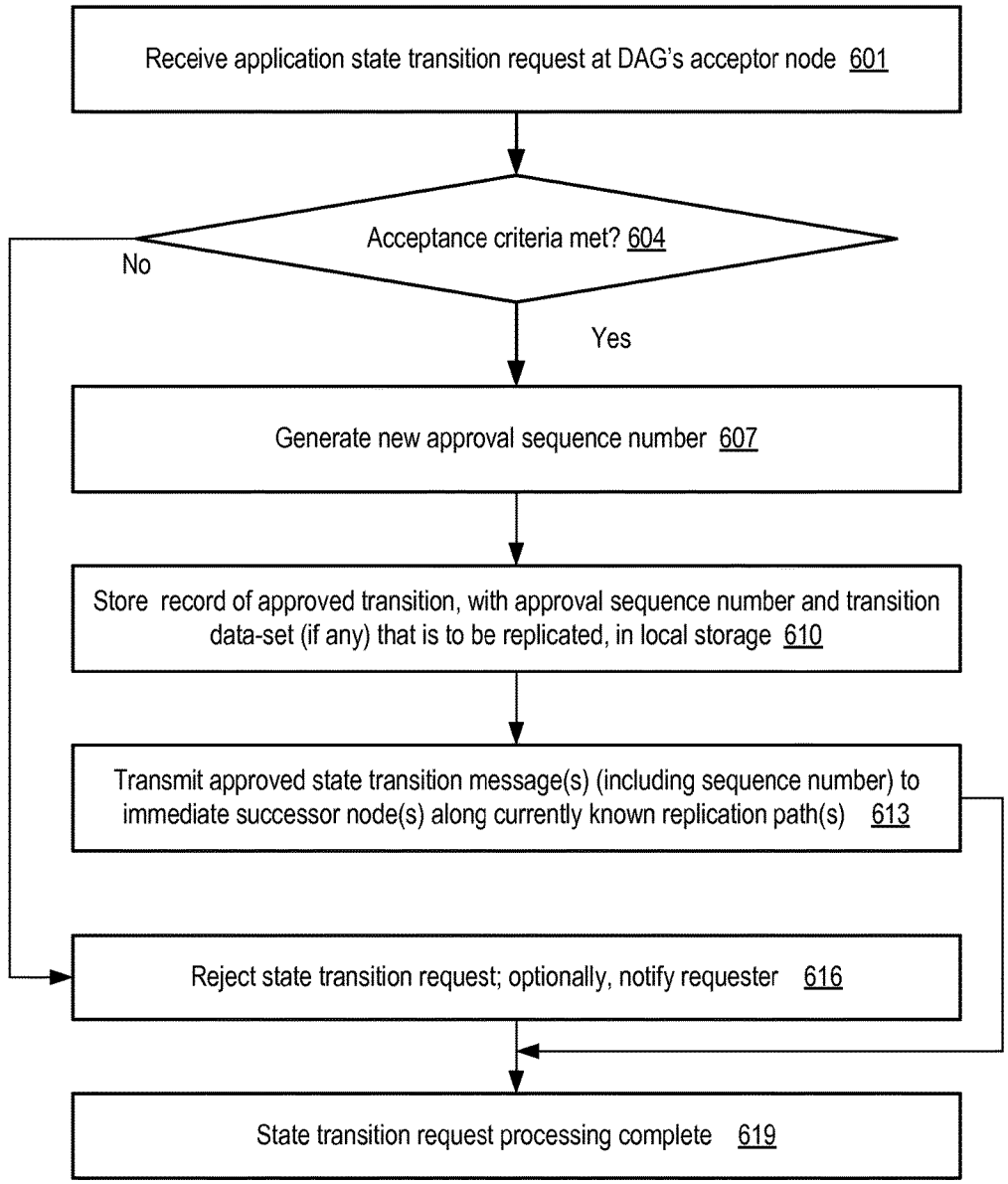
FIG. 6 is a flow diagram illustrating aspects of operations that may be performed at an acceptor node of a replication DAG in response to receiving a state transition request, according to at least some embodiments.

As discussed above, a given node of a replication DAG may be granted one of a number of roles (e.g., acceptor, intermediate, committer, or standby) in some embodiments at a given point in time. FIG. 6 is a flow diagram illustrating aspects of operations that may be performed at an acceptor node of a replication DAG in response to receiving a state transition request (STR), according to at least some embodiments. As shown in element 601, the acceptor node may receive a message comprising an STR for an application, e.g., from a client of a state replication service. The STR may comprise various elements in different embodiments, depending in part on the nature of the application. For example, in some embodiments as described below in greater detail, the DAG may be used for optimistic concurrency control for transactions directed at one or more data stores, and the STR may include data such as read sets and write sets that can be used to detect conflicts with previously-committed transactions. Each application whose state transitions are managed using a replication DAG may have its own set of acceptance criteria for requested state transitions, and at least in some cases the contents of the STR may be used to decide whether the transition should be accepted or rejected. In some implementations, operational conditions may also or instead be used for accepting/rejecting requested state transitions—e.g., if the workload level at the acceptor node or at other nodes of the DAG is at or above a threshold, the state transition may be rejected. If the transition meets the acceptance criteria (as detected in element 604), a new approval sequence number may be generated for the accepted STR (element 607), e.g., by incrementing a counter value or by obtaining some other monotonically increasing logical timestamp value. A record indicating that the transition was approved may be stored in local storage, together with the sequence number (element 610). For some applications, transition requests may include a data set (such as a write payload) to be replicated, the acceptor node may store the data set in local storage as well. In one implementation the acceptor node may comprise one or more processes running at a particular host of a provider network, and the a record of the transition's approval, the sequence number and the transition's data set may all be stored at a persistent disk-based storage device of the particular host. In some embodiments, the transition's data, an indication that the transition was approved, and the sequence number may all be combined into a single object stored at local storage, such as a log entry inserted into (or appended to) a log. In other embodiments, the transition's data set may be stored separately from the records indicating approval of the transition.

After the record of the state transition is safely stored, a state transition message indicating the approval may be transmitted to a neighbor node along a replication path of the DAG (element 613) towards a committer node. In some cases, depending on the topology of the DAG, multiple such messages may be sent, one to each neighbor node along the replication path. As described earlier, each node of the DAG may have its own view of the DAG configuration, which may not necessarily coincide with the views of the other nodes at a given point in time. The acceptor node may direct its approved state transition messages to the neighbor node (s) indicated in its current view of the DAG's configuration in the depicted embodiment, even if that current view happens to be obsolete or incorrect from the perspective of the DCM of the DAG (or from the perspective of one or more other DAG nodes). After the message(s) are sent, the state transition request's processing may be deemed complete at the acceptor node (element 619). If the requested transition does not meet the acceptance criteria of the application (as also detected in element 604), the transition may be rejected (element 616). In some implementations, a notification or response indicating the rejection may be provided to the requester.

Figure 7:
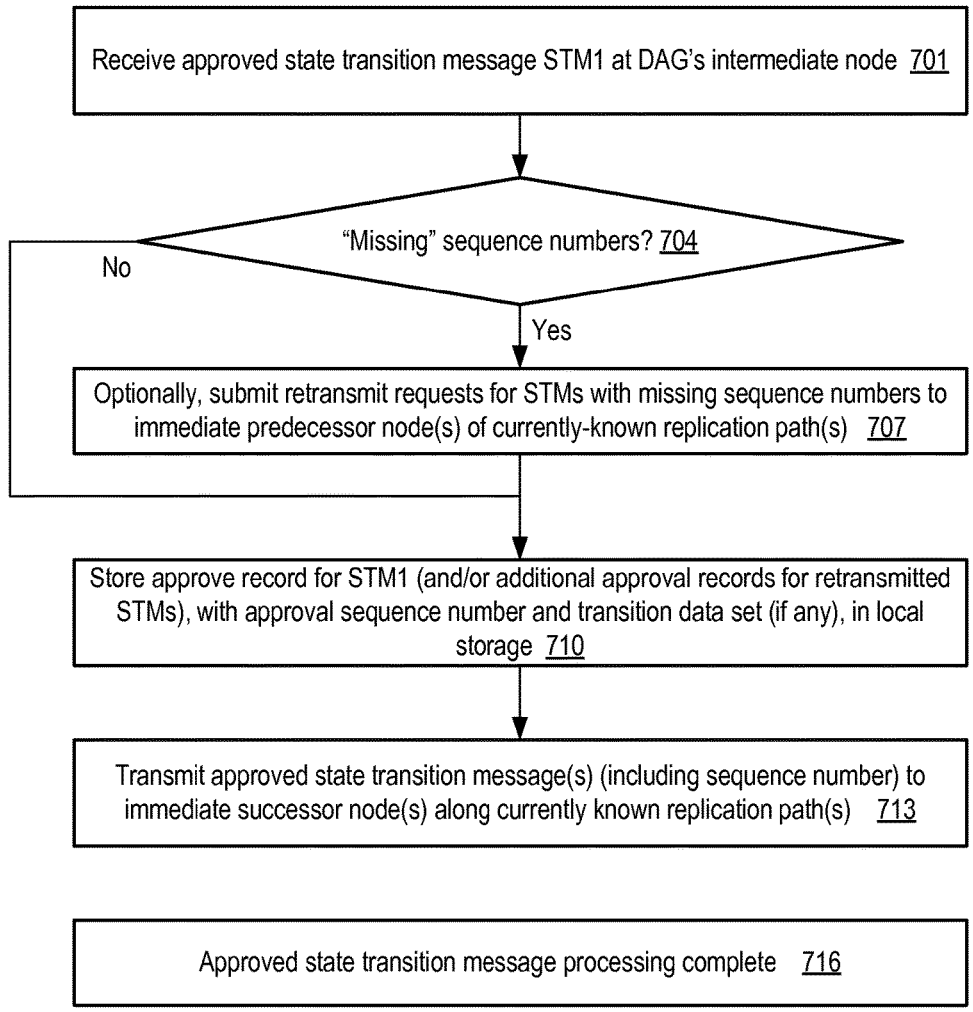
FIG. 7 is a flow diagram illustrating aspects of operations that may be performed at an intermediate node of a replication DAG in response to receiving an approved state transition message, according to at least some embodiments.

FIG. 7 is a flow diagram illustrating aspects of operations that may be performed at an intermediate node of a replication DAG in response to receiving an approved state transition message, according to at least some embodiments. After such a message STM1 is received (element 701), e.g., from an acceptor node or from another intermediate node, in some embodiments the intermediate node may determine whether state transition messages with lower sequence numbers are missing (e.g., if STM1 has a sequence number of SN1, whether one or more STMs with smaller sequence numbers than SN1 have not yet been received). If evidence of such missing state transition messages is found (element 704), the intermediate node may optionally submit a retransmit request for the missing STM(s) to immediate predecessor nodes along currently-known replication paths (element 707) in the depicted embodiment. In some implementations, the intermediate node may wait to receive responses to its retransmit request before storing a record of the approved state transition corresponding to STM1 in local storage. The approve record for STM1 may be stored, e.g., together with the approval sequence number and any data set (such as a write payload) associated with the transition (element 710). A state transition message (which may be similar in content to the message that was received, or identical in content to the message that was received) may then be sent to each neighbor node on the currently-known replication path(s) towards a committer node (element 713). In some implementations in which a state transition's approval history is included within state transition messages, the intermediate node may add its (the intermediate node's) identifier to the list of approvers indicated in the outgoing state transition message.

In some embodiments, instead of checking for missing sequence numbers before saving the approval record for STM1 in local storage, a different approach may be taken. For example, the intermediate node may check for missing sequence numbers after storing the approval record in local storage and/or after transmitting a corresponding STM towards the committer node.

In one implementation, a networking protocol such as TCP (the Transmission Control Protocol) that guarantees in-order delivery of messages within a given connection may be used in combination with a pull model for receiving STMs at non-acceptor nodes. In such an implementation, as long as an intermediate node, committer node or standby node maintains a network connection with its immediate predecessor along a replication path, the networking protocol may be relied upon to ensure that no messages are lost. If, at a given DAG node N1, the connection to the immediate predecessor node P1 is lost in such an implementation, N1 may be responsible for establishing a new connection to P1 (or to a different predecessor node if a configuration-delta message has been received indicating that P1 is no longer part of the DAG), and requesting P1 to send any STMs with sequence numbers higher than the previously highest-received sequence number.

Figure 8:
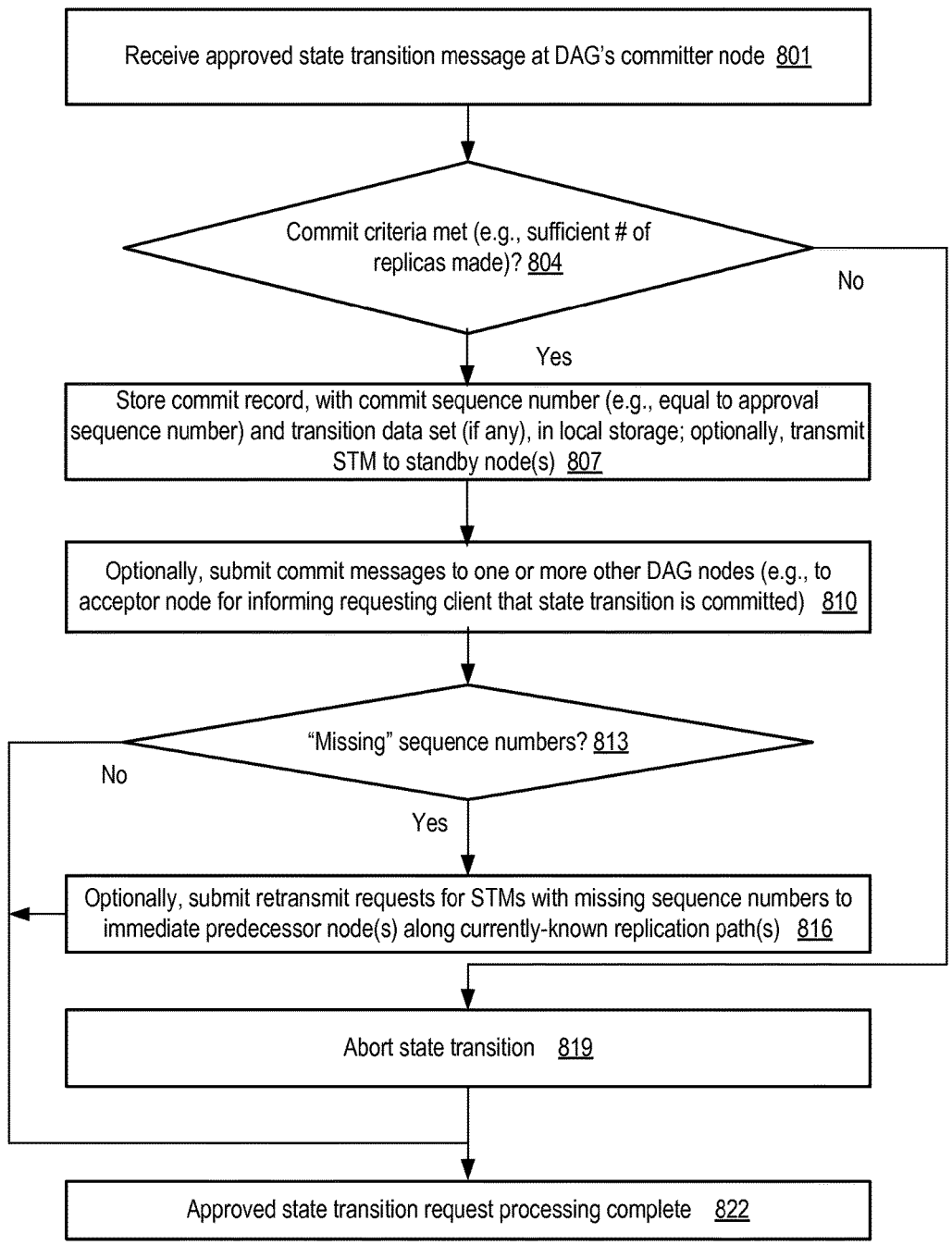
FIG. 8 is a flow diagram illustrating aspects of operations that may be performed at a committer node of a replication DAG in response to receiving an approved state transition message, according to at least some embodiments.

FIG. 8 is a flow diagram illustrating aspects of operations that may be performed at a committer node of a replication DAG in response to receiving an approved state transition message, according to at least some embodiments. Upon receiving an approved state transition message (element 801), e.g., from an intermediate node or from an acceptor node, the committer node may determine whether the state transition meets the application's commit criteria. In some embodiments, the committer node may be able to determine, from the contents of the STM (such as an approval history field), the number of replicas of application state records that have been saved thus far, and the transition may be deemed committable if the number of replicas exceeds a threshold. The replica count thresholds may differ based on the application; for example, a single replica at the acceptor node may be sufficient for some applications. In other embodiments, the committer node may also have to consider other factors before committing the transition, such as whether the committer node has already received all the STMs with lower sequence numbers than the current STM's sequence number. In one embodiment, for example, the committer node may have to wait until it receives and processes all such prior STMs before committing the current transition.

If the commit criteria (which may differ from application to application) are met (as detected in element 804), the committer node may store a commit record within its collection of application state records in local storage (element 807), e.g., together with the sequence number and the transition's data set (if any). In some implementations, the commit criteria may default to the acceptance criteria that have already been verified at the acceptor node—that is, once the state transition has been approved at an acceptor node, the committer node may commit the state transition indicated in a received STM without having to verify any additional conditions. In some embodiments, a copy of the approval sequence number indicated in the STM may be stored as the commit sequence number. Since some approved transitions may not get committed, in at least one embodiment a different set of sequence numbers may be used for commits than is used for approvals (e.g., so that the sequence of commit sequence numbers does not have any gaps). If standby nodes are configured for the DAG, post-commit STMs may be directed to one or more such standby nodes from the committer node. In at least some embodiments, after the transition is committed, a notification of the commit may be provided to one or more other nodes of the DAG (element 810), e.g., to enable the other nodes to update their application state information and/or for transmitting a response to the state transition's requesting client indicating that the transition has been committed.

In some embodiments in which missing STMs were not handled as part of the processing related to commit criteria, the committer node may take similar actions as were indicated in FIG. 7 with respect to missing STMs. Thus, for example, if the committer node determines that one or more STMs are missing (with lower sequence numbers than the sequence number of the received STM) (element 813), a retransmit request for the missing STMs may be sent to the immediate predecessor node(s) (element 816) to complete processing of the received STM (element 822). If the commit criteria were not met, the committer node may abort the state transition (element 819). In some embodiments, an abort notification may be sent to one or more other nodes of the DAG, and/or to the client that requested the state transition. In some implementations, as mentioned above, if a state transition has been approved at an acceptor node, the replication DAG may be responsible for (eventually) committing the state transition even if one or more nodes of the replication pathway (including the acceptor node itself) fail. Aborting a state transition may require a relatively heavyweight change in some such implementations, such as the removal of approval records of the transition from other DAG nodes (or the actual removal from the DAG of the nodes at which approval records happen to be stored). As described below in further detail with respect to FIG. 11*a*-FIG. 14, a preemptive coordinated DAG suspension technique may be used in some embodiments to avoid scenarios in which STMs reach committer nodes without the corresponding state transition information having been replicated at a desired number of DAG nodes.

Figure 9:
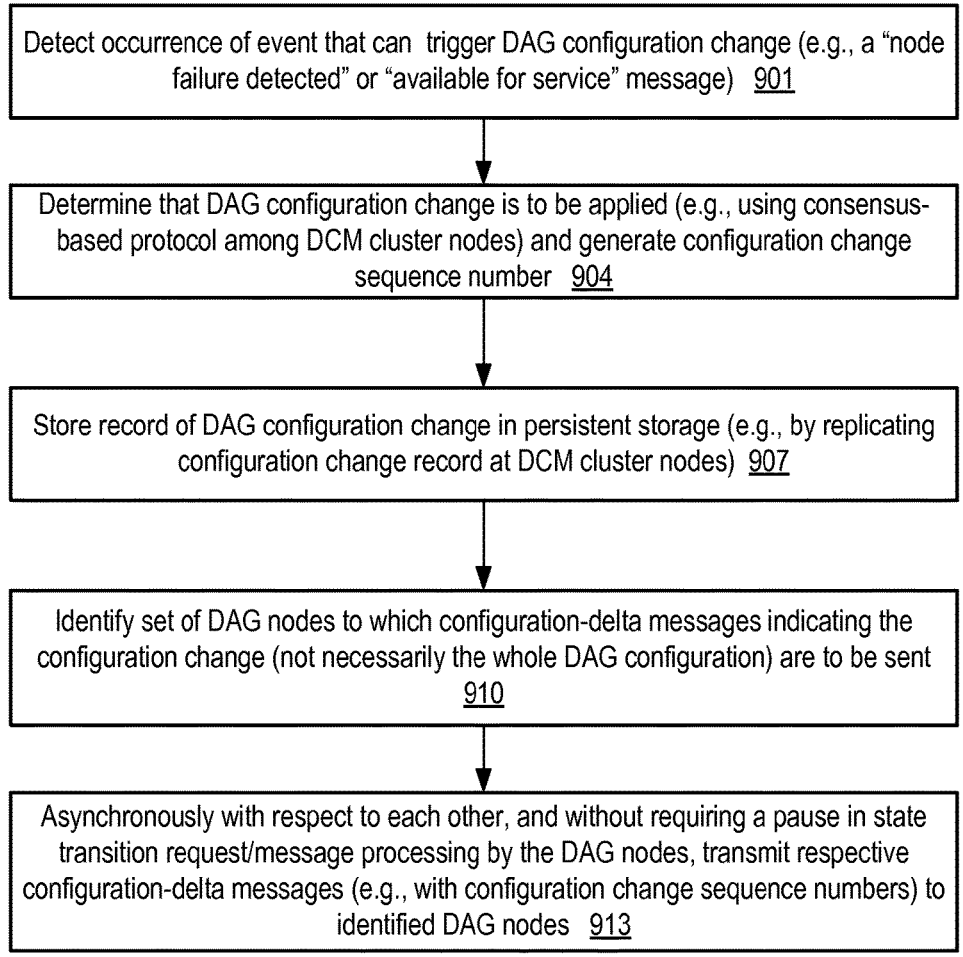
FIG. 9 is a flow diagram illustrating aspects of operations that may be performed at a configuration manager of a replication DAG, according to at least some embodiments.

FIG. 9 is a flow diagram illustrating aspects of operations that may be performed at a configuration manager (DCM) of a replication DAG, according to at least some embodiments. As shown in element 901, an event that can potentially trigger a configuration change at a DAG may be detected by the configuration manager. Such an event may include receiving a message such as "node failure detected" (e.g., from a DAG node, or from a health management component of a provider network) or "available for service" (e.g., from a DAG node that has restarted after a failure). In some embodiments the configuration manager itself may be responsible for monitoring the health status of various DAG nodes, and the triggering event may be a detection by the configuration manager that one of the nodes has not responded in a timely fashion to some number of heartbeat messages or other health checks. In at least some embodiments, the DAG nodes may be responsible for reporting any apparent node failures (e.g., when a connection is unexpectedly dropped, or when no message is received from a neighbor node for a time period greater than a threshold) to the DCM. A DAG node may also be responsible for notifying the DCM of impending changes (such as when the node is scheduled to go off-line for maintenance) that may lead to DAG configuration changes in some embodiments. The DCM may determine whether the indicated configuration change (e.g., a removal of a failed node, or the joining of a new node) is to be made effective (element 904) in the depicted embodiment, e.g., based on a consensus protocol that may be implemented among a plurality of nodes of a DCM cluster. For example, in some implementations, a determination by one DCM node that a DAG node has failed may have to be confirmed at one or more other nodes of the cluster (e.g., by reviewing heartbeat responses received from the DAG node at other DCM nodes) before the node is removed from the configuration. In other implementations, the decision as to whether to apply a possible configuration change may be performed without utilizing a consensus-based protocol. A sequence number or logical timestamp associated with the DAG configuration change may be determined or generated in some embodiments, e.g., for inclusion in configuration-delta messages sent to other nodes of the DAG so that the configuration changes can be processed in the correct order at the DAG nodes.

Independently of how the configuration change is approved, in some embodiments a representation of the configuration change may have to be replicated at multiple storage locations of the DCM before the change is considered complete (element 907). Saving information about the configuration change in multiple locations may be an important aspect of the DCM's functionality in embodiments in which the DCM is to serve as the authoritative source of DAG configuration information. In at least some implementations, only the change to the configuration (rather than, for example, the entire configuration) may be replicated. After the configuration change information has been saved, a set of DAG nodes to which corresponding configuration-delta messages (indicating the just-implemented change to the configuration, not necessarily the whole configuration of the DAG) are to be sent from the DCM may be identified (element 910). In some embodiments, all the DAG members (potentially including a node that is being removed from the DAG as part of the configuration change indicated in the configuration-delta message) may be selected as destinations for the configuration-delta messages. In one embodiment, only the nodes that are assumed to be current DAG members may be selected, e.g., the configuration-delta message may not be sent to a node if it is being removed or is known to have failed. In other embodiments, some subset of the members may be selected as destinations, and that subset may be responsible for propagating the configuration changes to the remaining nodes. In embodiments in which a subset of members are selected as destinations, the DCM may have to keep track of which changes have been propagated to which members at any given time. After the destination set of DAG nodes have been identified, respective configuration-delta messages may be sent to them asynchronously with respect to each other, and without requesting any pause in state transition message processing or state transition request processing (element 913). In at least some embodiments, the configuration-delta messages may include the configuration sequence number associated with the configuration change. In some implementations, a composite configuration-delta message may indicate two or more changes (e.g., a removal of a failed node and a joining of a replacement node).

Figure 10:
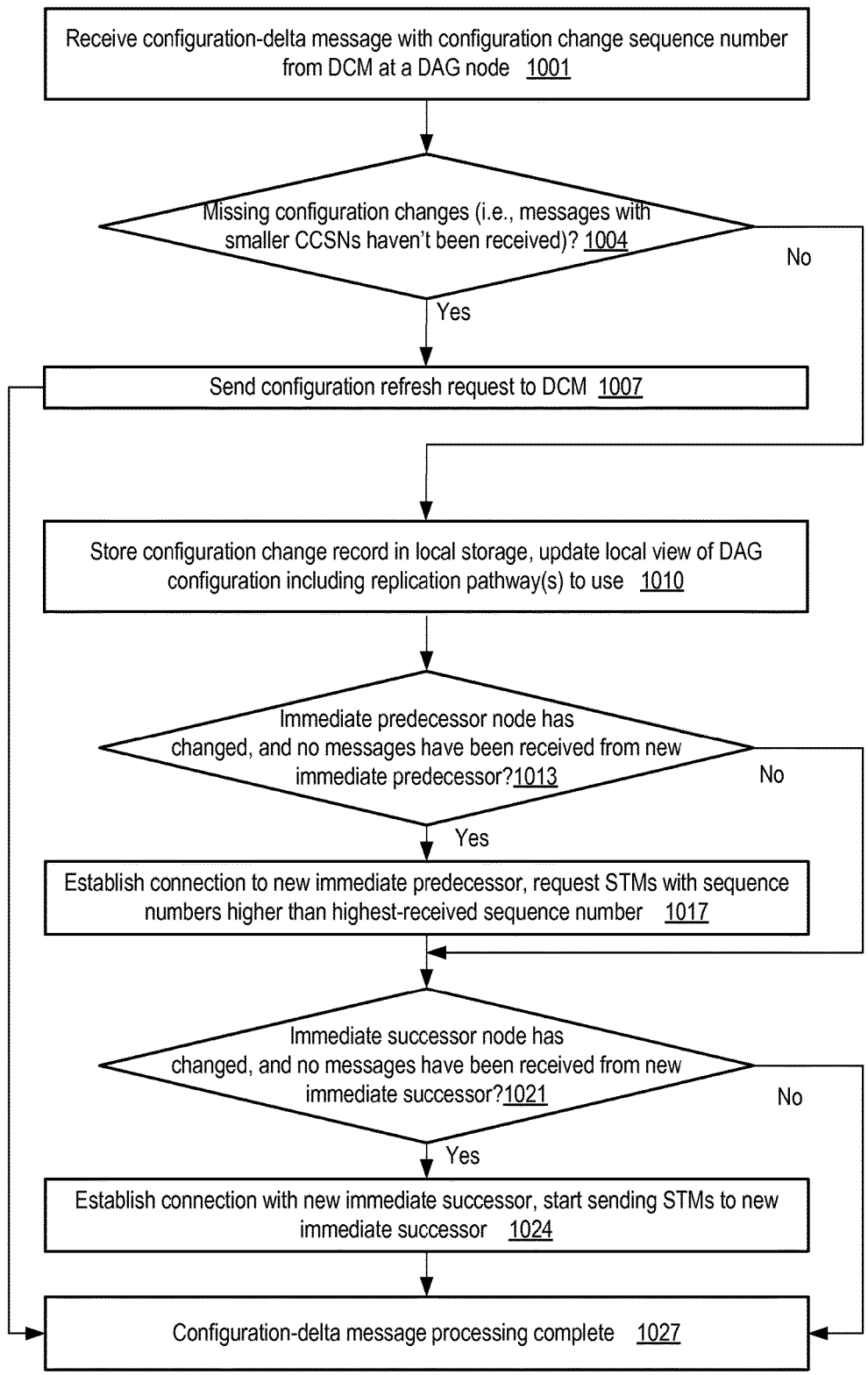
FIG. 10 is a flow diagram illustrating aspects of operations that may be performed at a member node of a replication DAG in response to receiving a configuration-delta message from a configuration manager, according to at least some embodiments.

FIG. 10 is a flow diagram illustrating aspects of operations that may be performed at a member node of a replication DAG in response to receiving a configuration-delta message from a configuration manager, according to at least some embodiments. Upon receiving such a configuration-delta message comprising a configuration change sequence number from the DCM (element 1001), the recipient DAG node may determine whether it has missed any prior configuration-delta messages in the depicted embodiment, e.g., by comparing the newly-received sequence number with the highest sequence number received previously. If the recipient determines that one or more configuration-delta messages have not yet been received (element 1004), it may send a configuration refresh request to the DCM (element 1007). Such a refresh request may result in the DCM re-sending the missed configuration-delta message or messages, for example, or in sending a different type of message in which the entire current configuration of the DAG is indicated.

If missing configuration-delta messages are not detected (also in operations corresponding to element 1004), the recipient node may store the received configuration change information in a configuration change repository in local storage. The accumulated messages in the repository may be used to update the recipient's view of the DAG configuration (element 1010). Updating the local view of the DAG configuration may include, for example, determining one or more DAG nodes and/or edges of the replication pathway or pathways to be used for future outgoing and incoming state transition messages. As mentioned earlier, because of the asynchronous nature of message delivery and because different parts of a network may experience different delays, the sequence in which configuration-delta messages are obtained at one DAG node may differ from the sequence in which the same set of configuration-delta messages are received at another node. Accordingly, the replication pathways identified at two different nodes at a given point in time may differ from each other. In the depicted embodiment, the recipient node may take further actions if either its immediate predecessor node on a replication path has changed, or if its immediate successor has changed. If neither the immediate successor nor the immediate predecessor node changes, the processing of the configuration-delta message may end after the configuration change information is stored at local storage of the recipient node (element 1027) in some embodiments.

An example of a scenario in which an immediate predecessor node is changed with respect to a node C of a DAG is the change of a portion of a replication path from A-to-B-to-C to A-to-C. If the updated configuration involves a change to an immediate predecessor node of the recipient, and no messages have yet been received directly from the new immediate predecessor node (as detected in element 1013), the recipient node (node C in the current example) may establish a connection to the new immediate predecessor (node A in the current example). In addition, in at least some embodiments, the recipient node (e.g., node C) may also send a request to the new immediate predecessor (e.g., node A) for retransmission of STMs with sequence numbers higher than the most recently-received sequence number at the recipient node (element 1017). If node C has a successor node, it may continue to transmit any pending state transition messages to such a successor node while node C waits to receive the requested retransmissions from node A.

If the configuration-delta message indicates that the immediate successor node of the recipient has changed, (e.g., when mode A receives the same example configuration-delta message discussed above, indicating that node B has left the DAG), and no message has yet been received from the new immediate successor node (element 1021), the recipient node may establish a connection to the new successor node. In the above example, node A may establish a connection to node C, its new immediate successor. State transition messages may subsequently be transferred to the new immediate successor (element 1024).

Coordinated Suspension of Replication DAG Nodes

For provider network operators, large scale failure events that can cause near-simultaneous outages of a large number of applications present a significant challenge. Customers whose applications are affected by sustained outages may lose faith in the ability of the provider networks to provide the levels of service needed for critical applications. Although the probability of large scale failure events can be lowered by intelligent infrastructure design and by implementing application architectures that can take advantage of high-availability features of the infrastructure, it may be impossible to eliminate large scale failures entirely. Techniques that can allow distributed applications to recover more quickly and cleanly from failures that affect multiple resources may therefore be developed in at least some embodiments. In some environments in which replication DAGs of the type described above are employed for distributed application state management, a coordinated suspension protocol may be used to support more effective and efficient recovery from distributed failures. In one embodiment, for example, in response to a detection of a failure scenario, some number of nodes of a DAG may be directed by the configuration manager to stop performing their normal application state transition processing operations (e.g., receiving state transition request messages, storing local copies of application state information, and transmitting state transition request messages along their replication pathway(s)). After suspending their operations, the nodes may synchronize their local application state records with other DAG nodes in at least some embodiments, perform a clean shutdown and restart. After a node restarts, it may report back to the configuration manager that it is available for resumption of service, and await re-activation of the DAG by the configuration manager.

FIG. 11a-11h collectively illustrate an example sequence of operations that may be performed at a replication DAG during such a coordinated suspension procedure, according to at least some embodiments. Each node in the illustrated DAG may store a respective set of commit records, in which each commit record includes (or indicates, e.g., via a pointer) a corresponding commit sequence number (CSN). From the perspective of the node, the local commit record set may thus represent the state of an application being managed using the DAG. Records of approved (but not yet committed) state transitions may also be kept at some or all of the nodes, as described earlier. It is noted that although the coordinated suspension technique is described herein in the context of dynamic replication DAGs in which the DCM transmits configuration-delta messages as described above to keep the DAG nodes updated regarding DAG configuration changes, a similar approach may be employed for other state replication techniques in some embodiments. For example, the coordinated suspension technique may also be used in an environment in which configuration changes to a group of replication nodes are implemented using a stop-the-world reconfiguration interval during which all the nodes are updated in a synchronized fashion, such that the replication group becomes operational only after all the nodes have been made aware of the new configuration. Thus, dynamic replication DAGs may represent just one example of multi-node state replication groups (SRGs) at which the coordinated suspension technique may be implemented in different embodiments. At least some such SRGs may have their own configuration managers analogous to the DCMs described earlier, and may have some nodes designated as committer nodes and other nodes designated as non-committer nodes.

A replication DAG comprising five nodes 1102A, 1102B, 1102C, 1102D and 1102E is shown in FIG. 11a, together with a DCM 1180. In the depicted example, committer node 1102E comprises a suspension trigger detector 1106 which determines that a coordinated suspension procedure should be initiated for the DAG. A number of different types of causes may lead to the initiation of the suspension procedure in different embodiments. For example, the suspension procedure may be initiated (a) because some threshold number of nodes may have failed (such as failures at nodes 1102B and 1102D, indicated by the "X" symbols), (b) because the rate at which configuration-delta messages are being received at the committer node (or at some other node) exceeds a threshold, (c) because the rate at which network packets or connections are being dropped at some DAG node or the DCM exceeds a threshold, and so on. The committer node 1102E in the depicted embodiment sends a DAG suspension request 1150 comprising the highest sequence number among the sequence numbers represented in the committer node's commit record set. This highest sequence number may be referred to as the highest committed sequence number (HCSN) 1108 herein, and may be used as a reference for synchronizing commit record sets among the DAG nodes during one of the steps of the suspension procedure as described below. In some embodiments, the initial determination that a suspension should be initiated may be made at one of the non-committer nodes, or at the DCM 1180 itself, and a particular commit sequence number (ideally but not necessarily the HCSN) may be chosen as the target sequence number up to which the nodes should update their commit record sets.

In response to receiving the suspension request, the DCM 1180 may save the HCSN in persistent storage 1175, as shown in FIG. 11b. The DCM may then send respective suspend commands 1152 to at least a subset of the DAG nodes, such as commands 1152A and 1152B to nodes 1102A and 1102C respectively in the depicted example scenario. In some embodiments, the DCM 1180 may send suspend commands to all the DAG nodes that are members of the DAG according to the latest DAG configuration saved at the DCM (including the nodes that may have failed, such as 1102B and 1102D). The suspend commands may include the HCSN 1108.

Figure 11C:
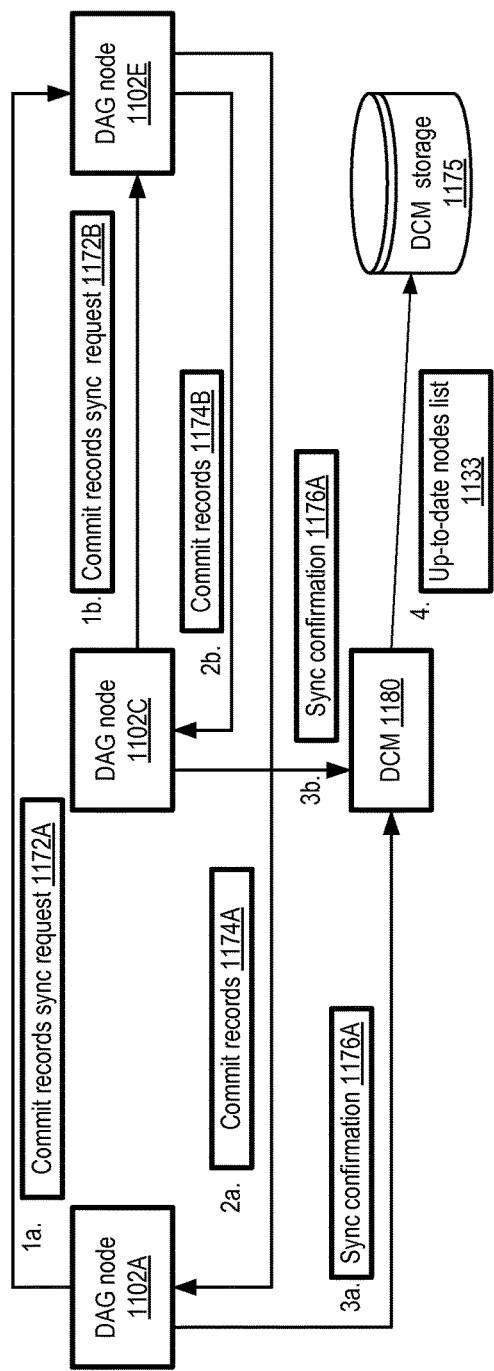

Upon receiving a suspend command, a DAG node may stop processing state transition requests/messages, and may instead begin a process to verify that its commit record set includes all the commit records up to and including the commit record corresponding to the HSCN. It may be the case, for example, that node 1102A and node 1102C may not yet have been notified by the committer node 1102E regarding one or more committed state transitions with sequence numbers less than or equal to the HCSN. In such a scenario, as shown in FIG. 11c, node 1102A may send a commit records sync request 1172B to committer node 1102E (as indicated by the arrow labeled "1a") and node 1102C may send a similar commit records sync request 1172B to node 1102E (as indicated by the arrow labeled "1b"). The commit records sync requests 1172 may respectively include an indication of which commit records are missing at the nodes from which the requests are sent—e.g., node 1102A may indicate that it already has commit records with sequence numbers up to SN1, while node 1102C may indicate that it is missing commit records with sequence numbers SN2, SN3, and SN4. The missing commit records 1174A and 1174B may then be sent to the nodes 1102A and 1102C respectively by the committer node, as indicated by the arrows labeled "2a" and "2b". Nodes 1102A and 1102C may then send respective synchronization confirmations 1176A and 1176B to the DCM 1180, as indicated by the arrows labeled "3a" and "3b". The DCM 1180 may add nodes 1102A and 1102C to a list of up-to-date nodes 1133 (i.e., nodes that have updated their commit record sets to match the commit record set of the committer node 1102E) maintained at the DCM's persistent storage 1175, as indicated by the arrow labeled "4".

Figure 11D:
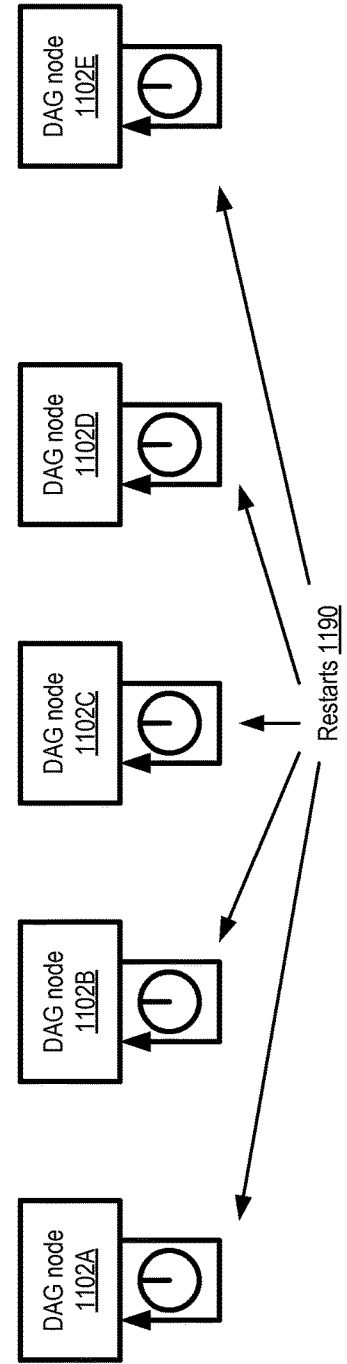

As shown in FIG. 11d, the nodes of the DAG may terminate execution and restart themselves in the depicted embodiment. The failed nodes 1102B and 1102D may restart as part of recovery from their failures, for example. As part of the coordinated suspension procedure, nodes 1102A and 1102C may save their commit record sets (and/or additional metadata pertaining to the operations of the nodes) in local storage after their commit record sets have been synchronized with that of the committer node, and then initiate a controlled restart. Node 1102E may wait for some time interval after it has sent the suspension request 1150 (allowing the committer node to respond to at least some sync requests 1172), save any state metadata to local storage, and then initiate its own controlled restart as part of the suspension procedure in the depicted embodiment.

After the DAG nodes 1102A-1102E come back online, they may each send a respective "available for service" message to the DCM 1180 in some embodiments, as shown in FIG. 11e, and await re-activation instructions to resume their application state transition processing operations. The DCM may be able to tell (using its up-to-date nodes list 1133) that the commit record sets of nodes 1102B and 1102D may not be up-to-date, and may accordingly send respective synchronization commands 1194 to nodes 1102B and 1102D, as shown in FIG. 11f. In at least some implementations the synchronization commands may indicate the HCSN 1108. In response to the synchronization commands 1194, nodes 1102B and 1102D may each send their own commit records sync requests 1172C and 1172D to nodes that are known to be up-to-date, indicating which commit records are missing in their respective commit record sets. For example, node 1102B may send its sync request 1172C to node 1102A, while node 1102D may send its sync request to node 1102E. In some embodiments, the DCM may specify the destination nodes to which the commit records sync requests should be sent. In one embodiment, all the non-committer DAG nodes may have to synchronize their commit record sets with the committer node. Nodes 1102B and 1102D may receive their missing commit records 1174C and 1174D respectively, so that eventually all the nodes have synchronized their commit record sets up to the HCSN. In some implementations, nodes 1102B and 1102D may send a confirmation to the DCM 1180 indicating that their commit record sets have been updated/synchronized. In at least one embodiment, the DCM may play a somewhat more passive role with respect to those nodes that are not in its up-to-date nodes list than described above with respect to FIG. 11*f*. In such an embodiment, when a failed node (such as 1102B or 1102D) comes back online, it sends a message to the DCM to determine whether the newly-online node is missing any commit records. The DCM may inform the node (e.g., by simply indicating the HCSN) that commit records with sequence numbers up to the HCSN are required for the node to become up-to-date. The node may then be responsible for bringing itself up-to-date and reporting back to the DCM once it has synchronized its commit records up to the HCSN. Thus, in such an embodiment, the DCM may not necessarily send a synchronization command 1194; instead, the newly-online nodes may take the initiative to synchronize their commit record sets.

Figure 11G:
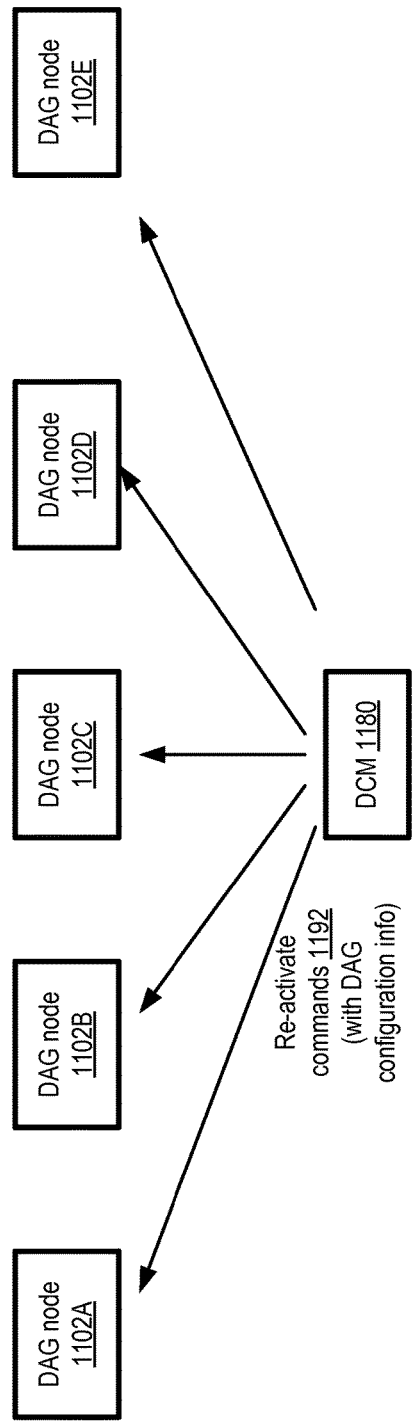
Figure 11H:
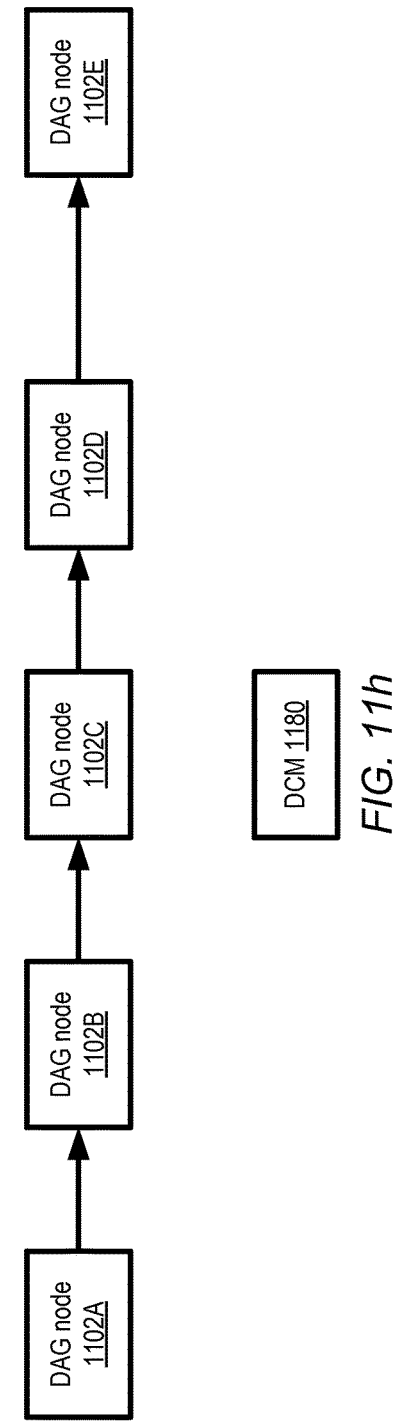

After confirming that at least a threshold number of the nodes have updated commit record sets, the DCM 1180 may determine the configuration of the post-restart DAG. In some cases, the same configuration that was in use prior to the suspension may be re-used, while in other embodiments a different configuration may be selected. For example, it may be the case that the DAG is required to have a minimum of four nodes, so only four of the nodes 1102A-1102E may be selected initially. As shown in FIG. 11*g*, the DCM 1180 may send respective re-activation messages to the selected set of nodes (all five nodes in the depicted example), indicating the current configuration of the DAG. The DAG nodes may then resume normal operations, as indicated by FIG. 11*h*. In some embodiments, at least some of the DAG nodes that did not fail (e.g., 1102A, 1102C and 1102E) may not necessarily restart themselves. Instead, after synchronizing their commit record sets, one or more of such nodes may simply defer further state transition processing until they receive a re-activation command from the DCM in such embodiments.

Figure 12:
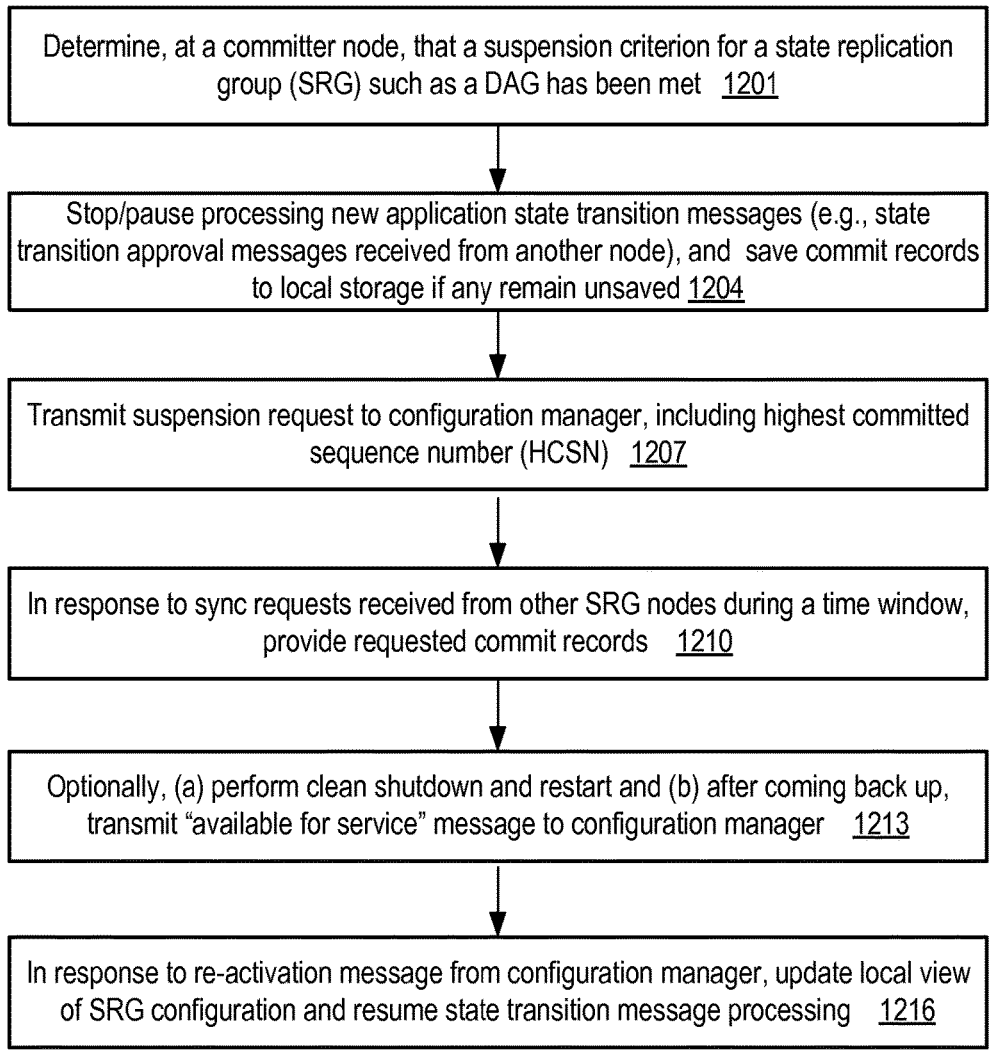
FIG. 12 is a flow diagram illustrating aspects of operations that may be performed at a committer node of a state replication group such as a replication DAG during a coordinated suspension procedure, according to at least some embodiments.

FIG. 12 is a flow diagram illustrating aspects of operations that may be performed at a committer node of an SRG such as a replication DAG during a coordinated suspension procedure, according to at least some embodiments. As shown in element 1201, the committer node may determine that a triggering criterion for a coordinated suspension of the SRG has been met. A variety of different triggering conditions may lead to a coordinated suspension, including, for example, a detection by the committer node that the number of SRG nodes that remain responsive has fallen below a threshold, or that the rate at which the SRG's configuration changes are occurring exceeds a threshold. In some cases resource workload levels or error rates may trigger the suspension—e.g., if the rate at which network packets are dropped exceeds a threshold, or if connections are being unexpectedly terminated at or above a maximum acceptable rate. In one embodiment, a non-committer node of the SRG, or a configuration manager such as the DCM, may initially detect a problem that should lead to a controlled suspension, and may inform the committer node about the problem.

After determining that controlled suspension is to be initiated, the committer node may pause or stop its normal processing/replication of state transition messages, and save any outstanding as-yet-unsaved commit records to local storage (element 1204) in the depicted embodiment. The committer node may then transmit a suspension request, including an indication of the HCSN (the highest-committed sequence number among the sequence numbers of transitions for which commit records have been stored by the committer node), to the SRG's configuration manager (e.g., the DCM in the case of a replication DAG) (element 1207). The HCSN may serve as the target commit sequence number up to which currently active nodes of the SRG are to synchronize their commit record sets.

In at least some embodiments, after it sends the suspension request, the committer node may receive some number of commit record sync requests from other SRG nodes (e.g., nodes that have determined that they do not have a full set of commit records with sequence numbers up to the HCSN) (element 1210). In the depicted embodiment, the committer node respond to any such sync requests that are received during a configurable time window. The committer node may then optionally perform a clean shutdown and restart and send an available-for-service message to the configuration manager of the SRG (element 1213). In some embodiments, the clean shutdown and restart may be omitted, and the committer node may simply send an available-for service message, or the committer node may simply defer further state transition-related processing until re-activation instructions are received from the configuration manager. Eventually, the committer node may receive a re-activation message from the configuration manager, indicating the current post-suspension configuration of the DAG, and the committer node may then resume state transition related processing (element 1216) as per the indicated configuration. In some embodiments, it may be the case that in the new, post-suspension configuration, the committer node is no longer granted the role of committer; instead, it may be configured as an acceptor node, an intermediary node or a standby node, for example.

Figure 13:
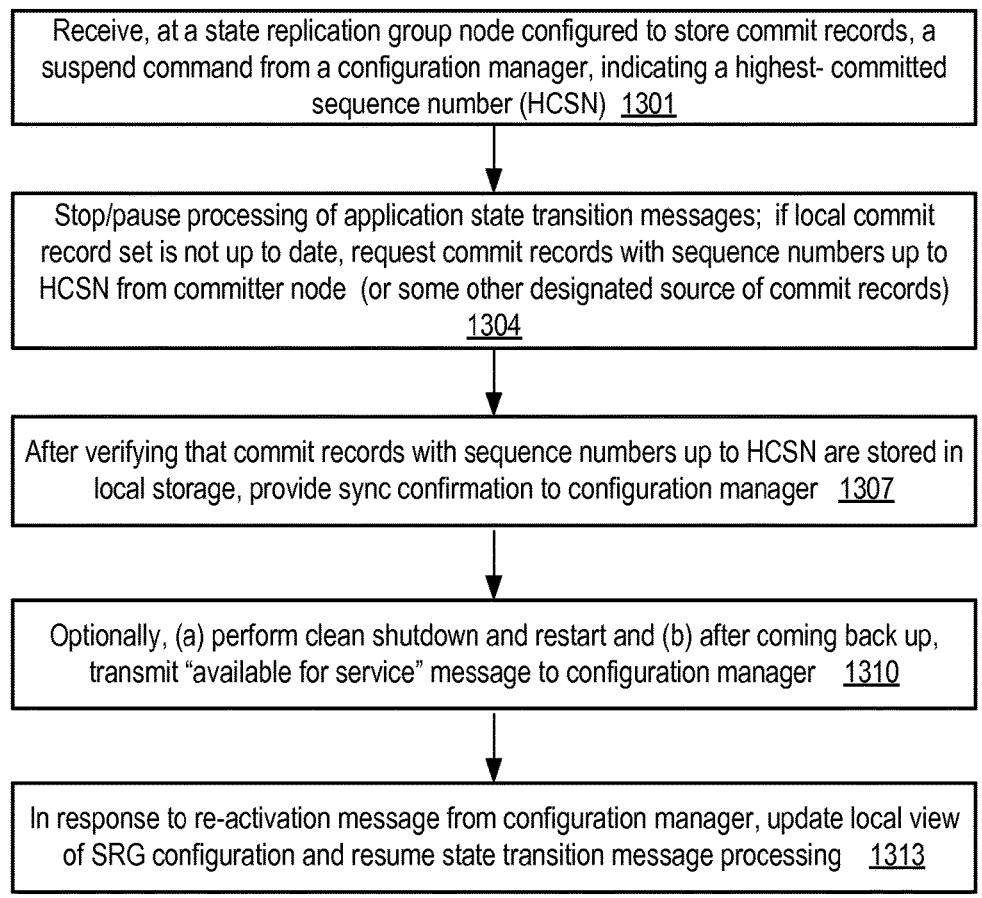
FIG. 13 is a flow diagram illustrating aspects of operations that may be performed at a non-committer node of a state replication group such as a replication DAG during a coordinated suspension procedure, according to at least some embodiments.

FIG. 13 is a flow diagram illustrating aspects of operations that may be performed at a non-committer node of a state replication group such as a replication DAG during a coordinated suspension procedure, according to at least some embodiments. During normal operations, the non-committer node may store commit records in local storage at some point after the corresponding transitions have been committed; as a result, the local commit record set of the non-committer node may not necessarily be as current as that of the committer node. As shown in element 1301, the non-committer node may receive a suspend command from the configuration manager, indicating an HCSN as the target sequence number to which the non-committer node should synchronize its local commit record set.

Upon receiving the suspend command, the non-committer node may pause or stop processing new state transition messages. If some commit records with lower sequence numbers than the HCSN are missing from the local commit record set, the non-committer node may send a commit record sync request for the missing records to the committer node (or to a different node indicated by the configuration manager as a source for missing commit records) (element 1304). If its commit record set is already up-to-date with respect to the HCSN, the non-committer node may not need to communicate with other nodes at this stage of the suspension procedure. After verifying that commit records with sequence numbers up to the HCSN are stored in local storage, the non-committer node may send a sync confirmation message to the configuration manager (element 1307) in the depicted embodiment. The non-committer node may then defer further application state transition processing until it is re-activated by the configuration manager. Optionally, the non-committer node may perform a clean shutdown and restart, and send an "available-for-service" message to the configuration manager after restarting (element 1310). In response to a re-activation message from the configuration manager, the non-committer node may update its view of the SRG configuration and resume application state transition processing (element 1313). In the post-suspension configuration, a different role may be granted to the non-committer node by the configuration manager in some cases—e.g., the non-committer node's role may be changed to a committer node.

Figure 14:
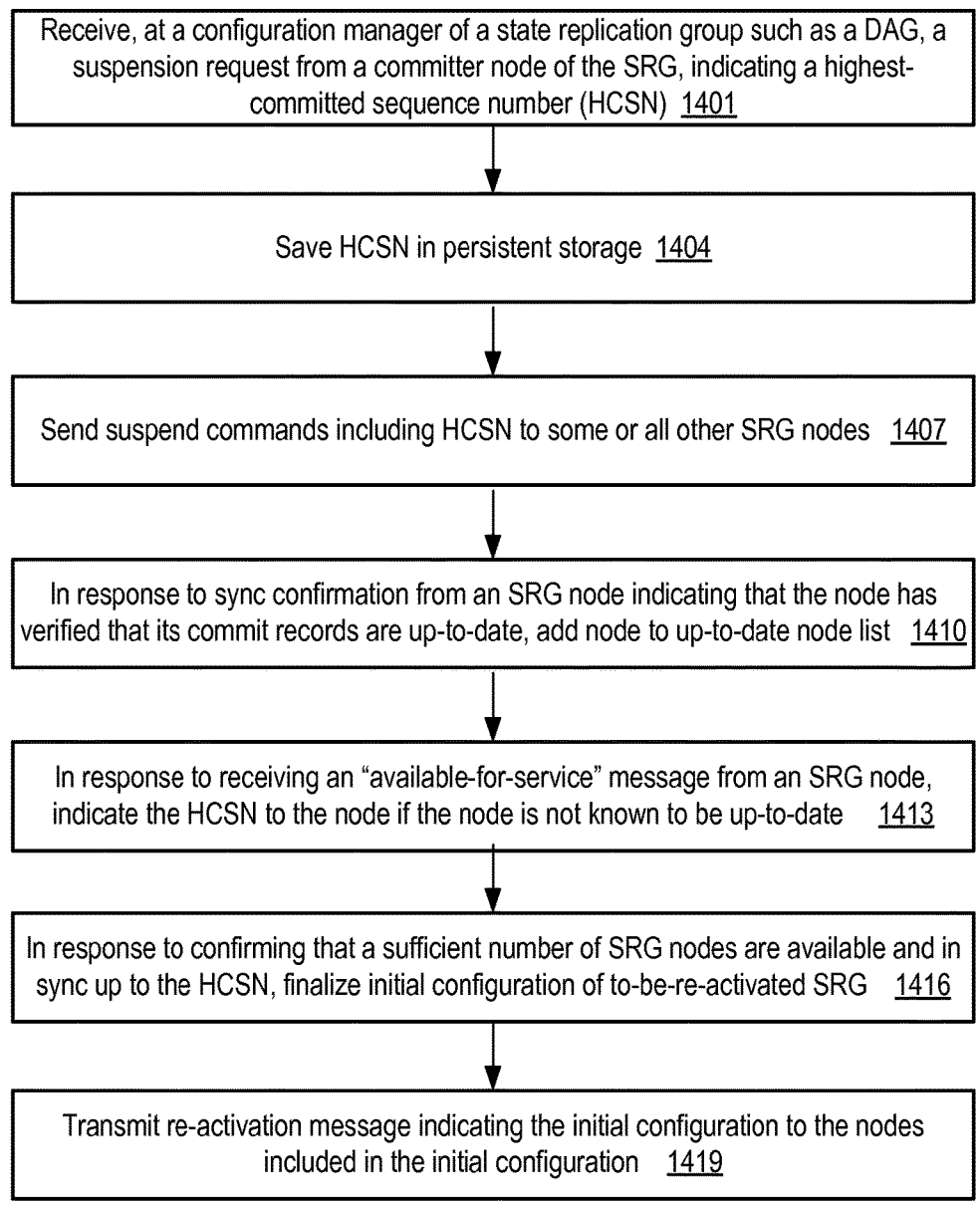
FIG. 14 is a flow diagram illustrating aspects of operations that may be performed at a configuration manager of a state replication group such as a replication DAG during a coordinated suspension procedure, according to at least some embodiments.

FIG. 14 is a flow diagram illustrating aspects of operations that may be performed at a configuration manager of a state replication group such as a replication DAG during a coordinated suspension procedure, according to at least some embodiments. As shown in element 1401, the configuration manager may receive a suspension request from a committer node of the SRG, indicating a highest-committed sequence number (HCSN) from among the sequence numbers of transitions whose commit records are stored at the committer node. In some embodiments, a consensus protocol may be employed among the various nodes of the configuration manager before the decision to suspend the SRG operations is made final. The configuration manager may store the HCSN in persistent storage (element 1404) (e.g., at respective storage devices at several nodes of a configuration manager cluster), and send suspend commands indicating the HCSN to one or more other nodes of the SRG (element 1407). In some embodiments, the suspend commands may be sent to all the known members of the SRG, including nodes that are assumed to have failed. The recipient nodes of the SRG may each verify that their local commit record sets contain commit records corresponding to the HCSN (which may in some cases require the recipient nodes to obtain missing commit records from the committer node as described above). After verifying that its commit record set is current with respect to the HCSN, a recipient of the suspend command may send the configuration manager a sync confirmation indicating that its commit record set is now up-to-date. Accordingly, upon receiving such a confirmation from an SRG node, the configuration manager may add that node to a list of up-to-date nodes (element 1410).

In some embodiments, the configuration manager may wait to receive respective messages from the SRG nodes indicating that they are available for service. Upon receiving such a message from a node (e.g., after the node has completed a clean shutdown and restart, or after the node has come back online after a failure), the configuration manager may determine whether the node is in the up-to-date nodes list or not. If the node from which the "available-for-service" indication is received is not known to be up-to-date with respect to commit records, the configuration manager may send indicate the HCSN to the node (element 1413), e.g., in an explicit synchronization command or in response to an implicit or explicit query from the node. Using the HCSN as the target sequence number up to which commit records are to be updated, the node may then update its local commit record set by communicating with other nodes that are already up-to-date. In some embodiments, the configuration manager may include, in the synchronization command, an indication of the source from which an out-of-date node should obtain missing commit records.

After the configuration manager has confirmed that a required minimum number of SRG nodes are (a) available for service and (b) up-to-date with respect to application commit state, the configuration manager may finalize the initial post-suspension configuration of the SRG (element 1416). The configuration manager may then send re-activation messages indicating the configuration to the appropriate set of nodes that are in the initial configuration (element 1419). In some embodiments, the initial configuration information may be provided to the nodes as a sequence of configuration-delta messages.

In at least some embodiments, the target sequence number selected for synchronization (i.e., the sequence number up to which each of a plurality of nodes of the SRG is to update its local set of commit records) need not necessarily be the highest committed sequence number. For example, it may be the case that the highest committed sequence number at a committer node is SN1, and due to an urgent need to suspend the SRG's operations as a result of a detection of a rapidly escalating large-scale failure event, the SRG configuration manager may be willing to allow nodes to suspend their operations after updating their commit records to a smaller sequence number (SN1-k). In some implementations, the nodes of the SRG may synchronize their commit records to some lower sequence number before suspending/restarting, and may synchronize to the highest-committed sequence number after the suspension—e.g., after the nodes restart and send "available-for-service" messages to the configuration manager. As noted earlier, in some embodiments the suspension procedures may be initiated by non-committer nodes, or by the configuration manager itself.

Log-Based Optimistic Concurrency Control for Multiple-Data-Store Transactions

Figure 15:
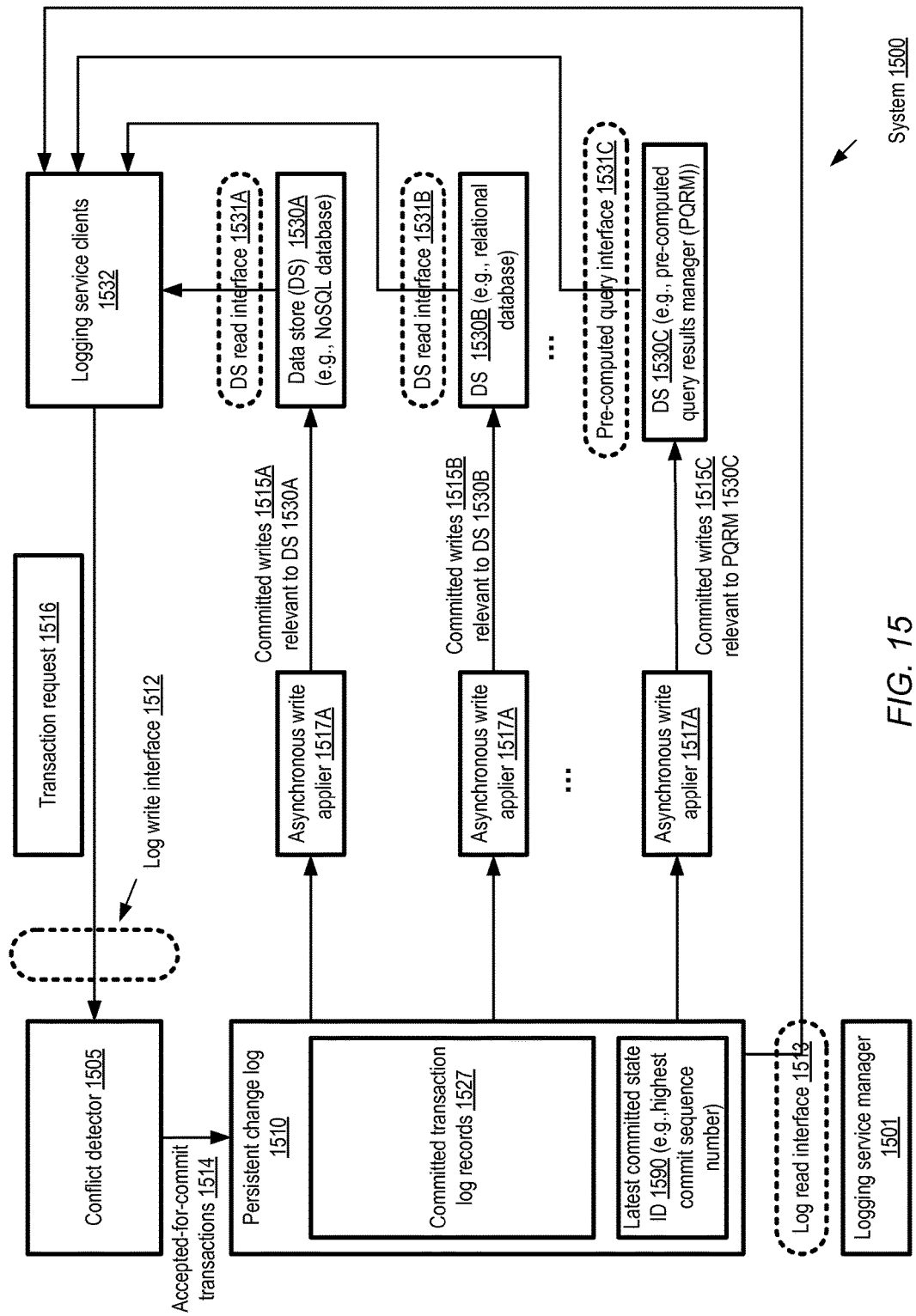
FIG. 15 illustrates an example system environment comprising a persistent change log supporting transactions that may include writes to a plurality of data stores, according to at least some embodiments.

In some embodiments, replication DAGs of the type described above may be used to implement optimistic concurrency control techniques using a logging service that enables support for transactions involving multiple independent data stores. FIG. 15 illustrates an example system environment comprising a persistent change log supporting transactions that may include writes to a plurality of data stores, according to at least some embodiments. System 1500 shows a persistent change log 1510 that may be instantiated using a logging service. One or more data stores 1530, such as data store 1530A (e.g., a NoSQL or non-relational database) and data store 1530B (e.g., a relational database) may be registered at the logging service for transaction management in the depicted embodiment. The terms "concurrency control", "transaction management", and "update management" may be used as synonyms herein with respect to the functionality provided by the logging service. The logging service may be considered one example of a plurality of storage services that may be implemented at a provider network in some embodiments.

Clients 1532 may submit registration requests indicating the set of data sources for which they wish to use log-based transaction management for a particular application in some embodiments, e.g., via an administrative or control-plane programmatic interface presented by logging service manager 1501. The persistent change log 1510 may be instantiated in response to such a registration request in some embodiments. In general, a given persistent change log instance may be created for managing transactions for one or more underlying data stores—that is, in at least some deployments log-based transaction management may be used for a single data store rather than for multiple data stores concurrently. The term "data store", as used herein, may refer to an instance of any of a wide variety of persistent or ephemeral data repositories and/or data consumers. For example, some data stores may comprise persistent non-relational databases that may not necessarily provide native support for multi-item transactions, while other data stores may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases, instances of a distributed cache, network-accessible block storage services, file system services, or materialized views. In at least one embodiment, one or more of the data stores may include components of a queueing service and/or a notification service implemented at a provider network. Entities that consume committed writes recorded by the logging service, e.g., to produce new data artifacts, may represent another type of data store, and may be referred to generically as "data consumers" herein. Such data stores may, for example, include a pre-computed query results manager (PQRM) (as in the case of data store 1530C) responsible for generating results of specified queries on a specified set of data managed via the logging service (where the specified set of data may include objects stored at one or more different other data stores). In some embodiments, snapshot managers configured to generate point-in-time snapshots of some or all committed data managed via the logging service may represent another category of data stores. Such log snapshots may be stored for a variety of purposes in different embodiments, such as for backups or for offline workload analysis. The term "data consumers" may be used herein to refer to data stores such as PQRMs and snapshot managers. At least some of the data stores may have read interfaces 1531 that differ from those of others—e.g., data store (DS) read interface 1531A of data store 1530A may comprise a different set of APIs, web-based interfaces, command-line tools or custom GUIs (graphical user interfaces) than DS read interface 1531B or pre-computed query interface 1531C in the depicted embodiment.

In the depicted embodiment, logging service clients 1532 may construct transaction requests locally, and then submit (or "offer") the transaction requests for approval and commit by the persistent change log 1510. In one implementation, for example, a client-side library of the logging service may enable a client to initiate a candidate transaction by issuing the logical equivalent of a "transaction-start" request. Within the candidate transaction, a client may perform some number of reads on a selected set of objects at data stores 1530, locally (e.g., in local memory) perform a proposed set of writes directed at one or more data stores. The client may then submit the candidate transaction by issuing the equivalent of a "transaction-end" request. The candidate transaction request 1516 may be received at a conflict detector 1505 associated with the persistent change log 1510 via the log's write interface 1512 in the depicted embodiment. In general, in at least some embodiments, a given transaction request 1516 may include one or more reads respectively from one or more data stores, and one or more proposed writes respectively directed to one or more data stores, where the set of data stores that are read may or may not overlap with the set of data stores being written. The reads may be performed using the native DS read interfaces 1531 in some embodiments (although as described below, in some scenarios clients may also perform read-only operations via the persistent change log 1510).

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In the optimistic concurrency control mechanism of the logging service illustrated in FIG. 15, no locks may have to be obtained. Instead, in the depicted embodiment, the conflict detector 1505 may determine, based at least in part on the contents of the transaction descriptor 1516 and on a set of committed transaction log records 1527 of persistent change log 1510, whether the set of data items read in the requested transaction have been updated since they were read from their respective data stores. A sequence number based technique may be used to determine whether such read-write conflicts exist in at least some embodiments, as described below in further detail. If the conflict detector 1505 determines that none of the data that was read during the transaction was overwritten, the requested transaction may be accepted for commit, and such accepted-for-commit transactions 1514 may be submitted for replication of corresponding log records at the persistent change log. The terms "approve" and "accept" may be used as synonyms herein with respect to requested transactions that are not rejected. If some of the read data was updated since the corresponding reads occurred (or if a probability that the data was updated is estimated by the conflict detector to be greater than a threshold), the requested transaction 1516 may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used.

In the case where a transaction is accepted for commit, contents of a committed transaction log record may be replicated at some number of nodes of a replication DAG associated with the persistent change log 1510 (as described below in further detail with respect to FIG. 16) in the depicted embodiment before the commit is considered successful. If the requisite number of replicas is not created, the transaction may be rejected or aborted in the depicted embodiment. The number of replicas required for a commit may vary for different applications or clients. Committed transaction log records may also be referred to herein as "commit records". In some embodiments, the requesting client 1532 may be notified when the requested transaction is committed. In at least one embodiment, the client 1532 may be informed when a transaction is rejected, so that, for example, a new transaction request may be generated and submitted for the desired updates.

For each transaction that is committed, in at least some embodiments a commit sequence number (or some other identifier indicative of the committed state of the application) may be generated and stored (e.g., as part of each of the replicas of the committed transaction log record) at the persistent change log 1532. Such a commit sequence number may, for example, be implemented as a counter or as a logical timestamp, as discussed above with respect to the sequence numbers used at replication DAGs for state transitions. The commit sequence number may be determined, for example, by the conflict detector in some embodiments, or at a different component of the persistent change log (such as the committer node of the replication DAG being used) in other embodiments. In the depicted embodiment, after a given transaction is committed and its commit record is stored at the persistent change log, the writes of the transaction may be applied or propagated to one or more of the data stores 1530 to which they were directed (or, as in the case of the PQRM 1530C, where the written data is to be consumed). In some implementations, the writes may be pushed in an asynchronous fashion to the targeted data stores 1530. Thus, in such implementations, there may be some delay between the time at which the transaction is committed (i.e., when the required number of replicas of the commit record have been successfully stored) and the time at which the payload of a particular write operation of the committed transaction reaches the corresponding data store. In the embodiment shown in FIG. 15, respective asynchronous write appliers 1517 may be used to propagate some or all of the writes to relevant data stores. For example, write applier 1517A is configured to apply writes 1515A that are relevant to or data store 1530A, write applier 1517B pushes writes relevant to data store 1530B, and write applier 1517C pushes writes that are to be consumed at data store 1530C. In some implementations, the write appliers may comprise subcomponents (e.g., threads or processes) of the persistent change log 1510, while in other implementations, write appliers 1517 may be implemented as entities external to the persistent change log. In some embodiments, a given write applier 1517 may be responsible for propagating writes to more than one data store 1530, or a single data store 1530 may receive writes from a plurality of write appliers 1517. In at least one implementation, a pull technique may be used to propagate written data to the data stores—e.g., one or more data stores 1530 may submit requests for writes to the persistent change log 1510 or the write appliers, instead of being provided written data at the initiative of the write appliers. After the data written during a transaction is applied to the corresponding data stores, clients 1532 may be able to read the updated data using the respective read interfaces of the data stores. In some embodiments, at least one of the write appliers may be capable of performing synchronous writes (e.g., either when explicitly directed to do so by the logging service, or for all the writes for which the applier is responsible). For example, a client may wish to ensure that at least one write of a given transaction (such as a write directed to a "master" data store among the plurality of data stores involved in the transaction) has been applied before the client is informed that the transaction has been committed. The specific writes to be performed synchronously may be indicated in the transaction request 1516 in some embodiments.

In some embodiments, as described below in further detail, a given transaction request 1516 may include respective indicators of a read set of the transaction (i.e., information identifying the set of data objects read during the transaction), the write set of the transaction (i.e., information identifying the set of data objects that are to be updated/written if the transaction is committed), the write payload (i.e., the set of data bytes that are to be stored for each write), and/or a conflict check delimiter (an indication of a subset of the committed transaction log records that should be examined to accept/reject the transaction). Some or all of these constituent elements of a transaction request may be stored within the corresponding commit record, together with the commit sequence number for the transaction. In at least one embodiment, the persistent change log 1510 may provide an identifier 1590 of the latest committed state of the application (such as the highest commit sequence number generated thus far), e.g., in response to a query from a data store or a query from a logging service client. The write appliers may indicate the commit sequence numbers corresponding to the writes that they apply at the data stores in the depicted embodiment. Thus, at any given point in time, a client 1532 may be able (e.g., by querying the data store) to determine the commit sequence number corresponding to the most-recently-applied write at a given data store 1530.

In at least some embodiments, during the generation of a transaction request (e.g., by a client library of the logging service), the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 1516. The conflict detector may identify commit records with sequence numbers greater than SN1 as the set of commit records to be examined for read-write conflicts for the requested transaction. If any of the write sets of the identified commit records overlaps with the read set of the requested transaction, the transaction may be rejected/aborted; otherwise, the transaction may be approved for commit in this example scenario.

In the depicted embodiment, the logging service may expose one or more programmatic log read interfaces 1513 (e.g., APIs, web-pages, command-line utilities, GUIs, and the like) to enable clients 1532 to read log records directly. In other embodiments, such read APIs allowing direct access to the change log 1510 may not be implemented. The ability to directly access log records indicating specific transactions that have been committed, and to determine the order in which they were committed, may enable new types of analyses to be performed in some embodiments than may be possible from accessing just the data stores directly (since at least some of the data stores may typically only allow readers to see the latest-applied versions of data objects, and not the histories of data objects).

The optimistic concurrency control mechanism illustrated in FIG. 15 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the log-based approach described above, a single transaction that encompasses writes to multiple locations of the non-relational data store (and/or other data stores as well) may be supported with relative ease. A persistent change log 1510, together with the associated conflict detector 1505, may be referred to as a log-based transaction manager herein. In some embodiments, the write appliers 1517 may also be considered subcomponents of the transaction manager.

Figure 16:
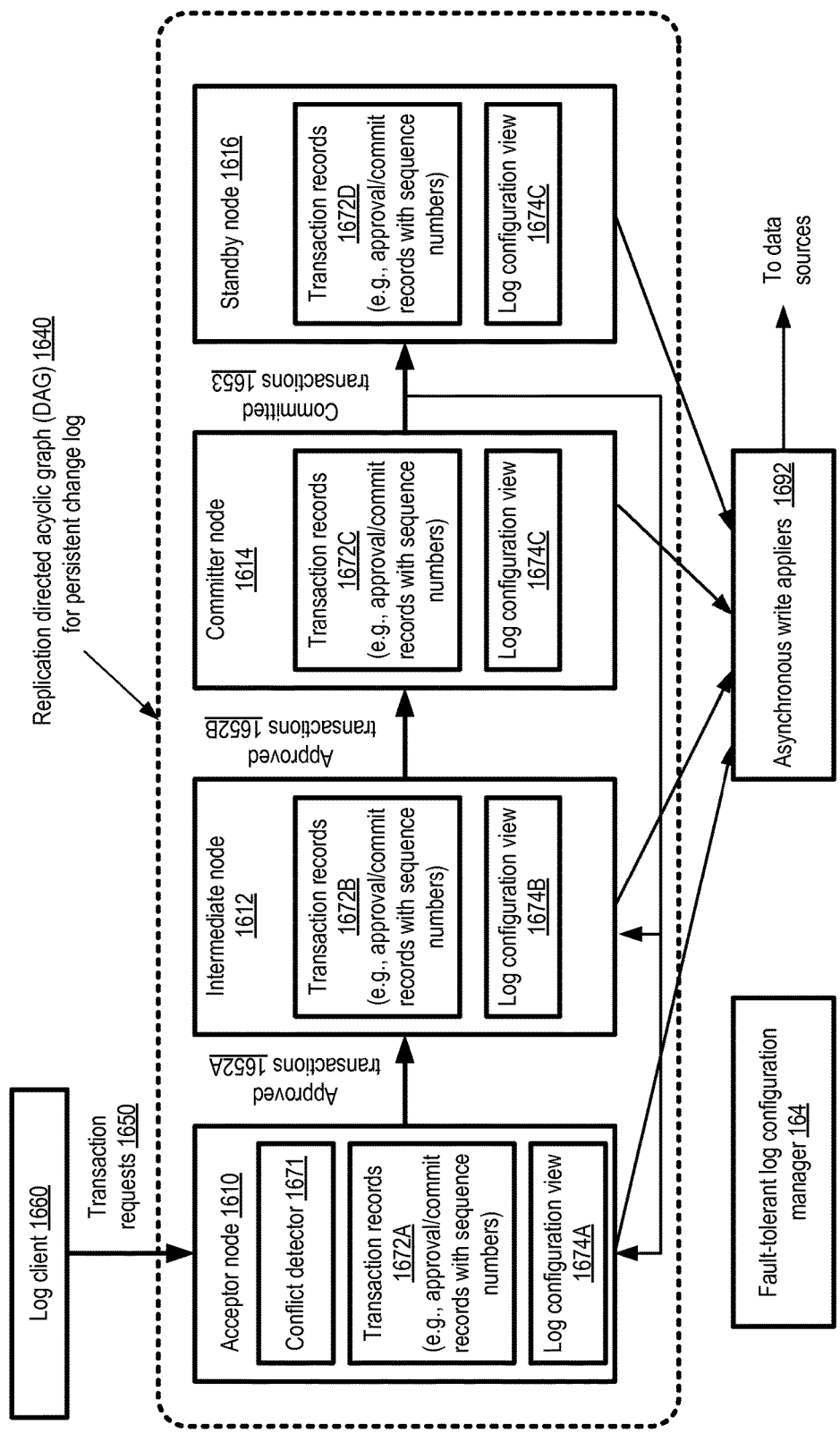
FIG. 16 illustrates an example implementation of a persistent change log using a replication DAG, according to at least some embodiments.

As mentioned above, the persistent change log 1510 may be implemented using the replication DAG described earlier in some embodiments. FIG. 16 illustrates an example implementation of a persistent change log using a replication DAG 1640, according to at least some embodiments. In the depicted embodiment, the application state transitions managed by the DAG correspond to transactions requested by log client 1660 as part of an application that includes reads and writes directed to a set of one or more data stores. The state of the application may be modeled as a respective set of transaction records 1672 stored in local storage at acceptor node 1610, intermediate node 1612, committer node 1614 and standby node 1616, with a current replication path comprising nodes 1610, 1612 and 1614. In some implementations, separate transaction records for approval (i.e., indicating that the requested transaction has been approved for commit) and commit may be stored, while in other embodiments, a single transaction record may be stored with a field that indicates whether the transaction has been committed or not. A sequence number or logical timestamp may be stored as part of, or indicated by, at least some of the transaction records in the depicted embodiment.

The decision as to whether a requested transaction 1650 is to be approved for commit may be made by a conflict detector implemented at the acceptor node 1610 in the depicted embodiment, although in other embodiments the conflict detector may be implemented outside the replication DAG. A fault-tolerant log configuration manager 164 may send configuration-delta messages asynchronously to the DAG nodes 1610, 1612, 1614 and 1616, with each such message indicating a change to the DAG configuration rather than the entire configuration of the DAG, and without requiring the DAG nodes to pause processing the stream of incoming transaction requests submitted by client 1660. Each DAG node may independently process or aggregate the configuration-delta messages received to arrive at its respective view 1674 (e.g., view 1674A at node 1610, view 1674B at node 1612, view 1674C at node 1614, and view 1674D at node 1616) of the current DAG configuration. At least some of the views 1674 may differ from those at other nodes at a given point in time; thus, under normal operating conditions, the different DAG nodes may not need to synchronize their view of the DAG configuration with each other. Messages 1652A and 1652B indicating approved (but not yet committed) transactions may be transmitted from acceptor node 1610 and intermediate node 1612 respectively along the replication pathway. In the depicted embodiment, committer node 1614 may transmit messages 1653 indicating commits to the acceptor and intermediate nodes as well as to standby node 1616. Asynchronous write appliers 1692, shown in the embodiment of FIG. 16 as entities outside the replication DAG, may propagate writes from various committed transaction records to the appropriate data stores or data consumers. In other embodiments, the write appliers may be implemented within the replication DAG, e.g., as respective processes running within the DAG nodes. In some implementations, only a subset of the DAG nodes may be read by the appliers 1692 in order to propagate committed writes to their destination data sources or consumers. In other embodiments, as shown in FIG. 16, the appliers may read committed transaction records from any of the DAG nodes to push the contents of the write payloads as described earlier.

Transaction Request Elements

Figure 17:
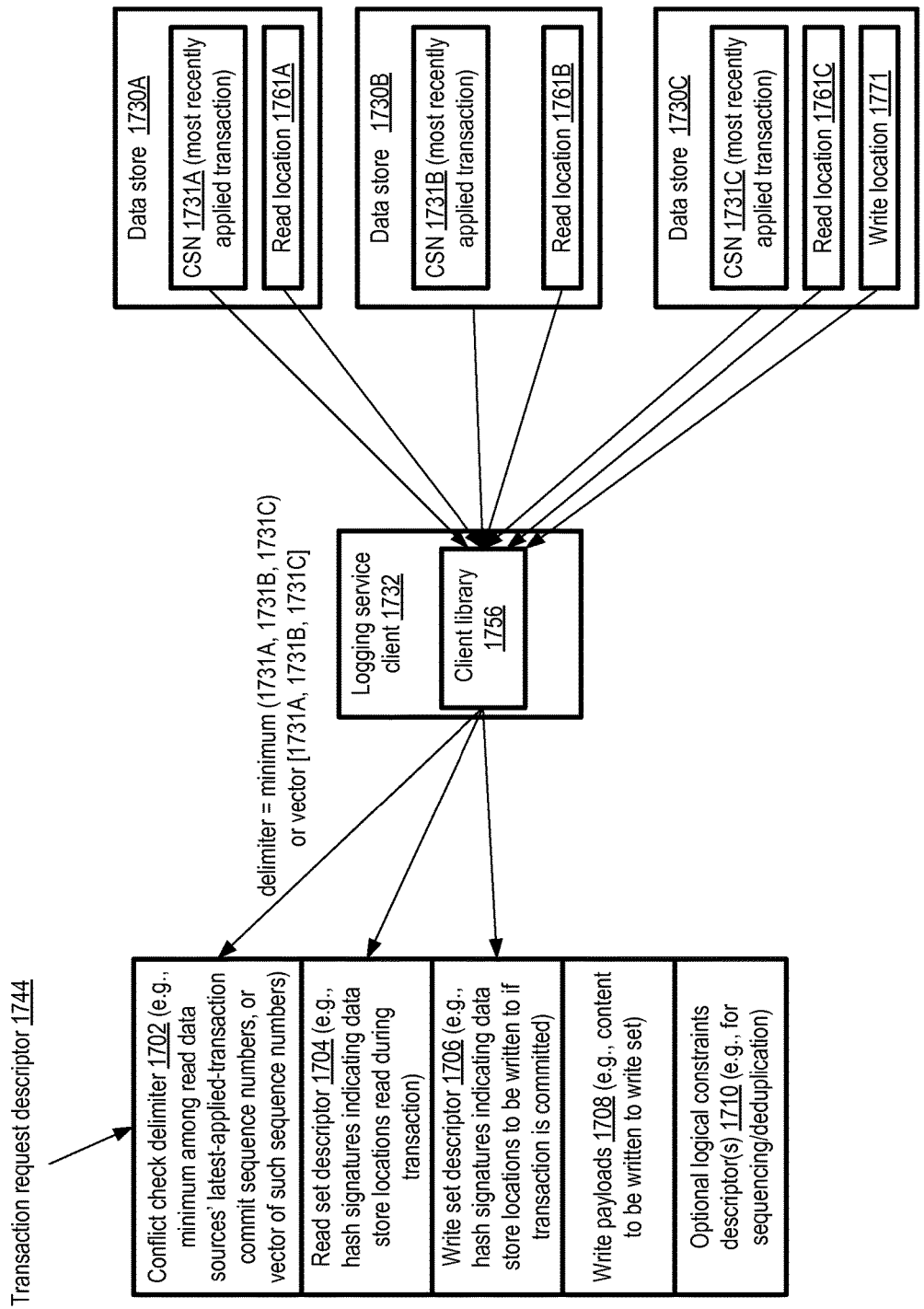
FIG. 17 illustrates example component elements of a transaction request descriptor that may be submitted by a client of a logging service, according to at least some embodiments.

FIG. 17 illustrates example component elements of a transaction request descriptor 1744 that may be submitted by a client 1732 of a logging service, according to at least some embodiments. As shown, transaction descriptor 1744 may include conflict check delimiter 1702, read set descriptor 1704, write set descriptor 1706, write payload(s) 1708, and optional logical constraint descriptors 1710 in the depicted embodiment. In the example shown, logging service client 1732 comprises a client library 1756 which may be utilized to assemble the transaction request descriptor. In at least some embodiments, the client library may automatically record the read locations 1761A 1761B, and 1761C respectively within data stores 1730A, 1730B and 1730C from which data is read during the transaction, and/or the write location 1771 (of data store 1730C in the depicted example) to which data is written. In some implementations, the client library 1756 may also obtain, from each of the data sources 1730, a corresponding commit sequence number (CSN) of the most recent transaction whose writes have been applied at the data store most recently. In one embodiment, such CSNs may be retrieved before any of the reads of the transaction are issued to the corresponding data stores, for example. In another embodiment, the CSNs may be retrieved from a given data store 1730 just before the first read that is directed to that data store within the current transaction is issued.

In the depicted embodiment, the conflict check delimiter 1702 may be derived from a function to which the most-recently-applied CSNs are provided as input. For example, in one implementation, the minimum sequence number among the CSNs obtained from all the data stores read during the transaction may be used. In another implementation, a vector or array comprising the CSNs from each of the data stores may be included as the conflict check delimiter 1702 of the transaction request descriptor. The conflict check delimiter 1702 may also be referred to herein as a committed state identifier (CSI), as it represents a committed state of one or more data stores upon which the requested transaction depends. In some embodiments, a selected hash function may be applied to each of the read locations 1761A, 1761B or 1761C to obtain a set of hash values to be included in read descriptor 1704. Similarly, a selected hash function (either the same function as was used for the read descriptor, or a different function, depending on the implementation) may be applied to the location of the write(s) of a transaction to generate the write set descriptor 1706. In other embodiments, hashing may not be used; instead, for example, an un-hashed location identifier may be used for each of the read and write set entries. The write payload 1708 may include a representation of the data that is to be written for each of the writes included in the transaction. Optional logical constraints 1710 may include signatures used for duplicate detection/elimination and/or for sequencing specified transactions before or after other transactions, as described below in further detail. Some or all of the contents of the transaction request descriptor 1744 may be stored as part of the transaction state records (e.g., approved transaction records and/or committed transaction records) replicated at the persistent change log 1510 in some embodiments.

It is noted that the read and write locations from which the read descriptors and write descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used.

In various embodiments, the transaction manager may be responsible, using the contents of a transaction request and the persistent change log, for identifying conflicts between the reads indicated in the transaction request and the writes indicated in the log. For relatively simple read operations, generating a hash value based on the location that was read, and comparing that read location's hash value with the hash values of writes indicated in the change log may suffice for detecting conflicts. For more complex read requests in some embodiments, using location-based hash values may not always suffice. For example, consider a scenario in which a read request R1 comprises the query "select product names from table T1 that begin with the letter 'G'", and the original result set was "Good-product1". If, by the time that a transaction request whose write W1 is dependent on R1's results is examined for acceptance, the product name "Greatproduct2" was inserted into the table, this would mean that the result set of R1 would have changed if R1 were re-run at the time the transaction acceptance decision is made, even though the location of the "Good-product1" data object may not have been modified and may therefore not be indicated the write records of the log. To handle read-write conflicts with respect to such read queries, or for read queries involving ranges of values (e.g., "select the set of product names of products with prices between $10 and $20"), in some embodiments logical or predicate-based read set descriptors may be used. The location-based read set indicators described above may thus be considered just one example category of result set change detection metadata that may be used in various embodiments for read-write conflict detection.

Read-Write Conflict Detection

Figure 18:
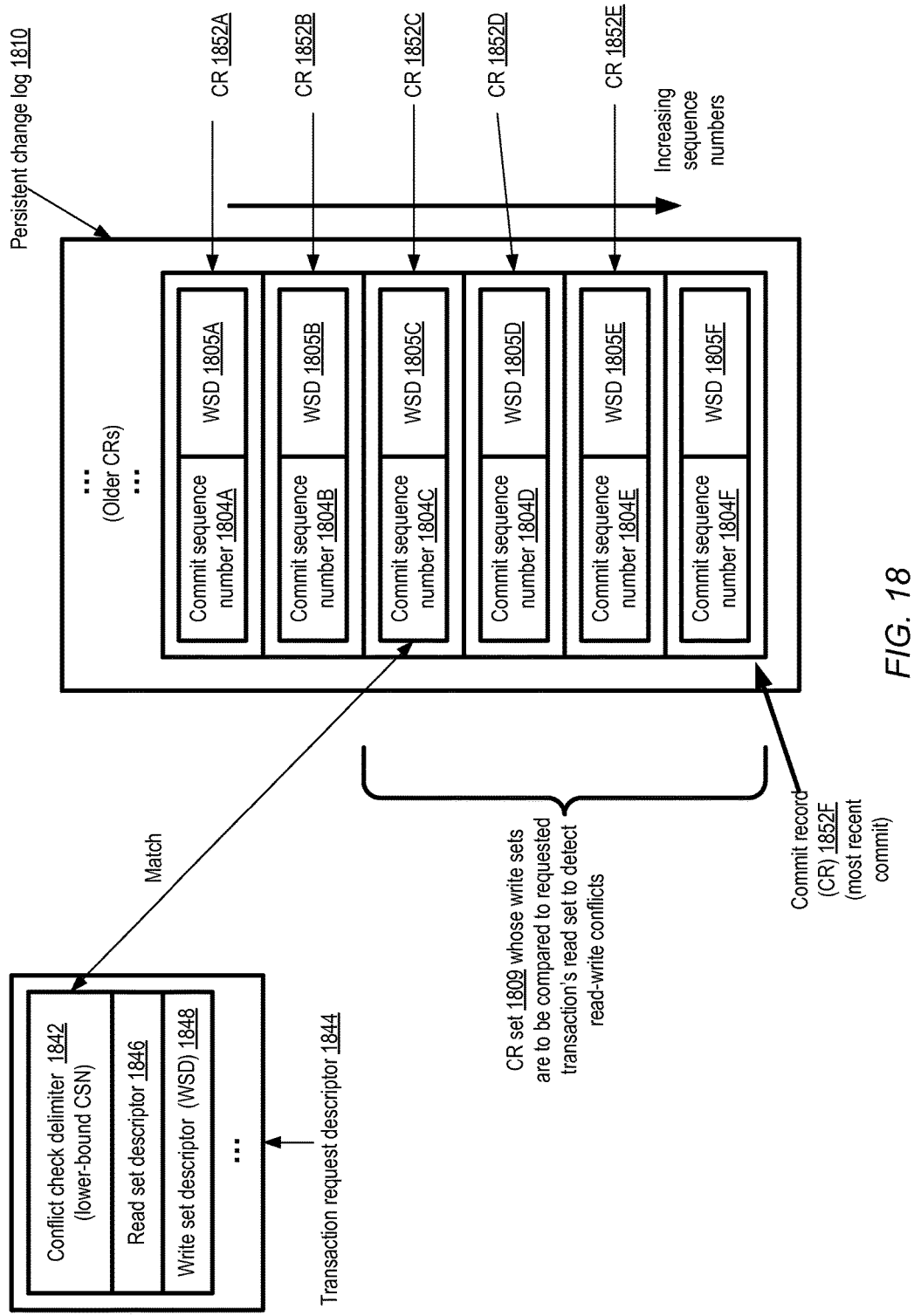
FIG. 18 illustrates an example of read-write conflict detection at a log-based transaction manager, according to at least some embodiments.

FIG. 18 illustrates an example of read-write conflict detection at a log-based transaction manager, according to at least some embodiments. In the depicted example, transaction commit records (CRs) 1852 stored at persistent change log 1810 are shown arranged in order of increasing commit sequence numbers from the top to the bottom of the log. The latest or most recently committed transaction is represented by CR 1852F, with commit sequence number (CSN) 1804F and write set descriptor (WSD) 1805F. Each of CRs 1852A, 1852B, 1852C, 1852D and 1852E comprise a corresponding CSN 1804 (e.g., CSNs 1804A-1804E respectively) and a corresponding WSD 1805 (e.g., WSDs 1805A-1805E).

As shown, transaction request descriptor 1844 includes a conflict check delimiter (or committed state identifier) 1842, a read set descriptor 1846 and a write set descriptor 1848. (The write payload of the requested transaction is not shown). The conflict detector of the log-based transaction management system may be required to identify a set of CRs of log 1810 that are to be checked for conflicts with the read set of the requested transaction. The conflict check delimiter 1842 indicates a lower-bound CSN that may be used by the conflict detector to identify the starting CR of set 1809 to be examined for read-write conflicts with the requested transaction in the depicted embodiment, as indicated by the arrow labeled "Match". Set 1809 may include all the CRs starting with the matching sequence number up to the most recent committed transaction (CR 1852F) in some embodiments. If any of the writes indicated by the CR set 1809 overlap with any of the reads indicated in the transaction request 1844, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set descriptor 1846 conflicts with a write indicated in the CR set 1809, thereby avoiding a sequential scan of the CR set. In some implementations, a sequential scan of CR set 1809 may be used, e.g., if the number of records in the CR set is below a threshold. If none of the writes indicated in CR set 1809 overlap with any of the reads of the requested transaction, the transaction may be accepted, since none of the data that were read during the preparation of the transaction request can have changed since they were read. In at least one embodiment, a transaction request descriptor may also indicate an upper bound on the sequence numbers of transaction records to be checked for conflicts—e.g., the conflict check delimiter may indicate both a starting point and an ending point within the set of CS 1852.

Methods for Optimistic Log-Based Concurrency Control

Figure 19:
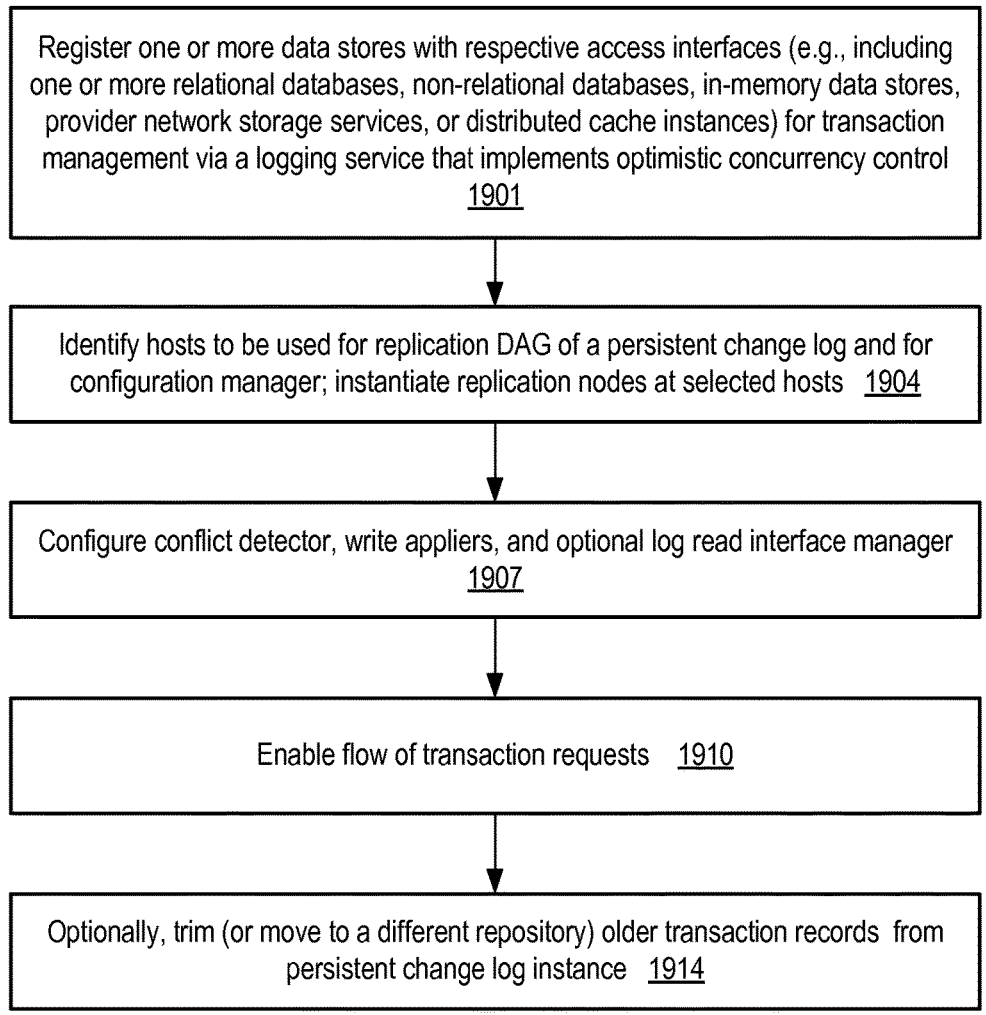
FIG. 19 is a flow diagram illustrating aspects of control-plane operations that may be performed at a logging service, according to at least some embodiments.

FIG. 19 is a flow diagram illustrating aspects of controlplane operations that may be performed at a logging service, according to at least some embodiments. At least some of the administrative or configuration-related operations shown may be performed by a logging service manager 1501 such as that illustrated in FIG. 15, e.g., in response to invocations of one or more administrative programmatic interfaces implemented at the logging service. As shown in element 1901, one or more data stores may be registered for transaction management via a logging service that implements an optimistic concurrency control mechanism, e.g., using the read-write conflict detection approach described above. Transaction management for a variety of types of data stores with respective distinct read interfaces may be implemented using a log-based approach in different embodiments, including for example instances of relational databases, non-relational databases, in-memory databases, provider network-implemented storage services, distributed cache components, pre-computed query results managers, snapshot managers, queueing services, notification services, and so on. In some embodiments, some or all of the underlying data stores managed using a given log instance may not support at least some of the ACID properties (atomicity, consistency, isolation and durability) that are supported by some traditional relational database systems.

The logging service may identify a set of hosts to be used for replication DAG nodes of a persistent change log to be implemented for the registered data stores (element 1904), e.g., with the help of a provisioning service implemented at a provider network. One or more hosts may also be identified for a configuration manager for the replication DAG—for example, as described earlier, a cluster of nodes utilizing a consensus-based protocol for implementing DAG configuration changes may be used in some implementations. Replication nodes and the configuration manager may be instantiated at the selected hosts. Other components of the log-based transaction management mechanism, including the conflict detector, one or more write appliers and an optional read interface manager for the persistent change log may be configured (element 1907). The read interface manager for the log may be responsible in some embodiments for responding to read requests submitted directly to the log (instead of being submitted to the read interfaces of the registered data stores). The write appliers may be instantiated, in one example implementation as respective processes or threads that subscribe to notifications when transactions are committed at the log. The conflict detector may comprise a module that utilizes the read interface of the log in some embodiments. Configuration of the conflict manager may include, for example, establishing the order in which read-write conflicts are identified versus constraint checking operations corresponding to de-duplication or sequencing, the manner in which responses to clients are provided (e.g., whether and how clients are informed regarding transaction rejections/commits), and so on. In some embodiments, conflict detectors, write appliers and/or log read interface managers may be implemented in a multi-tenant fashion—e.g., a given conflict detector, write applier or read interface manager may provide its services to a plurality of clients for whom respective log instances have been established.

After the various components of the persistent change log have been configured, the flow of transaction requests from clients may be enabled (element 1910), e.g., by providing the appropriate network addresses and/or credentials to the clients. In at least some embodiments, the control-plane operations performed at the logging service may include trimming or archiving portions of the stored transaction state records (element 1914). In some such embodiments, for example, when the amount of storage used for transaction records of a given persistent change log crosses a threshold, some number of the oldest transaction records may be copied to a different storage facility (such as a provider network storage service, or a slower set of storage devices than are used for the recent set of transaction records). In another embodiment, the oldest transaction records may simply be discarded. In at least one embodiment, other control-plane operations may be performed as needed, such as switching between one instance of a persistence change log and another—e.g., when the first change log reaches a threshold population of records.

Figure 20:
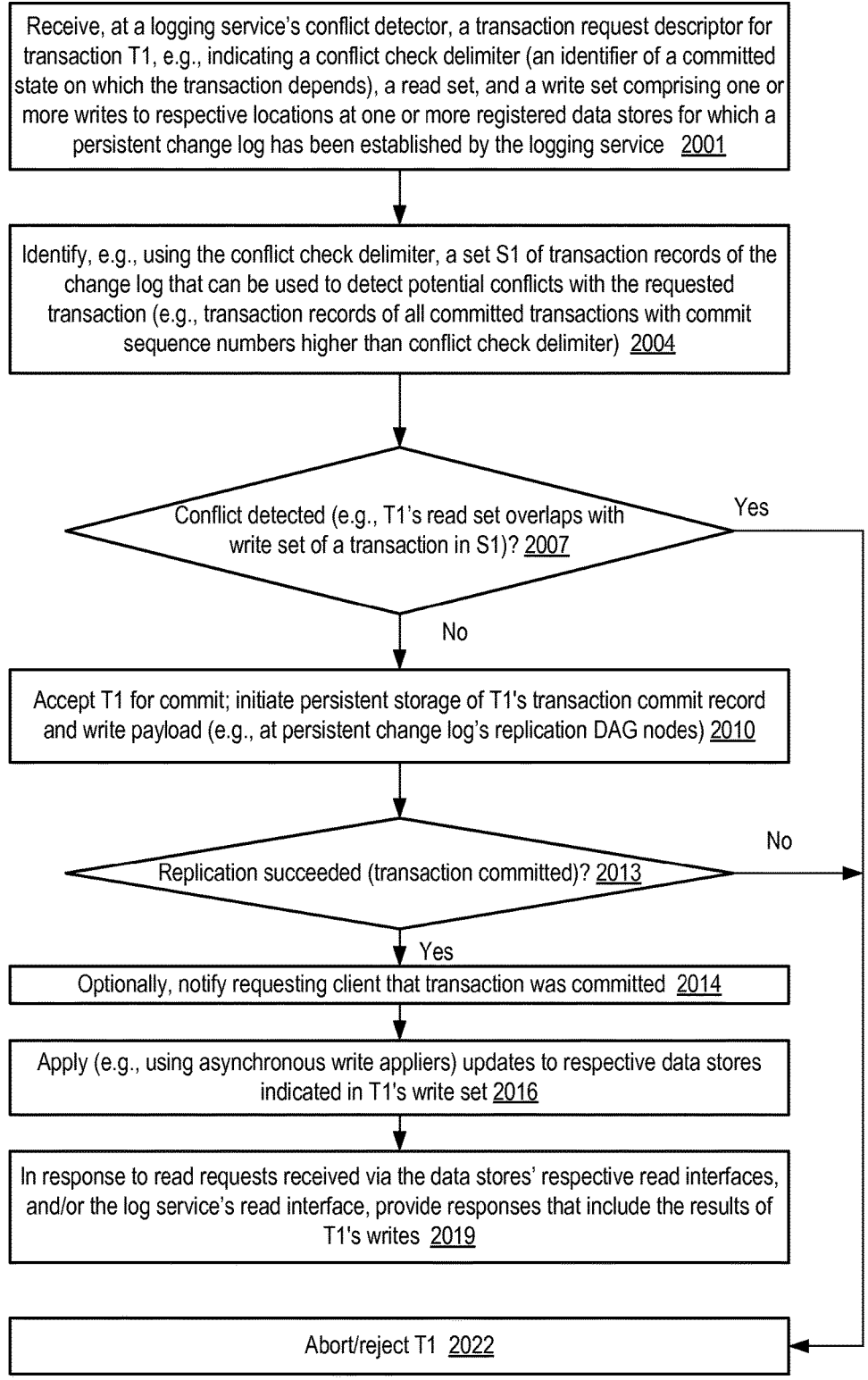
FIG. 20 is a flow diagram illustrating aspects of operations that may be performed at a logging service in response to a transaction request received from a client, according to at least some embodiments.

FIG. 20 is a flow diagram illustrating aspects of operations that may be performed at a logging service in response to a transaction request received from a client, according to at least some embodiments. As shown in element 2001, a logging service's conflict detector may receive a transaction request descriptor of transaction T1, e.g., indicating a conflict check delimiter, a read set, and a write set comprising one or more writes to respective locations at one or more data stores for which a persistent change log has been established by the logging service. The conflict check delimiter may indicate a committed state of one or more source data stores from which the results of the reads of the transaction were obtained, and may therefore serve as a committed state identifier (CSI). CSIs may also be referred to as "snapshot sequence numbers" in some environments, as they may correspond to a point-in-time logical snapshot of the source data stores. A set S1 of transaction records stored at the persistent change log may be identified for checking potential conflicts with the requested transaction (element 2004), e.g., using the conflict check delimiter and the sequence numbers of the transaction records stored in the log. Such a set S1 may include, for example, all the records of transactions that have commit sequence numbers higher than a sequence number indicated in the conflict check delimiter in one embodiment.

If a read-write conflict is detected (element 2007), e.g., if the read set of the requested transaction overlaps at least partly with the write set of one of the transactions of set S1, the transaction T1 may be rejected or aborted (element 2022). In some embodiments, hash functions may be used to determine whether such overlaps exist—e.g., if the read set hashes to the same value as a write set, a conflict may be assumed to have occurred. In some implementations, an indication or notification of the rejection may be provided to the client from which the transaction request was received, enabling the client to retry the transaction by generating and submitting another request descriptor. If a conflict is not detected (as also determined in element 2007), T1 may be accepted for commit (element 2010). In the depicted embodiment, replication of T1's transaction record may be initiated to persistent storage, e.g., at a plurality of replication DAG nodes of the log. In some embodiments, an acceptance sequence number may be assigned to T1 when it is accepted for commit, and may be stored together with contents of at least some of the transaction request descriptor elements in each replica. In at least one embodiment, the acceptance sequence number may serve as a commit sequence number if the transaction eventually gets committed.

Depending on the data durability needs of the application whose transactions are being managed, a threshold number of replicas may have to be stored before the transaction T1's commit is complete. If a sufficient number of replicas are saved (as determined in element 2013), the commit may be deemed successful, and the requesting client may be notified in some embodiments regarding the commit completion (element 2014). If for some reason the number of replicas that can be saved to persistent storage is below the required threshold (as also detected in element 2013), the transaction may be aborted/rejected (element 2022). After T1 commits, in the depicted embodiment the write operations indicated in T1's write set may be applied to the corresponding data stores or data consumers, e.g., by asynchronous write appliers (element 2016). In some embodiments, at least one of the write appliers may be synchronous—e.g., a client may be notified that the transaction has been committed only after such a synchronous write applier completes the subset of the transaction's writes for which updates are to be applied synchronously. After the updates have been applied, the updated data elements may be read in response to client read requests received via the respective data stores' read interfaces (element 2019). In addition to the read interfaces supported by the various registered data stores, in at least some embodiments the persistent change log may itself be queried directly for transaction record contents, e.g., via a programmatic query/read interface of the logging service. In some implementations, reads directed to the log via such a logging service interface may be able to see the results of write operations more quickly in some cases than reads directed to the data stores, since the data stores may rely on asynchronous appliers to propagate the writes that are already present in the log. In some embodiments, synchronous appliers may be used, which propagate writes to the data stores as soon as the transaction is committed at the log. In other embodiments, each applier may have a configurable time window within which writes have to be propagated to the corresponding data store or consumer, so that it becomes possible to adjust the maximum delay between a transaction commit and the appearance of the transaction's modified data at the data stores.

Figure 21:
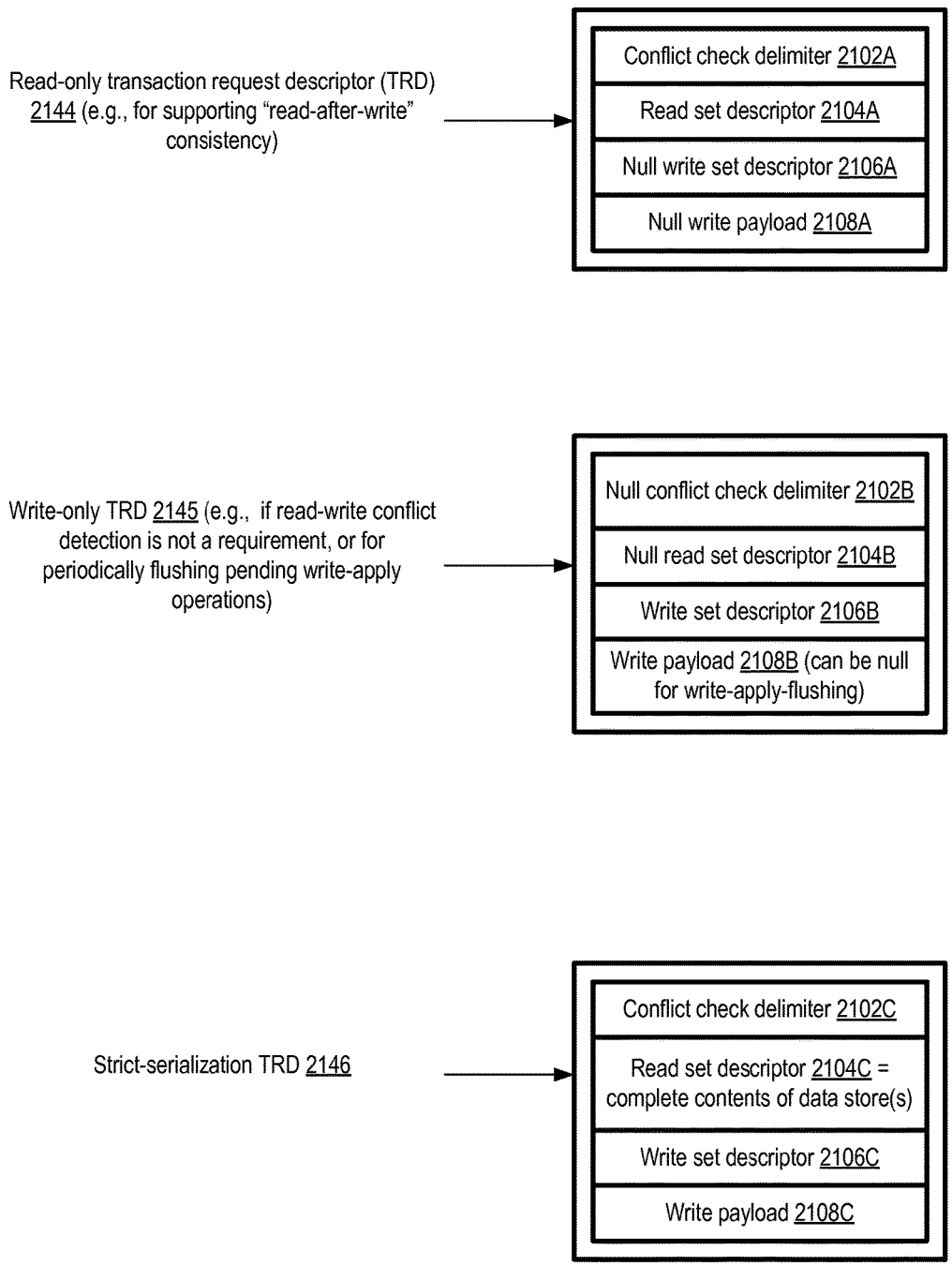
FIG. 21 illustrates examples of transaction request descriptors that may be used to achieve respective special-case consistency objectives, according to at least some embodiments.

FIG. 21 illustrates examples of transaction request descriptors that may be used to achieve respective special-case consistency objectives, according to at least some embodiments. In one embodiment, clients of the logging service may wish to enforce "read-after-write" consistency semantics, according to which a write becomes visible to all readers as soon as it is committed. To ensure read-after-write consistency, i.e., to ensure that reads always "see" data immediately after it is committed, a client may wish to submit transaction requests even for read-only transactions (as well as for transactions that contain writes). Read-only transaction request descriptor (TRD) 2144, for example, has a null write set 2106A and a null write payload 2108A, but has a non-null conflict check delimiter 2102A and a non-null read set descriptor 2104A. Upon receiving such a read-only transaction request descriptor, the conflict detector may check whether an overlap exists between the read set indicated in the request and the writes that have been committed with sequence numbers higher than the sequence number indicated in the conflict-check delimiter. If a conflict is detected, the read-only transaction may be rejected, thus disallowing reads to locations to which writes may have been committed after the conflict check delimiter was generated, even though the requested transaction does not include any writes dependent on those reads.

In at least some embodiments, write-only transaction requests may be submitted to the logging service under certain circumstances. For some applications, it may be the case that the client does not wish to enforce read-write consistency checks, at least during some time periods or for some data stores. Instead, the client may wish to have some writes accepted unconditionally for commit during such time periods. Accordingly, a transaction request descriptor 2145 that has a null read set 2104B and/or a null conflict check delimiter 2102B may be submitted, with a non-null write set descriptor 2106B and a non-null write payload 2108B. Such write-only requests may be submitted, for example, when a data store or object is being initially populated, or if only one writer client is known to be submitting requests during some time period.

As mentioned earlier, in some embodiments asynchronous write appliers may be used to propagate contents of committed writes from the persistent change log to various data stores or data consumers. As a result of the asynchronous nature of the write propagation, it may be the case at some points of time that a set of committed writes has not yet been propagated to their intended data stores. In at least one embodiment, it may be possible to flush such un-applied writes using write-only transactions. For example, if a particular write applier WA1 is configured to have no more than N un-applied writes outstanding to a given data store DS1, a client may submit a write-only transaction request descriptor such as TRD 2145 directed to a special write location WL1 in DS1, where WL1 is used specifically or primarily for flushing outstanding committed writes. In some cases, such a TRD may not need to have any write payload at all (e.g., write payload 2108B may be set to null). When such a write-apply-flushing transaction request is accepted, a new pending committed write may be added to the log and to WA1's queue of outstanding requests. As the length of the queue grows, WA1 may have to start applying the earlier-committed writes in the queue to meet its requirement of no more than N un-applied writes. In some embodiments, such write-apply-flushing requests may be submitted periodically, e.g., once every second, to ensure that committed writes do not remain pending for too long. When a write-apply-flushing transaction's committed write reaches the head of an applier's queue, in some implementations a physical write need not be performed; instead, for example, the applier may simply send the commit sequence number corresponding to the transaction to the destination data store as an indicator of the most-recently "applied" write.

For some applications, clients may wish to enforce strict serialization, during at least for some time periods. That is, only one (write-containing) transaction may be allowed to proceed at a time, regardless of whether any conflicts exist between the data read during the transaction and writes that may have been committed since the transaction preparation was initiated. In such a scenario, a client may submit a strict-serialization transaction request descriptor 2146 to the logging service, with its read set descriptor 2104C indicating the entire contents of all the data sets used by the application. In one implementation in which a hash value is used as an indicator of the locations read/written, and a bit-wise comparison with write set entries is used to detect conflicts, for example, a hash value included in read set descriptor 2402C may be set to a sequence of "1"s (e.g., "1111111111111111" for a 16-bit hash value). If any write-containing transactions have been committed with CSNs greater than the conflict check delimiter 2102C of such a TRD 2146, the transaction corresponding to TRD 2146 may be rejected. Thus, the writes indicated by write set descriptor 2106C and write payload 2108C would only be committed if no other write has been committed (regardless of the location of such a write) in the conflict check interval indicated by the descriptor.

De-Duplication and Sequencing Constraints

Figure 22:
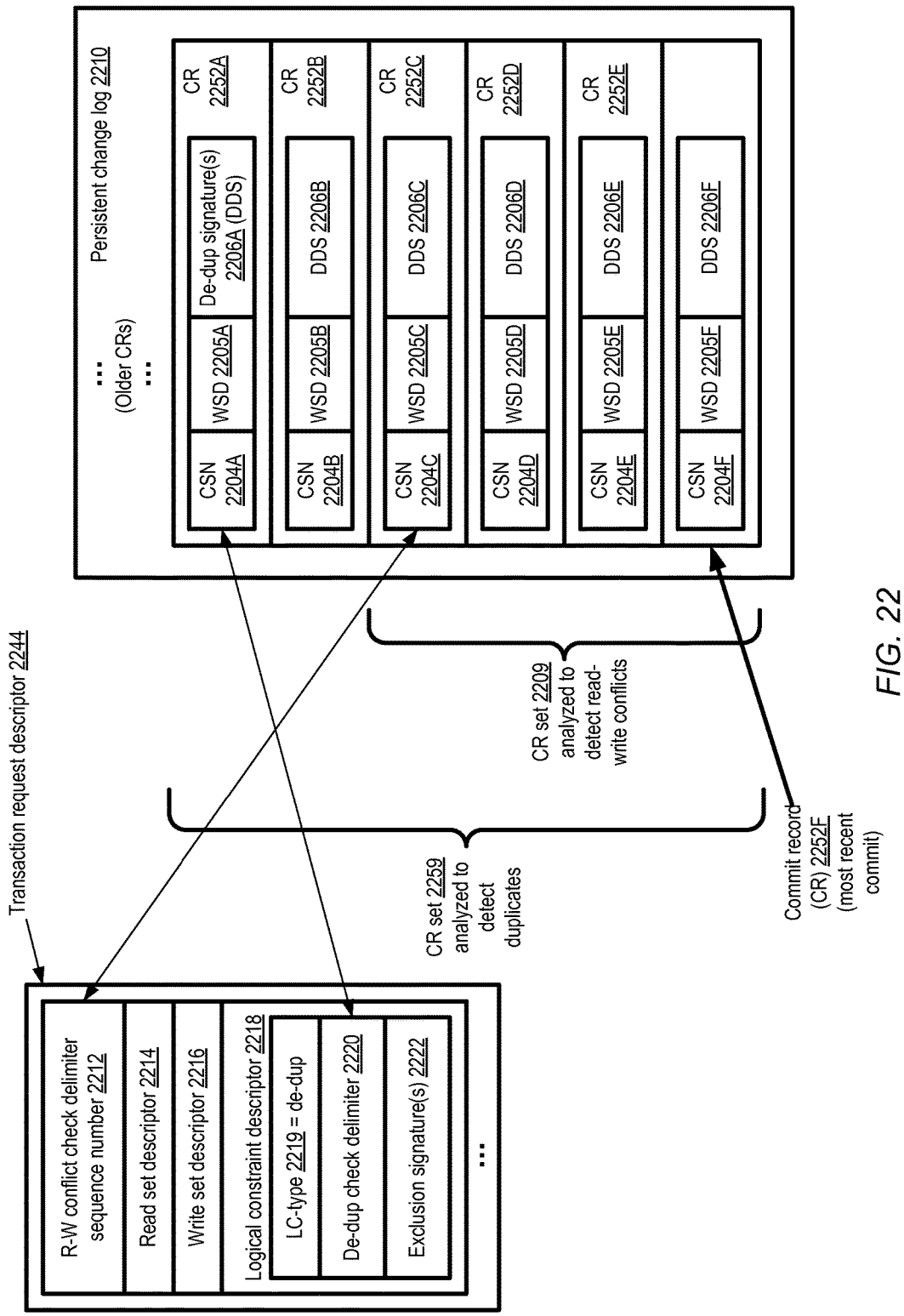
FIG. 22 illustrates an example of enforcing a de-duplication constraint associated with a transaction request received at a log-based transaction manager, according to at least some embodiments.

In some embodiments, clients of the logging service may wish to ensure that duplicate entries are not written to one or more data stores. In one such embodiment, in addition to performing read-write conflict detection as described above, the logging service may also have to enforce a de-duplication requirement indicated in the transaction request. FIG. 22 illustrates an example of enforcing a de-duplication constraint associated with a transaction request received at a log-based transaction manager, according to at least some embodiments. As shown, the transaction request descriptor 2244 comprises a read-write conflict check delimiter 2212, a read-set descriptor 2214, a write-set descriptor 2216, and a logical constraint delimiter 2218. The write payload of TRD 2244 is not shown in FIG. 22. The logical constraint descriptor 2218 includes LC-type field 2219 indicating that it represents a de-duplication constraint, de-duplication check delimiter 2220, and exclusion signature(s) 2222 in the depicted embodiment.

In order to determine whether to accept the requested transaction, the logging service may have to perform two types of checks in the depicted embodiment: one for detecting read-write conflicts, and one for detecting duplicates. The commit records 2252 in the persistent change log 2210 may each include respective commit sequence numbers (CSNs 2204), write set descriptors (WSDs) 2205, and de-duplication signatures (DDSs) 2206 in the depicted embodiment. To determine whether a read-write conflict has occurred, the logging service may identify CR set 2209, starting at a sequence number corresponding to read-write conflict check delimiter 2212 and ending with the most-recent commit record 2252F, whose write sets are to be evaluated for overlaps with the requested transaction's read set descriptor 2214. If a read-write conflict is detected (i.e., if such an overlap exists), the requested transaction may be rejected as described earlier.

To determine whether the requested transaction's write(s) represent duplicates, another CR set 2259 may be identified in the depicted embodiment starting at a sequence number corresponding to de-duplication check delimiter 2220, and ending at the most recent commit record 2252F. For each of the commit records in CR set 2259, the logging service may check whether any of the de-duplication signatures stored in the commit record match the exclusion signature(s) 2222 of the requested transaction. A duplicate may be detected if such a match is found, and the requested transaction may be rejected in such a scenario even if no read-write conflicts were detected. If duplication is not detected, and if no read-write conflicts are detected, the transaction may be accepted for commit.

In at least some embodiments, a de-duplication signature 2206 may represent the data items written by the corresponding transaction in a different way (e.g., with a hash value generated using a different hash function, or with a hash value stored using more bits) than the write set descriptors. Such different encodings of the write set may be used for de-duplication versus read-write conflict detection for any of a number of reasons. For example, for some applications, clients may be much more concerned about detecting duplicates accurately than they are about occasionally having to resubmit transactions as a result of a false-positive read-write conflict detection. For such applications, the acceptable rate of errors in read-write conflict detection may therefore be higher than the acceptable rate of duplicate-detection errors. Accordingly, in some implementations, cryptographic-strength hash functions whose output values take 128 or 256 bits may be used for de-duplication signatures, while simpler hash functions whose output is stored using 16 or 32 bits may be used for the write signatures included in the WSDs. In some scenarios, de-duplication may be required for a small subset of the data stores being used, while read-write conflicts may have to be checked for a much larger set of transactions. In such cases, storage and networking resource usage may be reduced by using smaller WDS signatures than de-duplication signatures in some embodiments. It may also be useful to logically separate the read-write conflict detection mechanism from the de-duplication detection mechanism instead of conflating the two for other reasons—e.g., to avoid confusion among users of the logging service, to be able to support separate billing for de-duplication, and so on.

In other embodiments, the write set descriptors may be used for both read-write conflict detection and de-duplication purposes (e.g., separate exclusion signatures may not be used). Similarly, in some embodiments, the same sequence number value may be used as a read-write conflict check delimiter and a de-duplication check delimiter—i.e., the sets of commit records examined for read-write conflicts may also be checked for duplicates. In at least one embodiment, de-duplication may be performed by default, e.g., using the write-set descriptors, without the need for inclusion of a logical constraint descriptor in the transaction request descriptor.

Figure 23:
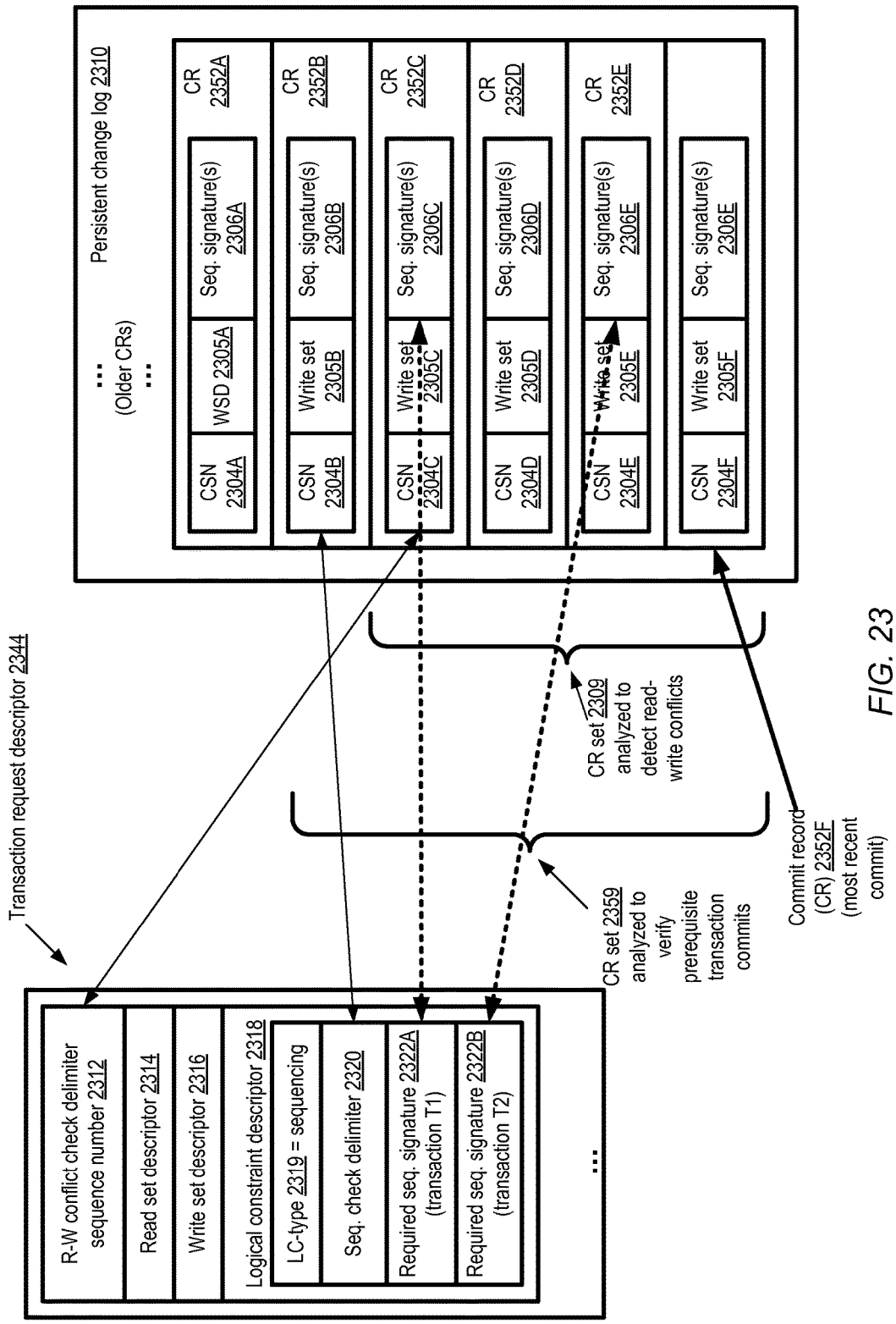
FIG. 23 illustrates an example of enforcing a sequencing constraint associated with a transaction request received at a log-based transaction manager, according to at least some embodiments.

For some applications, clients may be interested in enforcing a commit order among specified sets of transactions—e.g., a client that submits three different transaction requests for transactions T1, T2 and T3 respectively may wish to have T1 committed before T2, and T3 to be committed only after T1 and T2 have both been committed. Such commit sequencing constraints may be enforced using a second type of logical constraint descriptor in some embodiments. FIG. 23 illustrates an example of enforcing a sequencing constraint associated with a transaction request received at a log-based transaction manager, according to at least some embodiments. As shown, the transaction request descriptor 2344 comprises a read-write conflict check delimiter 2312, a read-set descriptor 2314, a write-set descriptor 2316, and a different type of logical constraint delimiter 2318 than logical descriptor 2218 of FIG. 22. The write payload of TRD 2344 is not shown in FIG. 23. The logical constraint descriptor 2318 includes LC-type field 2319 indicating that it represents a sequencing constraint, a sequencing check delimiter 2220, and required sequencing signatures 2322A and 2322B corresponding to transactions T1 and T2 respectively in the depicted embodiment. The logical constraint descriptor 2318 may be included in TRD 2344 to ensure that the requested transaction is committed only if both transactions T1 and T2 (represented by sequencing signatures 2322A and 2322B) have been committed earlier.

In order to determine whether to accept the requested transaction, the logging service may once again have to perform two types of checks in the example illustrated in FIG. 23: one for detecting read-write conflicts, and one for ensuring that the transactions T1 and T2 have been committed. The commit records 2352 in the persistent change log 2310 may each include respective commit sequence numbers (CSNs 2304), write set descriptors (WSDs) 2305, and sequencing signatures 2306 in the depicted embodiment. To determine whether a read-write conflict has occurred, as before, the logging service may identify CR set 2309, starting at a sequence number corresponding to read-write conflict check delimiter 2312 and ending with the most-recent commit record 2352F, whose write sets are to be evaluated for overlaps with the requested transaction's read set descriptor 2314. If a read-write conflict is detected (i.e., if such an overlap exists), the requested transaction may be rejected.

To determine whether the requested transaction's sequencing constraints are met, another CR set 2359 may be identified in the depicted embodiment starting at a sequence number corresponding to sequencing check delimiter 2320, and ending at the most recent commit record 2352F. The logging service may have to verify that respective commit records with sequencing signatures that match required signatures 2322A and 2322B exist within CR set 2359. If at least one of the required signatures 2322 is not found in CR set 2259, the sequencing constraint may be violated and the requested transaction may be rejected, even if no read-write conflicts were detected. If both sequencing signatures are found in CR set 2359, and if no read-write conflicts are detected, the transaction may be accepted for commit.

The sequencing signatures stored within the CRs 2352 (and in the TRD 2344) may be generated using a variety of techniques in different embodiments. In some embodiments, they may be generated from the write sets of the transactions; in other embodiments, sequencing signatures may be based at least in part on other factors. For example, the identity of the requesting client may be encoded in the sequencing signatures in addition to the write signatures in some embodiments, the clock time at which the transaction was requested may be encoded in the sequencing signatures, or an indication of the location from which the transaction was requested may be encoded, and so on. Similar considerations as described above regarding the use of different techniques for representing sequencing signatures than write set signatures may apply in some embodiments. Accordingly, in some embodiments, a different technique may be used to generate sequencing signatures than is used for generating write set descriptor contents, even if both the sequencing signatures and the write set signatures are derived from the same underlying write locations. For example, a different hash function or a different hash value size may be used. In other embodiments, however, the write set descriptors may be used for both read-write conflict detection and sequencing enforcement purposes (e.g., separate sequencing signatures may not be used). Similarly, in some embodiments, the same sequence number value may be used as a read-write conflict check delimiter and a sequencing check delimiter—i.e., the sets of commit records examined for read-write conflicts may also be checked for sequencing. In some cases arbitrary numbers or strings unrelated to write sets may be used as sequencing signatures. In at least one embodiment, a constraint descriptor may not include an LC-type field; instead, the type of a constraint may be indicated by the position of the constraint descriptor within the transaction request. In some embodiments, a "required" flag may be associated with sequencing signatures, and an "excluded" flag may be associated with a de-duplication signature, instead of using LC-type fields, for example. As mentioned earlier in the context of read-write conflict check delimiters, in some embodiments CSN upper bounds may also be specified within a transaction request descriptor to indicate the range of commit records that should be examined for constraint checking, instead of just specifying the CSN lower bound.

In some embodiments, more complex sequencing constraints may be enforced than are illustrated in FIG. 23. For example, instead of simply requesting the logging service to verify that both transactions T1 and T2 must have been committed (in any order) prior to the requested transaction's commit, a client may be able to request that T1 must have been committed prior to T2. Similarly, in some embodiments a client may be able to request negative ordering requirements: e.g., that some set of transactions {T1, T2, Tk} should have been committed before the requested transaction in some specified order (or in any order), and also that some other set of transactions {Tp, Ts} should not have been committed.

Figure 24:
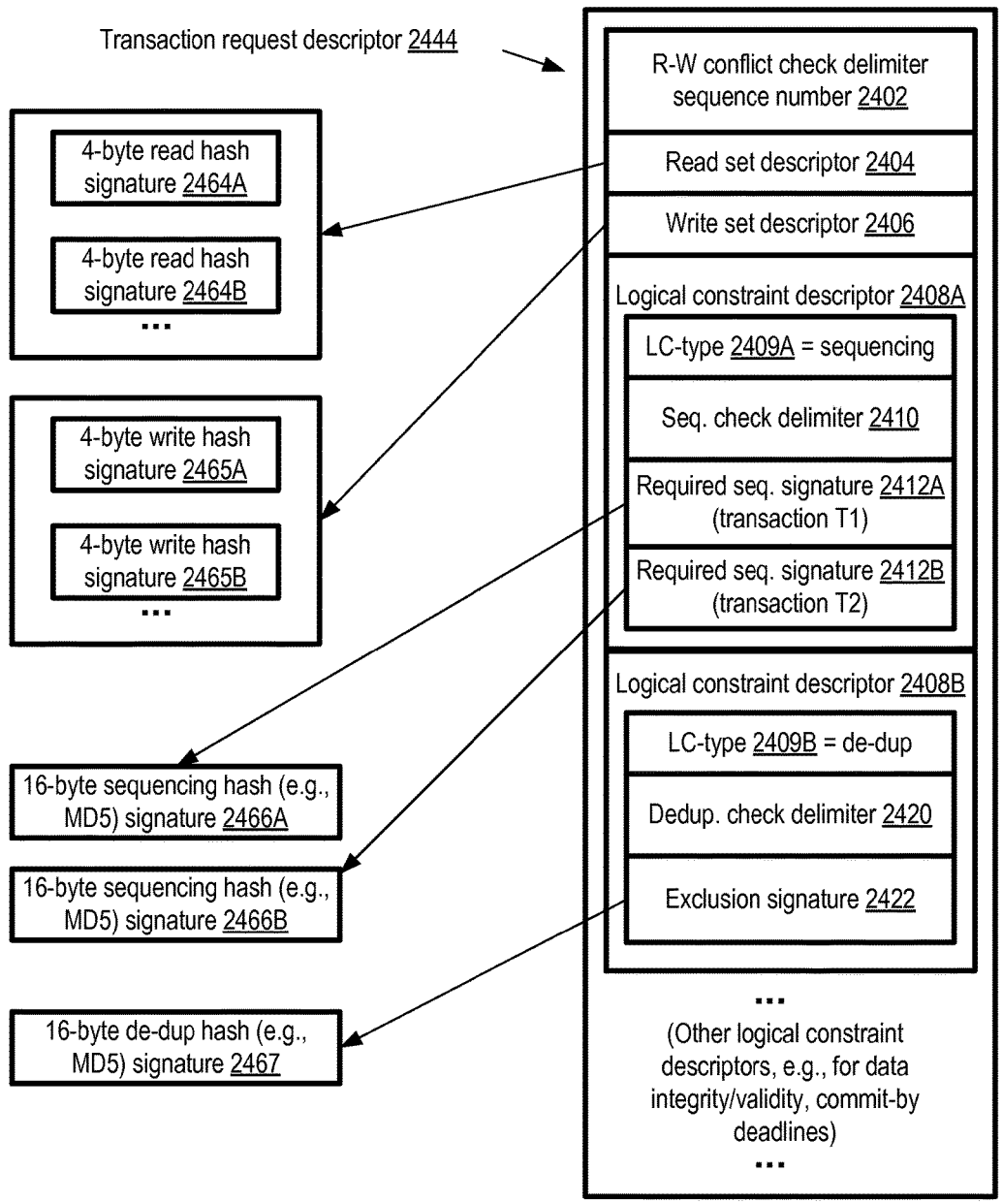
FIG. 24 illustrates an example of a transaction request descriptor comprising multiple logical constraint descriptors, according to at least some embodiments.

In FIG. 22 and FIG. 23, a single type of logical constraint was indicated in the transaction requests shown. In some embodiments, clients may wish to enforce several different types of logical constraints on various transactions. FIG. 24 illustrates an example of a transaction request descriptor comprising multiple logical constraint descriptors, according to at least some embodiments. One sequencing constraint is to be applied, and one de-duplication constraint is to be applied for the same requested transaction represented by transaction descriptor 2444. In the depicted embodiment, the read and write set descriptors comprise 32-bit (4-byte) hash values for each data item read or written. For example, respective 4-byte read hash signatures 2464A and 2464B may represent two data item locations in the read set descriptor 2404, and respective 4-byte write hash signatures 2465A and 2465B may be included in write set descriptor 2406 to represent two locations targeted for writes if the transaction is committed. Read-write conflict check delimiter 2402 is to be used to select the lower bound of a range of sequence numbers in the persistent change log whose commit records are to be checked for read-write conflicts with the requested transaction.

Transaction request descriptor 2444 may also include a sequencing constraint descriptor 2408A and a de-duplication constraint descriptor 2408B in the depicted embodiment. Sequencing constraint descriptor 2408A may include a constraint type field 2409A, a sequencing check delimiter 2410, and one or more required sequencing signatures such as 2412A and 2412B corresponding to transactions whose commits must have been completed for the requested transaction to be accepted. De-duplication constraint descriptor 2408B may include a constraint type field 2409B, a deduplication check delimiter 2420, and a deduplication exclusion signature 2422.

As shown, in the depicted embodiment, the required sequencing signatures 2412A, 2412B and the de-duplication signature 2422 may respectively comprise 128-bit (16-byte) hash signatures 2466A, 2466B and 2467. Thus, the logical constraint signatures may each occupy four times as many bits as are used per data item for read and write set signatures in the depicted example, which may help reduce the number of hash collisions for the logical constraint-related comparisons relative to the comparisons performed for read-write conflict detection. In some embodiments, a cryptographic hash function such as MD5 may be used for the sequencing and/or the de-duplication signatures. The use of cryptographic hash functions may help reduce the probability of errors in evaluating logical constraints to near zero in at least some such embodiments. Although a reasonably low rate of transaction rejections based on false positive hash collisions (e.g., on a false positive read-write conflict detection) may be acceptable, at least some clients may be much more concerned about avoiding the acceptance of a transaction due to a false positive hash collision (e.g., in the case of commit sequencing), and the use of cryptographic-strength hash functions may help to avoid such erroneous transaction acceptances. In some implementations, clients may be able to select hash functions to be used for duplicate detection and/or for sequencing purposes. Different hash functions and/or hash value lengths may be used for de-duplication signatures, sequencing signatures and/or read or write signatures in some embodiments than shown in FIG. 24—for example, the de-duplication and sequencing signatures may differ in size. In at least some embodiments, the addresses of data items read or written may be used for read/write set signatures, deduplication and/or sequencing signatures, e.g., instead of using hash values generated from the addresses. In one embodiment, the de-duplication and/or write signatures may be derived from the write payload in addition to, or instead of, from the locations to which data is written.

Additional logical constraints may also be specified in the transaction request descriptor in some embodiments, such as data integrity/validity constraints or commit-by deadline constraints. An example data integrity or validity constraint may require, for example, that a particular value V1 may only be stored in a data store DS1 if a different value V2 is already stored, either in DS1 or in some other data store. A data validity constraint may define acceptable ranges (either unconditional, or conditioned on the values stored in specified data store locations) for specified data types or data items to be stored. Commit-by constraints may indicate deadlines by which a transaction's commit is to be completed, with the intent that the transaction should be abandoned or aborted if the deadline is not met.

Figure 25:
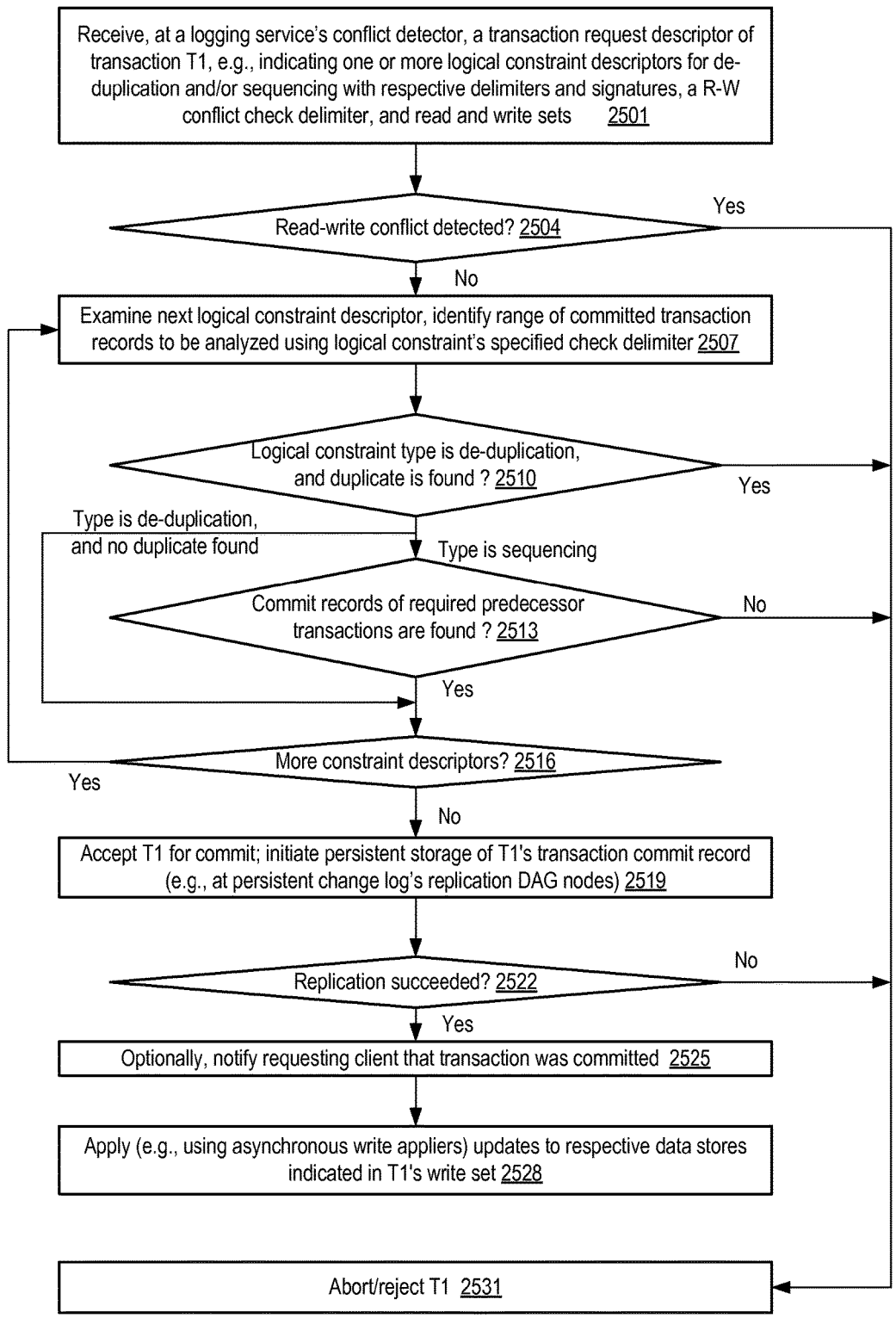
FIG. 25 is a flow diagram illustrating aspects of operations that may be performed at a logging service in response to a transaction request that indicates one or more logical constraints, according to at least some embodiments.

FIG. 25 is a flow diagram illustrating aspects of operations that may be performed at a logging service in response to a transaction request that indicates one or more logical constraints, according to at least some embodiments. In the depicted embodiment, a given transaction's commit requirements may include concurrency control requirements (e.g., a requirement that no read-write conflicts of the kinds described above are found) as well as logical constraint requirements. Both de-duplication and sequencing logical constraints may be supported for a single transaction (other logical constraints may also be supported, but only the operations pertaining to de-duplication and sequencing are shown in FIG. 25) in at least some embodiments. As shown in element 2501, a transaction request descriptor that includes one or more logical constraint descriptors of a transaction T1 may be received at a conflict detector associated with a particular persistent change log instance of a logging service. For each logical descriptor, a corresponding check delimiter may be specified in the depicted embodiment, to be used to select the set of commit records to be analyzed to determine whether the logical constraint is met or violated. Respective sets of one or more signatures may also be specified for each logical constraint. The read and write sets of the requested transaction may also be indicated, together with a read-write conflict check delimiter. As mentioned earlier, in some embodiments, the same delimiter may be used for one or more logical constraints as that used for checking read-write conflicts. Also, in at least one embodiment, separate signatures may not be required for logical constraints; instead, for example, the write set signatures may be used as de-duplication and/or sequencing signatures.

Using the read-write conflict check delimiter, a first set of commit records CRS1 to be analyzed may be identified in the depicted embodiment. Such a set may, for example, comprise those commit records whose sequence numbers lie in a range starting at the read-write conflict check delimiter, up to the sequence number of the most recently-stored commit record (or up to a different upper bound indicated in the transaction request). If a read-write conflict is detected (element 2504) (e.g., if the write sets of any of the commit records of CRS1 overlaps with the read set of the requested transaction), the transaction may be rejected/aborted (element 2531). Checking for read-write conflicts may also be referred to herein as verifying that the requested transaction meets concurrency control requirements. In some embodiments, the client from which the transaction request was received may be notified that the transaction has been aborted.

If a read-write conflict is not detected (also in operations corresponding to element 2504), each of the logical constraints indicated by the corresponding descriptors may be checked in sequence in the depicted embodiment. The next logical constraint descriptor in the sequence may be examined, and a new commit record set CRS-k may be selected for constraint analysis based on the check delimiter associated with the constraint (element 2507). For example, CRS-k may include all the commit records with sequence numbers in the range starting with the delimiter and ending at the highest recorded commit sequence number (or up to a different upper bound indicated in the transaction request). The analysis to be performed may depend on the type of the logical constraint descriptor. If a de-duplication constraint is to be checked, and if a duplicate is found by comparing the de-duplication signatures of CDR-k and the requested transaction (element 2510), the transaction may also be rejected/aborted (element 2531). If the constraint is a de-duplication constraint and no duplicate is found (as also detected in element 2510), and if more logical constraints remain to be analyzed, the next logical constraint descriptor may be examined and the operations corresponding to elements 2507 onwards may be repeated for the next logical descriptor.

If the constraint descriptor indicates a sequencing constraint indicating one or more required signatures of committed transactions, the CRS-k for the sequencing constraint may be examined to ensure that the required signatures have in fact been stored for transactions whose commits have completed. If the commit records of the required transactions are not found (as detected in element 2513), the requested transaction may also be aborted/rejected (element 2531). If the commit records of the required transactions are found (also in operations corresponding to element 2513), the sequencing constraint processing may be complete. As in the case of read-write conflict detection, logical constraint checking may also be performed using hash functions for the comparisons in at least some embodiments, thus avoiding the overhead of scanning the commit record sets. If any logical constraint descriptors remain (element 2516), they may be examined in turn. If no logical constraint descriptors remain (as also detected in element 2516), the transaction may be accepted for commit. A procedure to save the transaction's commit records in persistent storage may be initiated in the depicted embodiment (element 2519), e.g., at several nodes of a replication DAG. If the replication succeeds (e.g., if a sufficient number of copies of the commit record are stored successfully at respective storage devices) (as detected in element 2522), the transaction's commit may be considered complete. If for some reason the required number of replicas is not stored, the transaction may still be rejected/aborted (element 2531). In some embodiments, a notification that the transaction has been successfully committed may be transmitted to the requesting client (element 2525).

In some embodiments, operations to check more than one logical constraint may be performed in parallel instead. In one embodiment, any combination of the read-write conflict check and the logical constraint checks may be performed in parallel. In some embodiments, responses regarding each of the logical constraints indicated may be provided to the requesting client, even if one or more of the constraints are not met. For example, in the case of a transaction request with a de-duplication constraint and a sequencing constraint, the sequencing constraint may be checked even if the de-duplication constraint isn't met, and the results of the evaluation of both constraints may be provided to the client. In some implementations, clients may be able to explicitly request that a specified subset or all of the logical constraints of a given transaction request are to be checked.

Cross-Data-Store Operations at Log-Coordinated Storage Groups

A set of data stores for which at least write-containing transactions are collectively managed using a log-based transaction manager as described above may be referred to as member data stores of a log-coordinated storage group (LCSG) herein. For example, an LCSG may comprise a plurality of data store instances, such as one or more instances of a non-relational database, one or more instances of a relational database, one or more storage objects of a provider network storage service, an in-memory database instance, a queueing service implementing persistent queues, a notification service, and the like. The particular log-based transaction manager instantiated for the data store members may also be considered a part of the LCSG. In at least some embodiments, an LCSG may be able to allow users to request a variety of cross-data-store operations. For example, a single logical write performed within a given transaction at an LCSG may eventually be translated into (i.e., may result in) a plurality of physical updates applied at several different data stores. In this way, several different views of the same underlying change may be made accessible via the respective data access interfaces of the data stores.

Consider a scenario in which a storage system client wishes to have the data payload of the same write request be made visible at a database system instance for persistence and data durability, an in-memory distributed cache instance for low-latency access to the results of the write request, a data warehousing service for offline analysis, and an archival storage service for long-term record retention. In one embodiment, the client may construct a transaction that explicitly indicates each of the four data stores as destinations for a given logical change to the application data. In another embodiment, in addition to or instead of supporting cross-data-store transactions, the logging service at which the LCSG is instantiated may support automated cross-data-store transformations that do not require all the different write targets to be explicitly specified within a given transaction request. Instead, e.g., in response to a configuration request or during LCSG setup, the client may be able to indicate that for any given write directed to the database instance, a corresponding representation is to be automatically propagated to the in-memory cache, the data warehousing service, and the archival storage service. Transformations in both directions between a given pair of data stores may be supported in some embodiments. For example, if a client application performs a write directly to a database instance, the results of the write may be added automatically by the logging service to the in-memory cache in the appropriate format expected by the in-memory cache, and if a client application performs a different write directly to the in-memory cache, the results of that different write may be propagated automatically to the database instance in the format expected by the database instance. In some embodiments, while write appliers may be set up for propagating committed writes to data stores from the write log, separate components of the storage system called "write transformers" may be set up for automated propagation of writes from one data store to another.

The logging service may implement several different pricing policies for operations performed at an LCSG in some embodiments, at least some of which may be based on the mix of operation types performed on behalf of the client (e.g., how many cross-data-store transformations and/or transactions are performed during a time interval, as opposed to the number of operations that involved writes to a single data store). The billing amounts charged to an LCSG customer for a given billing period may vary based on a number of factors as described below, and on the pricing policy or policies selected for or by the customer. At least some of the pricing policies described below may be used in combination with each other for a given client—e.g., tiered pricing may be applied for both provisioned throughput and best effort resource allocation modes, and respective provisioned-throughput pricing policies may be applied for each data store of an LCSG.

In at least one embodiment, the number of different data stores included within a given LCSG, the types of data stores included, and/or the number of cross-data-store operations performed on behalf of a client (e.g., operations or transactions involving generating a second representation of a write that is originally targeted to a particular data store, at a different data store) may influence the billing amounts. For example, in accordance with one pricing policy, establishing an LCSG with eight data stores may cost more than establishing an LCSG with four data stores, assuming other factors such as overall workload levels and/or data set sizes are identical. In accordance with other example pricing policies, an LCSG with four relational database instances supporting a particular workload level may cost more than an LCSG that comprises four in-memory database instances supporting the same workload level. A client may be billed a particular amount per cross-data-store operation performed in some embodiments. In one embodiment, the cost of a cross-data-store operation may also vary based on the type of data stores involved—e.g., an operation in which a write initially directed to a relational database is translated into an additional write at an in-memory database may cost a different amount than an operation in which a write initially directed to a non-relational database is translated into another write at the in-memory database. The direction of write propagation may also influence the price of an operation in some embodiments—e.g., a translation of a write from data store DS1 to DS2 may cost a different amount than a translation of a write from DS2 to DS1.

In some embodiments, resources (such as compute servers, storage devices, network bandwidth, memory and the like) may be allocated at a provider network for use by an LCSG in one of several modes. In a provisioned throughput mode of resource allocation, a client of the logging service may indicate a target throughput rate (e.g., 100 transaction per second) for a particular data store registered as a member of an LCSG, and the logging service may reserve sufficient resources such that the requested throughput can be sustained (at least under normal operating conditions, e.g., in the absence of failures). According to a pricing policy based on the provisioned-throughput mode, the client may be billed for the target throughput rate even if the actual workload submitted by the client happens to be below the target during a given billing period. Different provisioned throughputs may be requested by a client for various data stores of a given LCSG in some embodiments. According to some embodiments, the billing rate for provisioned throughput may differ from one data store to another—e.g., the rate for a provisioned throughput of 100 transactions/second for a non-relational database may differ from the rate for provisioned throughput of 100 transactions per second for a relational database that is a member of the same LCSG.

In at least some embodiments, in a different mode of resource allocation called best-effort mode, the logging service may not necessarily reserve or dedicate resources corresponding to a specified target throughput of the client. Instead, for example, resources from a shared pool or pools may be assigned to the client's LCSG. As the client's workload level fluctuates, the logging service may make best-effort adjustments to the set of resources assigned to the client, based on the available capacity in the shared pool, for example. Pricing policies for best-effort resource allocation mode may result in different billing rates for the same workload level than pricing policies for provisioned throughput resource allocation mode in at least some embodiments. As in the case of provisioned throughput, different billing rates may apply to different data stores for best-effort resource allocation in some embodiments.

According to at least one embodiment, a tiered throughput-based pricing model may be implemented. For example, a different billing rate B1 (e.g., per transaction) may be charged if a client submits between 0 and 1000 transactions/second than a billing rate B2 for transaction rates between 1000 and 2000 transactions/second, and so on. Similar tier-based pricing may also apply to bandwidth usage in some embodiments—e.g., a different billing rate per gigabyte of data transferred may be charged if the total number of gigabytes transferred is between 0 and 10 GB/day than if the total number of gigabytes transferred is between 10 and 20 GB/day. In some embodiments, billing amounts may vary based at least in part on the levels of high availability, data durability, latency required by the LCSG clients with respect to the persistent change logs being used and/or with respect to the member data stores of the LCSG. In at least one embodiment, LCSGs may be implemented at a storage service that natively supports a specified set of data store types, but also allows custom extensions to be added—e.g., for transformations between a data store type natively supported by the service and a different data store type for which support is not provided natively. In some such embodiments, a billing rate that applies to use of a given extension may differ from a billing rate used for natively-supported data store types.

In one implementation in which the various data stores of an LCSG are each implemented via a respective service of a provider network that each implement their own pricing policies, a client may be billed separately for the use of those provider network services and for the use of the LCSG. For example, the billing amounts for reads directed to a database instance of an LCSG may be computed in accordance with a pricing policy of a database service, while billing for LCSG transactions and cross-data-store transformation operations may be determined in accordance with an LCSG pricing policy.

In at least one embodiment, one or more programmatic interfaces (such as web pages, APIs and the like) may be implemented to enable clients of the logging service to view alternative pricing policies and/or to select specific pricing policies based on their preferences and requirements. Workload-related metrics such as overall requested transaction and/or read rates, the numbers of cross-data-store and single-data-store operations performed, network bandwidth used, and the like may be collected from the resources allocated for a customer's LCSG. In at least some embodiments, part of the billing-related work performed by the control plane of the logging service implementing the LCSGs may include classifying workload records into one subset indicating cross-data-store operations versus a different subset indicating single-data-store operations. For example, write records for both types of operations (single-data-store versus cross-data-store) may be stored in the same log at a given data store, and a workload analyzer control plane component may have to examine the contents of a write record to determine whether it represents a cross-data-store write or a single-data-store write. In one implementation, a set of distributed monitoring agents of a provider network being utilized for the LCSG may be used for metrics collection. Depending on the pricing policy selected for an LCSG and on the metrics collected, a billing amount for a particular billing period may be determined and indicated to a client.

Figure 26:
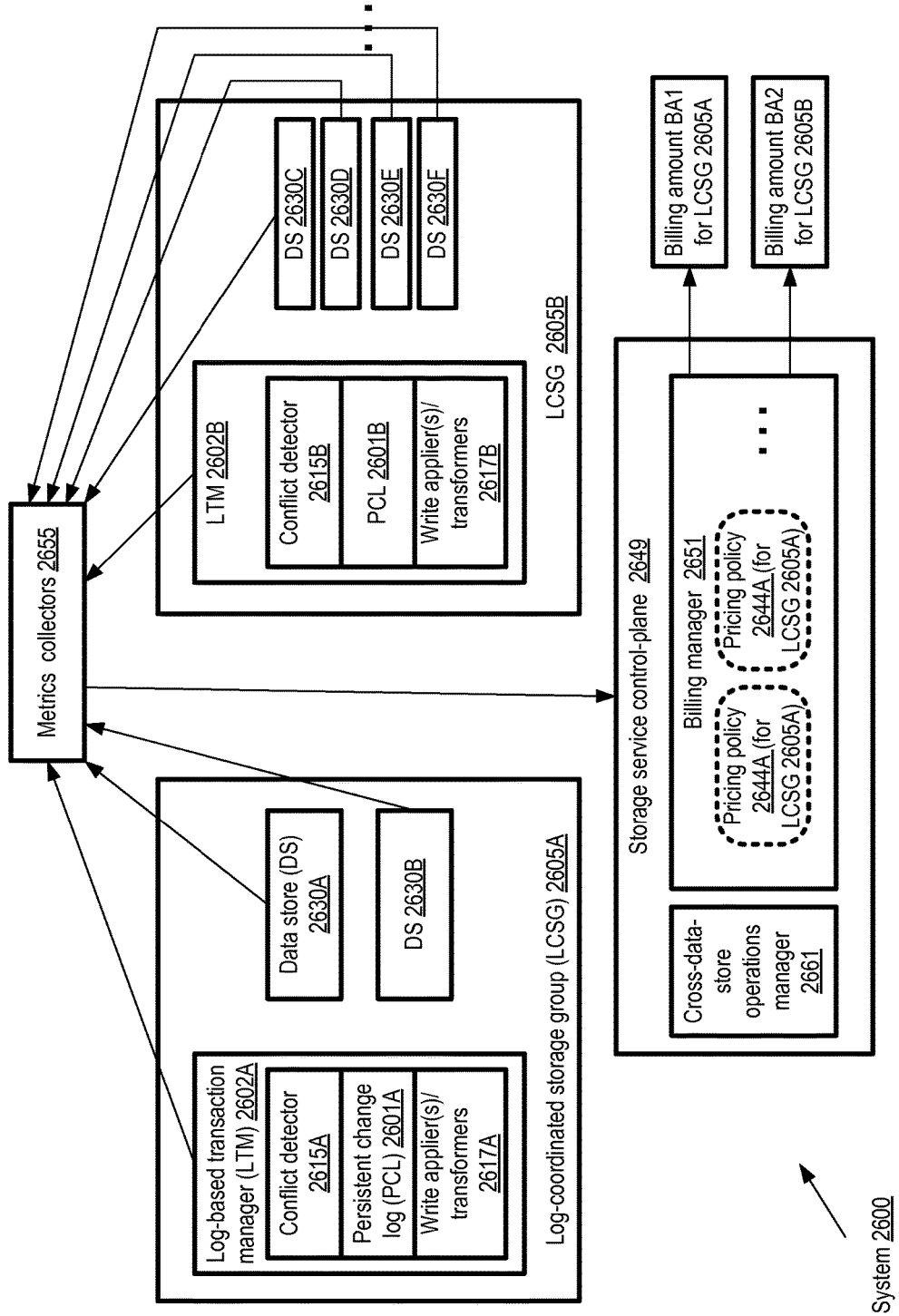
FIG. 26 illustrates an example system environment in which a variety of cross-data-store operations may be supported at respective log-coordinated storage groups, according to at least some embodiments.

FIG. 26 illustrates an example system environment in which a variety of cross-data-store operations may be supported at respective log-coordinated storage groups (LCSGs), according to at least some embodiments. As shown, system 2600 comprises two LCSGs, 2605A and 2605B. LCSG 2605A includes two data stores, 2630A and 2630B, while LCSG 2605B comprises four data stores 2630C, 2630D, 2630E and 2630F. Log-based transaction manager (LTM) 2602A, comprising a conflict detector 2615A, persistent change log 2601A, and a set of write appliers and write transformers 2617A, is configured to handle transaction requests comprising writes directed by clients to the data stores 2630A and 2630B. Similarly, LTM 2602B, comprising conflict detector 2615B, persistent change log 2601B, and a set of write appliers and write transformers 2617B, is configured for managing writes directed by clients to data stores 2630C-2630F. The persistent change logs 2601 may also be referred to as write logs herein. The write appliers may be responsible for propagating committed writes from the write logs to the data stores 2630 as described earlier, while write transformers may be responsible for implementing automated cross-data-store writes among data stores 2630.

The control plane 2649 of a logging service or storage service at which the LCSGs are implemented may comprises a plurality of components responsible for configuration and administration tasks, including for example managing LCSG membership information, mappings between client accounts and service resources assigned to the accounts, keeping track of pricing/billing policies in use for various LCSGs, and so on. In some embodiments, the control plane may comprise a cross-data-store operations manager 2661. The cross-data-store operations manager may, for example, determine (e.g., based on client requests) the types of cross-data-store operations to be performed for a client, and may set up write transformers as needed for one or more cross-data-store operation types. A billing manager 2651 may be responsible, for example, for generating client billing amounts based on one or more pricing policy options for requests directed towards the LCSGs 2605A and 2605B in the depicted embodiment. In some embodiments, the cross-data-store operations manager 2661 and/or the billing manager may be implemented as sub-components of the logging service manager 1501 shown in FIG. 15. The set of available pricing policies may be indicated to actual or potential customers of the service that implements the LCSGs via one or more programmatic interfaces, such as web pages, APIs, command-line tools or custom GUIs, in the depicted embodiment. Customers may also indicate the particular pricing policies to be applied to their LCSGs via such programmatic interfaces in at least some embodiments, e.g., at the time that they register various data stores 2630 as LCSG members, or via pricing policy change requests submitted at some point after the LCSGs are set up. In the depicted embodiment, pricing policy 2644A has been identified for LCSG 2605A, while a different pricing policy 2644B has been selected for LCSG 2605B. Each pricing policy may indicate, for example, the billing rates to be used for various different operation types and/or resource usage units during at least a specified billing period. The billing amounts (e.g., BA1 or BA2) that a customer is charged for a given billing period may be determined by the billing manager 2651 based on the pricing policy or policies in effect for their LCSGs during the billing period and on an analysis of various metrics that are collected during the billing period.

Metrics collectors 2655 may be responsible for monitoring various resources, such as the servers and devices used for the data stores 2630A and/or the LTMs 2602, and providing an indication of the collected metrics to the billing manager 2651. In embodiments in which the LCSGs are implemented within provider networks, e.g., using services of the provider network such as a computing service, a storage service and the like, a pre-existing metrics collection infrastructure may be available for some or all of the services, from which at least some of the metrics needed for generating billing amounts may be obtained by the billing manager. In one embodiment, the control plane 2649 may include respective components for various pricing/billing related tasks—e.g., a membership manager that is responsible for identifying the members of each LCSG, a metrics analyzer for classifying collected workload metrics into per-client and/or per-operation-type subgroups, and a bill generator that produces the billing amounts for various clients based on selected pricing policies and workload metrics.

Figure 27:
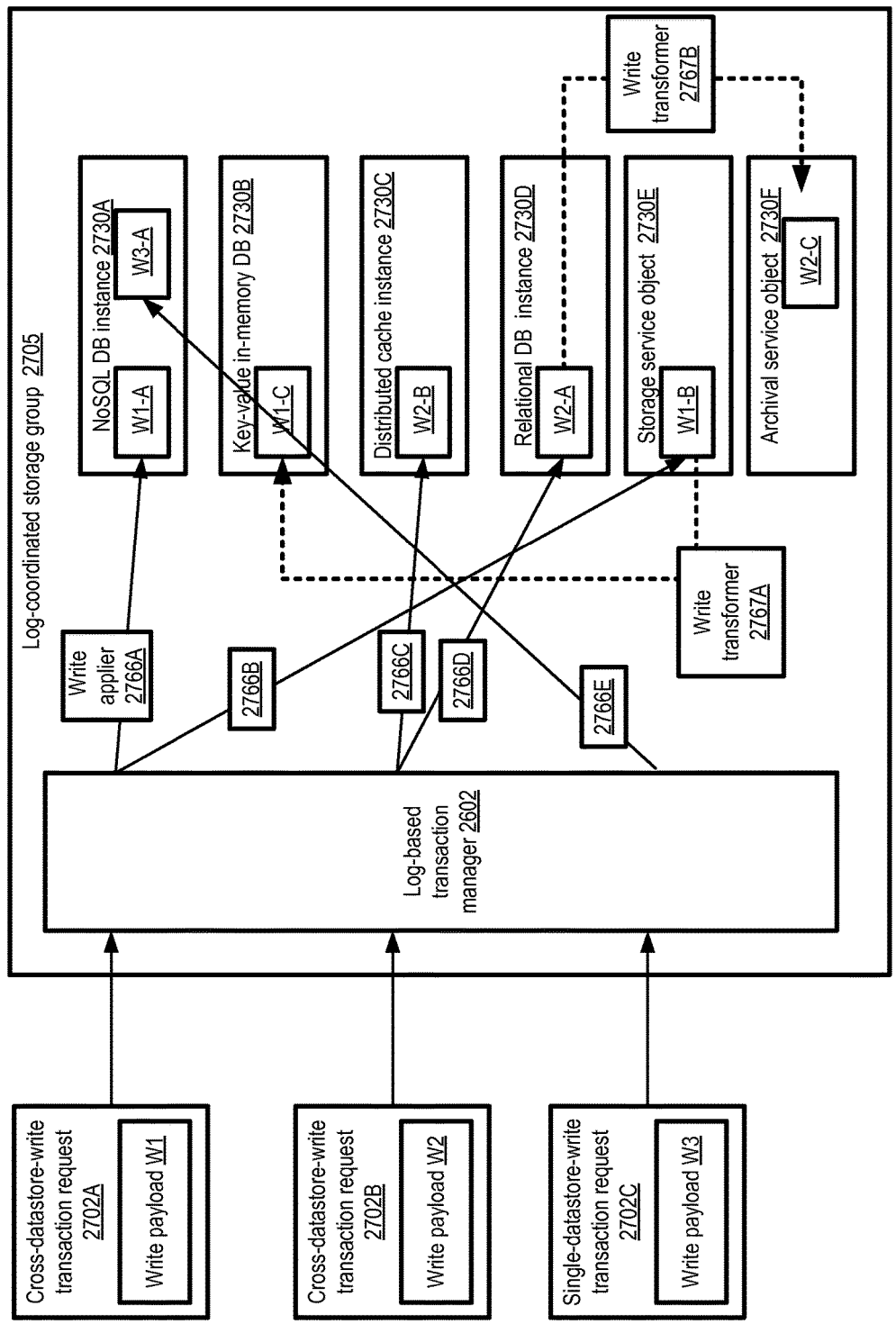
FIG. 27 illustrates examples of single-data-store and cross-data-store write operations, according to at least some embodiments.

A number of different factors may be taken into account in a given pricing policy 2644 applied to an LCSG 2605, such as the number and/or types of data stores 2630 that are members of the LCSG, the mix of operations (single-data-store writes versus cross-data-store writes), the resource allocation model used (e.g., provisioned throughput versus best effort), the requested transaction rates, and so on. FIG. 27 illustrates examples of single-data-store and cross-datastore write operations, according to at least some embodiments. LCSG 2705 in the depicted embodiment comprises six member data stores: NoSQL DB instance 2730A, key-value in-memory DB 2730B, distributed cache instance 2730C, relational DB instance 2730D, storage service object 2730E and archival service object 2730F. As illustrated, the member data stores of a given LCSG may implement very different data models (e.g., relational versus non-relational, structured records versus unstructured data objects, and so on) and different read interfaces and data formats may therefore be used at the member data stores in at least some embodiments.

Two types of write operations are illustrated in FIG. 27—writes that are explicitly included in requested transactions by clients, and writes that the logging service is configured to perform automatically (e.g., as a consequence or side-effect of the explicitly requested writes). A transaction request 2702A indicates that a write payload W1 is to be directed to NoSQL DB instance 2730A, and also to storage service object 2730E. Accordingly, a representation W1-A of write payload W1 is stored in NoSQL DB instance 2730A by a write applier 2766A, and another representation W1-B of the same write payload is stored in storage service object 2730E by a different write applier 2766B. In some implementations, the same write applier may store both W1-A and W1-B. Similarly, transaction request 2702B also includes a request for a cross-data-store write of payload W2. Accordingly, a first representation W2-A of the write payload W2 is stored at relational DB instance 2730D by write applier 2766D, while a second representation W2-B of the write payload W2 is stored at distributed cache instance 2730C by write applier 2766C. Transaction request 27002C comprises a single-data-store write. Representation W3-A of transaction request 2702C's write payload W3 is accordingly stored at the NoSQL DB instance 2730A by write applier 2766E. In at least some embodiments, the billing rates for transactions with single-data-store writes may be different from the billing rates for cross-data-store write transactions. In at least some implementations, a baseline billing rate may be charged per transaction, and additional billing amounts may be charged based on the number and destination data store types of writes included in the transaction.

In addition to the writes explicitly indicated in the requested transactions, LCSG 2705 may also support automated transformations and/or copying of data from one member data store to another. Two examples of such cross-data-store transformations are shown in FIG. 27. In the first example, a third representation W1-C of write payload W1 is automatically generated from representation W1-B of storage service object 2730E and stored in key-value in-memory database 2730B by a write transformer 2767A. In the second example, using W2-A as the source, a third representation W2-C of write payload W2 is stored at archival service object 2730F by a write transformer 2767B. In at least one implementation, respective write transformers may be set up for each pair of source and destination data stores between which such automated cross-data-store transformation operations are to be performed. For example, a particular write transformer such as 2767A may be registered as a listener that is to be notified when a write (such as W1-B) is applied to storage service object 2730E, so that a corresponding write (such as W1-C) may be performed at key-value in-memory database 2730B. In some embodiments, the storage service may provide support for a limited set of cross-data-store operations and corresponding write transformers. Clients may be permitted to extend the functionality of the write transformers in some embodiments (e.g., by adding code that allows some writes to be rejected as invalid instead of being propagated from one data store to another, by performing application-specific analysis on the cross-data-store writes, or by adding new types of source and destination data store types). In accordance with the pricing policy in place for LCSG 2705, respective billing rates may be set for each type of automated cross-data-store transformations in the depicted embodiment. The billing rate may be based on various factors in different embodiments, such as the specific source and destination data store types, the acceptable delay between the time that a particular write is applied to the source data store and the corresponding representation is applied to the destination data store, and so on. Thus, for example, a billing rate BR1 may be used for generating, within archival storage service 2730F (the destination data store) a different representation of an object originally written in relational DB instance 2730D (the source data store), while a different billing rate BR2 may be used for generating a different representation of the same object within a different destination data store such as distributed cache instance 2730C. For a given pair of data stores, the direction of the cross-data-store transformation operation may influence the billing rate in at least some embodiments.

Figure 28:
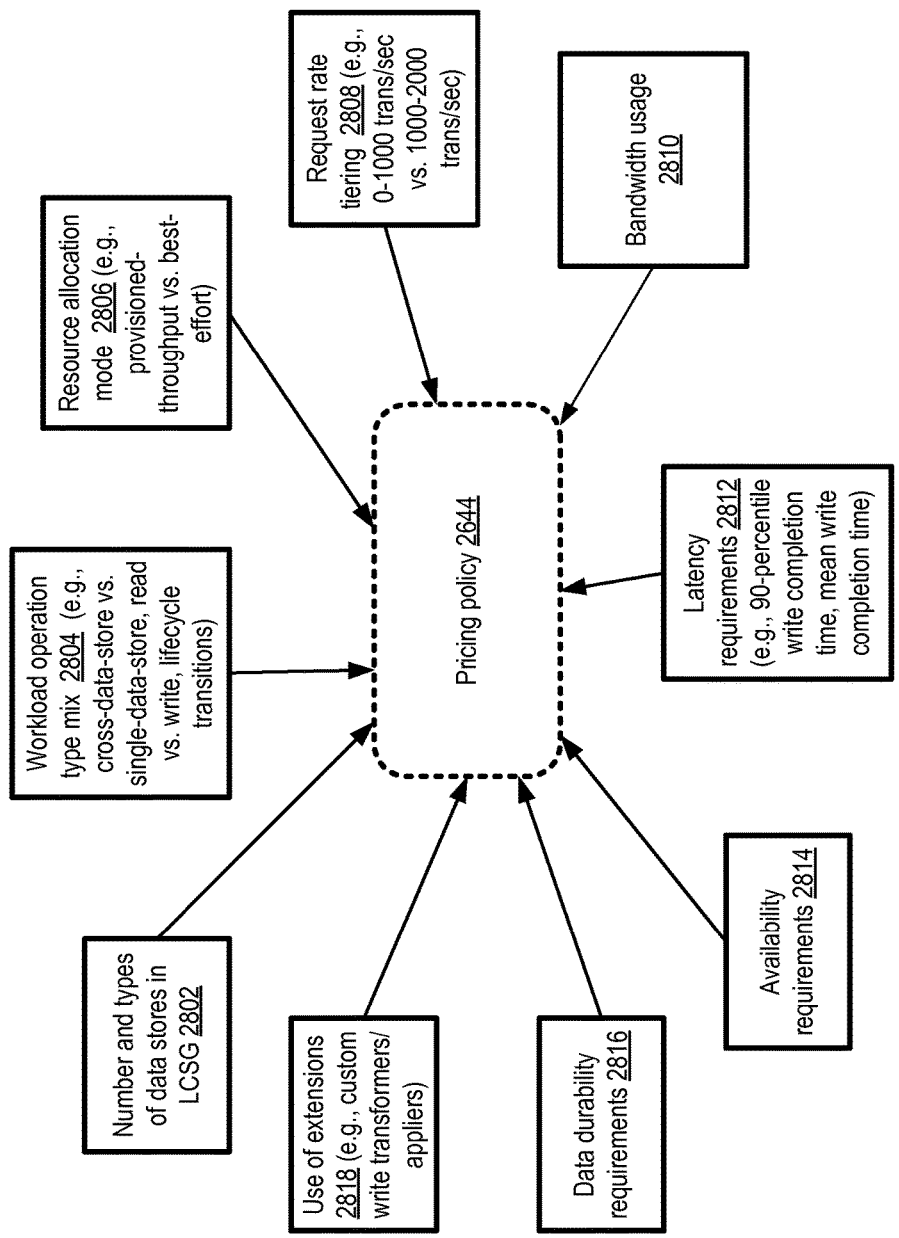
FIG. 28 illustrates examples of factors that may be considered when determining pricing policies for log-coordinated storage groups, according to at least some embodiments.

FIG. 28 illustrates examples of factors that may be considered when determining pricing policies for log-coordinated storage groups, according to at least some embodiments. The number and types of data stores 2802 may influence several aspects of the pricing in some embodiments, including an initial up-front fee that clients may be required to pay, as well as ongoing usage-based fees. For example, to set up an LCSG with four instances of a non-relational database, the billing amount may differ from that for setting up an LCSG with one instance each of the non-relational database, a relational database, a distributed cache instance, and an archive instance at an archival service. The number of data stores in an LCSG may also represent the number of possible client-accessible views of the same underlying data.

The workload operation type mix 2804 may influence billing amounts in at least some embodiments—e.g., as discussed above, cross-data-store operations may have a different cost than single-data-store operations. In at least one embodiment, cross-data-store lifecycle workflows may be supported at an LCSG. Lifecycle workflow operations (which may also be implemented using write transformers and/or write appliers) may involve transitioning data objects from one data store to another based on elapsed time or other time-based triggering conditions. In one such embodiment, for example, a committed write may initially be propagated to a relatively high-cost, low-latency and high-throughput data store DS1 providing a first read interface. Then, after some number of hours (e.g., based on a schedule indicated by the client or selected by the storage service), a representation of the data object may be automatically written to a different data store which provides a different read interface and/or different performance characteristics. Pricing policies based on the number and nature of such lifecycle workflow transitions may be implemented in some embodiments. In some embodiments, the mix of reads and writes in a customer's workload could also affect the billing amount—e.g., a read may in general cost less than a write. As described above with respect to FIG. 15, in at least some embodiments a log read interface may enable clients to issue reads directly to the persistent log of the LCSG, and a per-read cost for using such an interface may differ from the per-read costs of using the data stores' interfaces. In some implementations in which reads to the data stores are handled by respective services of the provider network (i.e., not by the logging service per se), the billing for reads that use the data stores' native read interfaces may be handled separately from the billing associated with the use of the logging service.

Pricing policies for the use of the LCSG may differ based on the resource allocation mode 2806 in some embodiments. The logging service may have to reserve or dedicate resources for a client in provisioned-throughput mode to ensure that sufficient capacity remains available for the client's specified throughput level. In contrast, for fulfilling client requests in best-effort resource allocation mode, shared resources may be used, which may enable higher utilization levels of the logging service resources on average than for provisioned throughput mode. Thus, in at least some embodiments, clients may be charged a different amount for the same actual transaction rate when provisioned-throughput mode is used than when best-effort mode is used. Request rate tiers 2808 may be defined for pricing policies in some embodiments. In accordance with tier-based pricing, the billing rate for a given transaction may differ depending on whether the client issues between 0 and 1000 transaction requests per second, or whether the client issues between 1000 and 2000 transactions per second. In at least some embodiments, the network bandwidth usage 2810 for a client's workload may influence the pricing policy. Depending on the nature of the transactions, a particular number N1 of transaction requests may result in X gigabytes of traffic for a first client, while N1 transactions may result in Y gigabytes of traffic for another client (or even for the first client during a different time interval). Since at least some of the resource usage incurred by the logging service may vary in proportion with the network bandwidth, some pricing policies of the logging service may be based at least in part on measured bandwidth usage. In various embodiments, the monitoring infrastructure (e.g., metrics collectors 2655A) used by the logging service may use a variety of techniques to assign bandwidth usage to different clients—e.g., such assignments may be based on client IP addresses incorporated within network packet headers, client identifiers incorporated within packet headers or bodies, and so on.

In at least some embodiments, pricing policies may be defined and/or selected based on latency requirements 2812, availability requirements 2814, and/or data durability requirements 2816. For example, one client's application set may have a requirement for most transactions to be accepted within 2 seconds of the corresponding transaction requests being submitted, and such a client may be willing to pay a higher rate per transaction as long as at least 95% of the submitted transactions are accepted within 2 seconds. Pricing policies based on such latency percentile measures or average latency may therefore be supported by the logging service in such embodiments. Different clients and/or client applications may have different high availability requirements 2814 for the logging service (e.g., whether various components of the LCSG need to be online and responsive 99.99% of the time or 99.9999% of the time) in some embodiments, which may affect the pricing policies selected. Requirements for data durability 2816 (e.g., the maximum acceptable data loss rate for log records) may also influence pricing in at least one embodiment.

The logging service may natively support a number of different data store types, such as proprietary databases or storage services implemented at the provider network, popular open-source databases, caching services, and the like. In addition, in at least some embodiments, the logging service may be extensible by third parties or clients. In such an embodiment, a set of extensibility interfaces may be exposed, allowing organizations or individuals other than the operator of the logging service to add support for log-based transaction management for new data store types. Example extensions could include write appliers for various data stores not supported natively by the logging service, or data transformers that allow such data stores to serve as sources or destinations of automated cross-data-store transformations of the kinds illustrated in FIG. 27. In at least some embodiments, pricing policies for LCSGs may take the use of such extensions into account—e.g., different charges may apply for transactions that use the extensions than apply for transactions that use natively-supported data stores.

It is noted that in various embodiments, several (or all) of the factors illustrated in FIG. 27 may be combined to identify a specific pricing policy to be used for a given LCSG for a given customer. For example, tiered pricing and/or bandwidth-based pricing may be applied in combination with either provisioned-throughput or best-effort resource allocation modes in some embodiments. Similarly, the number and types of data stores included in the LCSG may influence billing amounts in combination with the workload operation mix, throughput tiers, latency-based pricing and the like in various embodiments.

In at least some embodiments, clients of the logging service may be given the opportunity to select pricing policies and/or cross-data-store operation types from among several options. FIG. 29 illustrates an example web-based interface that may be used to indicate pricing policy options to a user of a service implementing log-coordinated storage groups, according to at least some embodiments. As shown, web page 2901 comprises a message area 2904 and a number of form fields that may be used by a logging service user to experiment with different pricing policy components and select the specific set of pricing policy elements that best suits the user's requirements and budget.

As indicated in message area 2904, the costs of using the LCSG in the depicted embodiment may depend on the number and types of data stores whose transactions are to be managed using the logging service. Using elements 2907, the user may indicate how many different types of data stores are to be included in the LCSG for which the pricing is to be estimated or determined using web page 2901. For example, the client may select zero or more instances of a NoSQL database, zero or more instances of a relational database, zero or more instances of an in-memory database, and/or zero or more instances of other types of data stores. For several of the form fields shown on page 2901 including the data store count fields, the logging service may indicate default values (such as a default value of 1 for the number of No SQL database instances). In some embodiments, as the user fills in values in various form fields, data in other elements of web page 2901 may be updated instantaneously or near-instantaneously. For example, if the user changes the number of NoSQL database instances from 1 to 2, the effect of such a change on the total monthly billing amount 2925 may be indicated in real time.

Using form field 2910, the user may indicate a preference for a resource allocation mode (e.g., provisioned-throughput versus best-effort) in the depicted embodiment. A tiered pricing model may be used both for single-data-store requests and for cross-data-store request in the example scenario of FIG. 29. For each data store type, the expected request rate for writes (e.g., in writes per second) may be indicated using form fields 2913. The expected request rate for cross-data-store writes (between a given source data store type and a given destination data store type) may be indicated using form field 2916. Expected request rates for cross-data-store transformations between other source and destination pairs may be indicated as well, e.g., by clicking on the link shown in field 2916 and indicating the sources, destinations, and rates. For one or more fields such as the fields for write request rates, web page 2901 may provide drop-down menus with a discrete set of options (e.g., so that the user is prevented from indicating unsupported values of the corresponding entities, such as negative request rates). The user may also specify a bandwidth usage tier in the depicted embodiment using element 2919. Custom preferences for latency, data durability and/or availability may be provided by clicking on the link indicated in element 2922, and such preferences may also affect the pricing. An estimate of the billing amount per month, based on the values entered by the user, may be provided in element 2925 of web page 2901. It is noted that the web page 2901 is just one example of a programmatic interface that may be used to allow clients of the logging service to select among pricing policy options. A number of other approaches, such as the use of pre-defined packages of data stores with defined performance characteristics (e.g., "small" versus "medium" versus "large" LCSGs) and pricing policies, may be used in other embodiments. Web pages that take other approaches to pricing, such as budget-based models in which a user indicates a budget first and is then guided towards specific data store combinations, workload mixes and so on that can be supported for such a budget may be used in other embodiments. The factors that are indicated as influencing LCSG pricing may differ in some embodiments than those indicated in FIG. 29. API, custom pricing GUIs or other programmatic interfaces than web pages may be used in various embodiments.

Figure 30:
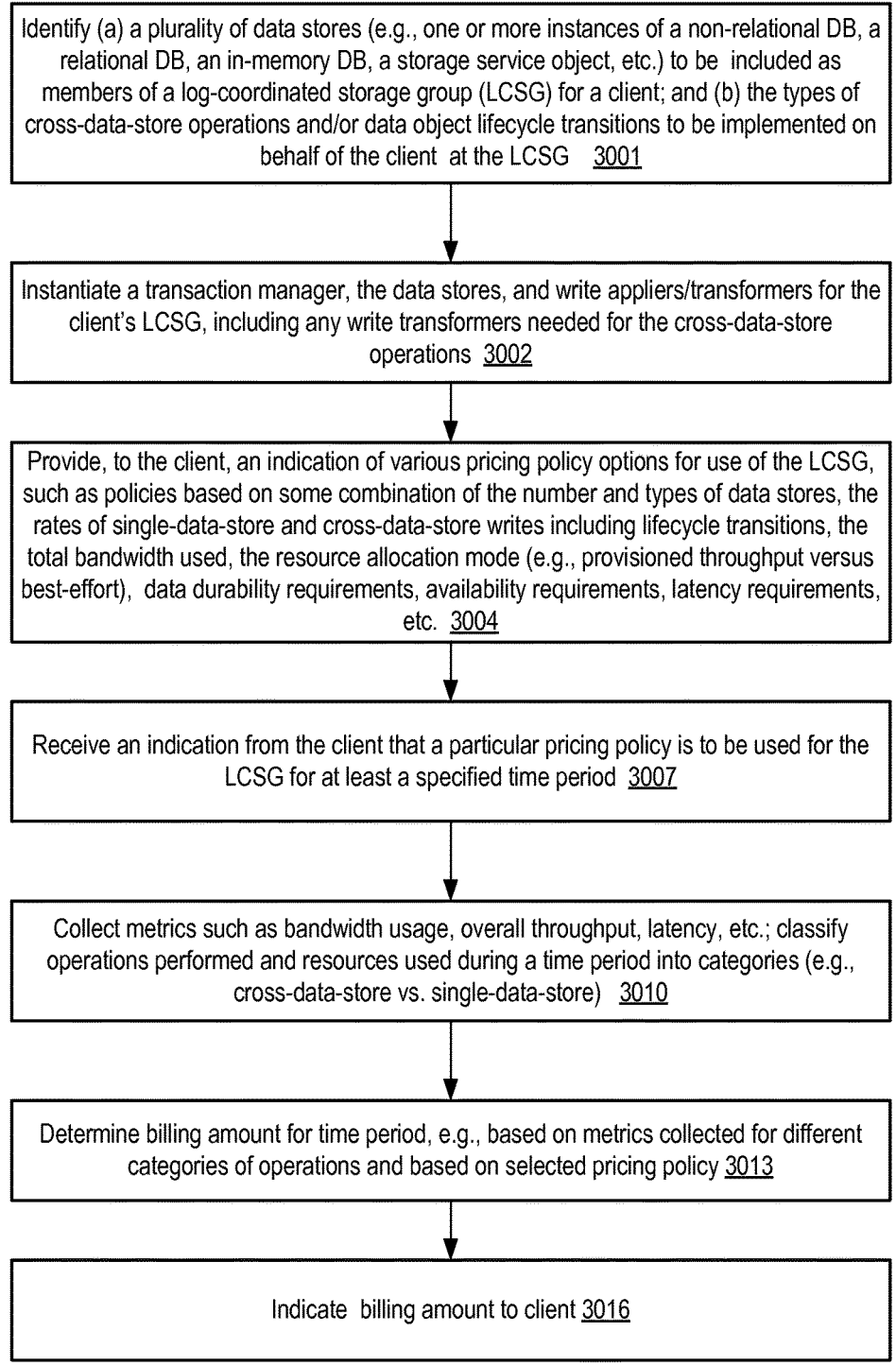
FIG. 30 is a flow diagram illustrating aspects of control-plane operations that may be performed at a service supporting cross-data-store operations at log-coordinated storage groups, according to at least some embodiments.

FIG. 30 is a flow diagram illustrating aspects of operations that may be performed to determine billing amounts at a service supporting log-coordinated storage groups (LCSGs), according to at least some embodiments. As shown in element 3001, the service may determine or identify a plurality of data stores (such as instances of relational databases, non-relational databases, in-memory databases, distributed caching environments, storage service object collections, file systems, and the like) that are to be included as members of a particular log-coordinated storage group on behalf of a client. In addition, the types of cross-data-store operations and/or lifecycle transitions to be performed may also be determined. A transaction manager that implements optimistic concurrency control using a write record log as described earlier, the data stores, and the necessary write appliers/transformers for the types of cross-data-store operations and single-data-store operations expected may be instantiated (element 3002). Reads may be directed to the data stores via their respective read interfaces, while writes may be accepted or rejected by the transaction manager of the LCSG in the depicted embodiment, with writes being propagated between the log and the data stores via the write appliers, and between data stores by write transformers.

As shown in element 3004, an indication of a plurality of pricing policy options or factors influencing billing amounts for LCSG use may be provided to the client. In at least some embodiments, the client may use a programmatic interface similar to that shown in FIG. 29 to indicate potential data store combinations for a given LCSG, and the service may display pricing policy options in response to the client's input. The pricing policy options may include. A wide variety of factors may play a role in determining pricing in different embodiments, including for example some combination of the number and types of data stores that are members of the LCSG, the mix of operation types (e.g., single-data-store writes versus multi-data-store writes, including lifecycle workflow transitions), resource allocation modes (e.g., provisioned-throughput versus best-effort), tiered or absolute performance levels (e.g., for throughput or latency), bandwidth usage, data durability, availability and so on.

An indication may be received from the client that a particular pricing policy, e.g., a policy derived at least in part on input provided by the client with respect to data store choices, expected workload levels for different operation types such as cross-data-store writes and the like, is to be used for the client's LCSG for at least some time period (element 3007). During the time period, various metrics relevant to the pricing policy may be collected and provided, e.g., to a billing/pricing control plane component of the service. Workload-related metrics including the number and rates of various types of client requests (and the response times or latencies associated with the client requests) may be collected, as well as resource-related metrics such as the network bandwidth used by the clients. The control plane component may be responsible for classifying the workload records (and/or resource usage metrics) into sub-groups representing different operation categories, such as cross-data-store versus single-data-store writes in some embodiments (element 3010). Based on the collected metrics and the pricing policy selected for or by the client, a billing amount for the time period may be determined (element 3013) and indicated to the client (element 3016) in the depicted embodiment. In at least one embodiment, a client may use the service's programmatic interfaces to change billing policies for future billing periods.

Descriptors for Read Repeatability Verification

Figure 31:
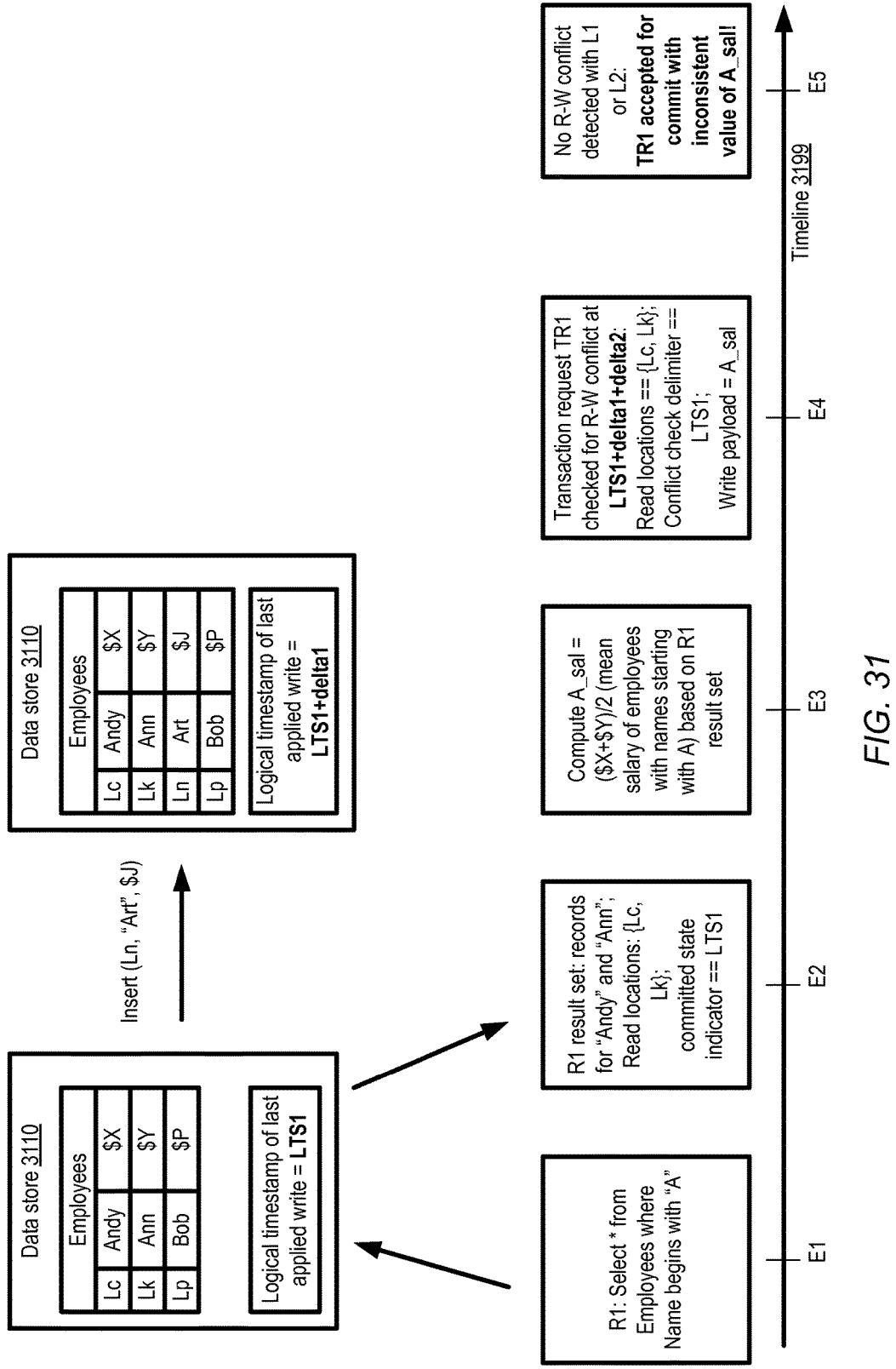
FIG. 31 illustrates an example sequence of events at a storage system in which the use of read-location-based conflict detection for transaction acceptance may lead to data inconsistency, according to at least some embodiments.

As mentioned earlier, for some types of straightforward read operations, a log-based transaction manager may be able to detect conflicts with subsequent writes based on the read locations (i.e., information regarding the addresses from which data was read during a transaction) alone. However, for more complex reads, such purely location-based conflict detection may not suffice. FIG. 31 illustrates an example sequence of events at a storage system in which the use of read-location-based conflict detection for transaction acceptance may lead to data inconsistency, according to at least some embodiments. Timeline 3199 shows a sequence of events E1, E2, E3, E4 and E5 from the perspective of a client of the logging service, with earlier events on the left and later events on the right. A data store 3110 comprises an "Employees" table with at least three records prior to E1. Each record has a respective location (indicated by a label with prefix "L", such as "Lc"), and includes an employee name field and a salary field. Employee "Andy" has a salary of $X, and employee "Ann" has a salary of $Y in the depicted example. Event E1 corresponds to a submission by a client of a read request R1 to retrieve the contents of records of employees whose names begin with "A" (e.g., in SQL-like pseudo-code, a request "Select * from Employees where employee name starts with "A"" may be submitted.) Event E2 comprises a response from the data store, with R1's result set comprising the records of employees "Andy" and "Ann". The addresses/locations Lc and Lk for the two records are also returned to the client, as well as a logical timestamp LTS1 indicating when the most recent committed write (prior to the read) was applied at data store 3110.

The client then performs a computation of the average salary ("A_sal") of employees whose names begin with "A" (event E3), based on R1's result set. In accordance with the result set received by the client, A_sal is set to the mean of $X and $Y (that is, ($X+$Y)/2). Meanwhile, at some time corresponding to (LTS1+delta1), a record for a new employee "Art" (with salary $J) is inserted into the Employees table at a location Ln by a write applier. Unaware of the insertion, the client prepares a transaction request TR1 which includes a write of A_sal as computed by the client. TR1 also indicates the read locations Lc and Lk (e.g., using respective hash signatures of the two locations), and the logical timestamp LTS1 as a conflict check delimiter. TR1 is examined at a log-based transaction manager (LTM) assigned to data store 3110 at a time corresponding to logical timestamp (LTS1+delta1+delta2) (event E4). As part of conflict detection, the log-based transaction manager checks whether the read set locations Lc and Lk have been written to since LTS1, and does not find any such writes. Accordingly, the requested transaction is accepted for commit (event E5) with a commit logical timestamp of (LTS1+delta1+delta2) with an inconsistent/incorrect value for A_sal. (Given the example sequence of events shown, the value of A_sal should have been set to ($X+$Y+$J)/3, instead of ($X+$Y)/2, and therefore may be considered inconsistent or incorrect.) Note that the discrepancy is not a result of an error made by the LTM, but rather the result of the fact that for some types of reads, address-based read-write conflict detection cannot always be used to verify read repeatability (i.e., to check that the result set of the read would not have changed were the read to be re-issued).

In order to handle the kinds of problems illustrated in FIG. 31, read descriptors that are to be included in transaction requests may need to include more complex metadata than location indicators such as address-based hash signatures. For example, for some types of reads, the metadata may comprise an encoding of at least a portion of the query predicate used for the reads (e.g., the "where clause" of an SQL-like query), or even the entire text of the read request. In some cases, a function (or a pointer to a function) that can be invoked to determine whether the read's result set has changed may be indicated in the metadata. The term "read repeatability verification metadata" (RRVM) may be used herein to refer to information that can be used to determine whether a corresponding read request would, if re-submitted, have the same result set as a previous submission of the read request: that is, whether a given read request represents a "repeatable read" at some point after the original submission of the read request.

Figure 32:
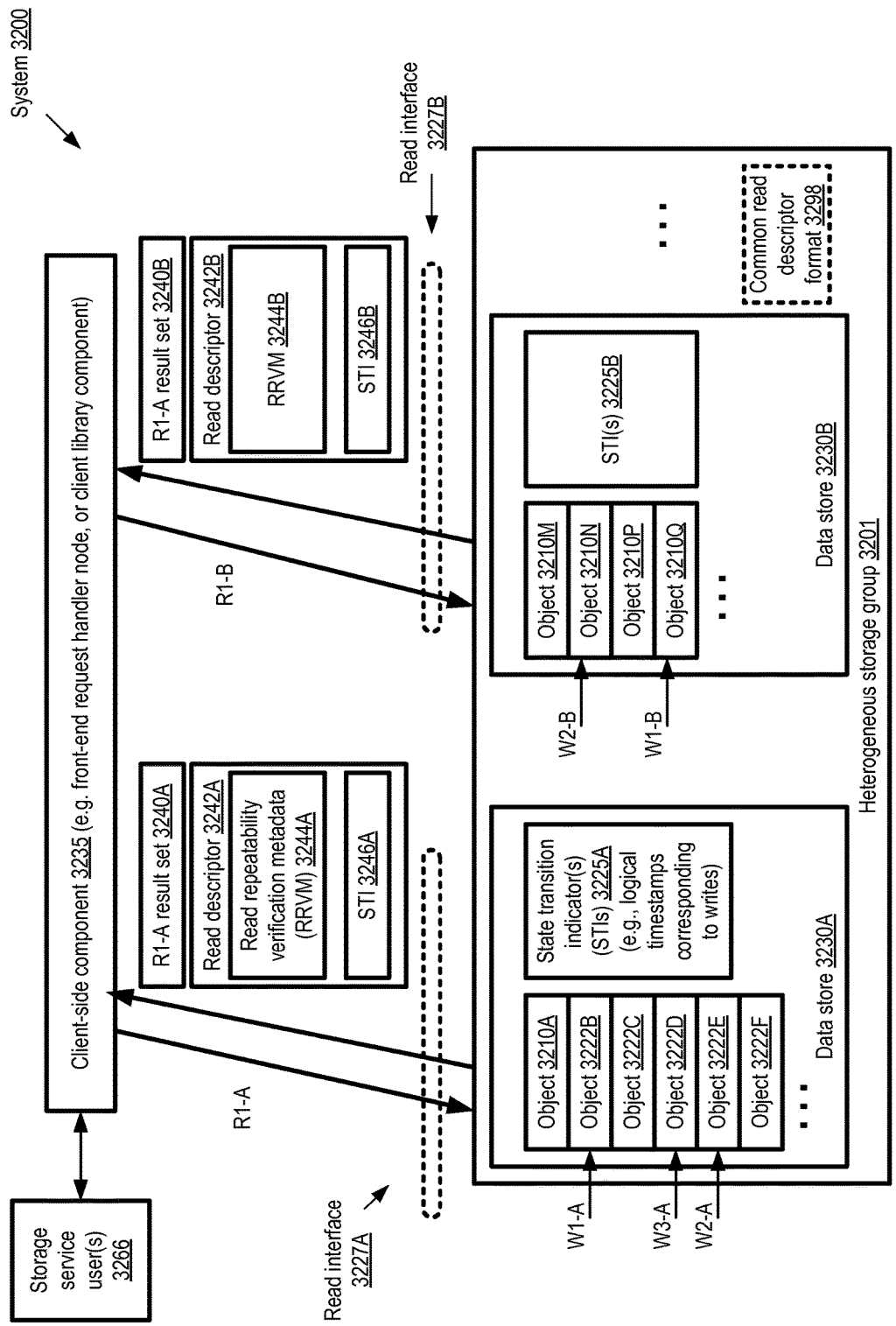
FIG. 32 illustrates a system environment in which a read descriptor provided in response to a read request comprises a read repeatability verification metadata (RRVM) component, according to at least some embodiments.

FIG. 32 illustrates a system environment in which a read descriptor provided in response to a read request comprises an RRVM component, according to at least some embodiments. As shown, system 3200 includes a heterogeneous storage group 3201 of a storage service, with the storage group comprising member data stores 3230A and 3230B. Each data store 3230 may present a respective programmatic read interface, such as read interface 3227A of data store 3230A and read interface 3227B of data store 3230B. The two data stores may differ not only in the read interfaces but also in the underlying data models (e.g., one data store may comprise an instance of a relational database, while the other may represent an instance of a non-relational database). Data stores 3230 may have been registered as members of the storage group 3201 at the request of a particular client in some embodiments, such as the client on whose behalf the data stores were instantiated at a provider network. Each data store may include a respective plurality of data objects (e.g., records, files, unstructured data objects accessible via web service interfaces, cache entries or the like, depending on the nature of the data source), such as objects 3210A-3210F of data store 3230A and objects 3210M 3210Q of data store 3230B. In addition, each data store may store one or more state transition indicators 3225, such as logical timestamps corresponding to various write operations performed at the data stores. For example, in the case of data store 3230A, if three different writes W1-A, W2-A and W3-A were completed or applied in that order, at least one STI 3225A after the write of W3-A is completed may correspond to the logical timestamp associated with W3-A. Similarly, at data store 3230B, at least one STI 3225B after the completion of writes W1-B and W2-B in that order would represent the logical timestamp corresponding to W2-B.

The various member data stores 3230 of the storage group 3201 may each be configured to generate read descriptors according to a common read descriptor format 3298 in the depicted embodiment. In response to a read request R1-A received at data store 3230A via read interface 3227A, for example, a read descriptor 3242A comprising an STI 3246A and RRVM 3244A may be provided to a client-side component 3235 of the storage service. As described above, the RRVM may be used to determine (or predict with some high probability), at some point after the original R1-A result set 3240A is generated, whether the result set of R1-A would have changed. In at least some embodiments, the client-side component 3235 may comprise a front-end request handler node of the storage service that receives end-user read requests (and/or write requests) form end users 3266 and directs corresponding internal requests to the appropriate back-end data stores 3230. In another embodiment, the client-side component 3235 may comprise a component of a library provided by the storage service, which may be installed and executed at a client-owned computing device, e.g., either outside the provider network at which the heterogeneous storage group 3201 is implemented, or within the provider network. In general, any process or device, located either within a provider network at which a heterogeneous storage group is implemented or outside the provider network, that is capable of using the programmatic interfaces described herein for read requests and/or commit requests may serve as a client-side component. Similarly, in response to read request R1-B directed to data store 3230B via read interface 3227B, read descriptor 3242B may be provided to the client-side component in addition to R1-B result set 3240B. Read descriptor 3242B may include RRVM 3244B, which can be used to verify whether R1-B is a repeatable read, and an STI corresponding to the state of data store 3230B at the time that R1-B's original result set 3240B is generated. It is noted that at least in some embodiments, read descriptors 3242 comprising RRVMs 3244 may be provided in response to read requests independently of whether the corresponding read is going to be used for a transaction request or not (e.g., whether a write depends on the result set of the read request, or not). Similarly, read descriptors comprising RRVMs may be provided in at least some embodiments independently of whether the writes to the data store are performed directly by the client-side components, or whether writes are coordinated via a log-based transaction manager of the kinds described above and/or propagated via write appliers of the kinds described above. At least in some embodiments, for simple reads (e.g., "select * from table T1 where record id=RID1"), encodings (e.g., hash signatures) of the address of the read object, or of an identifier of the read object, may be sufficient for verifying read repeatability. Thus, some RRVMs may comprise location-based indicators even in embodiments in which predicate-based or query-clause-based metadata is generated for testing the repeatability of more complex reads. In at least one embodiment, a field indicating the type of the RRVM being provided may be included in the read descriptor—e.g., whether the RRVM is a "single location hash signature" or a "complex query encoding".

Figure 33:
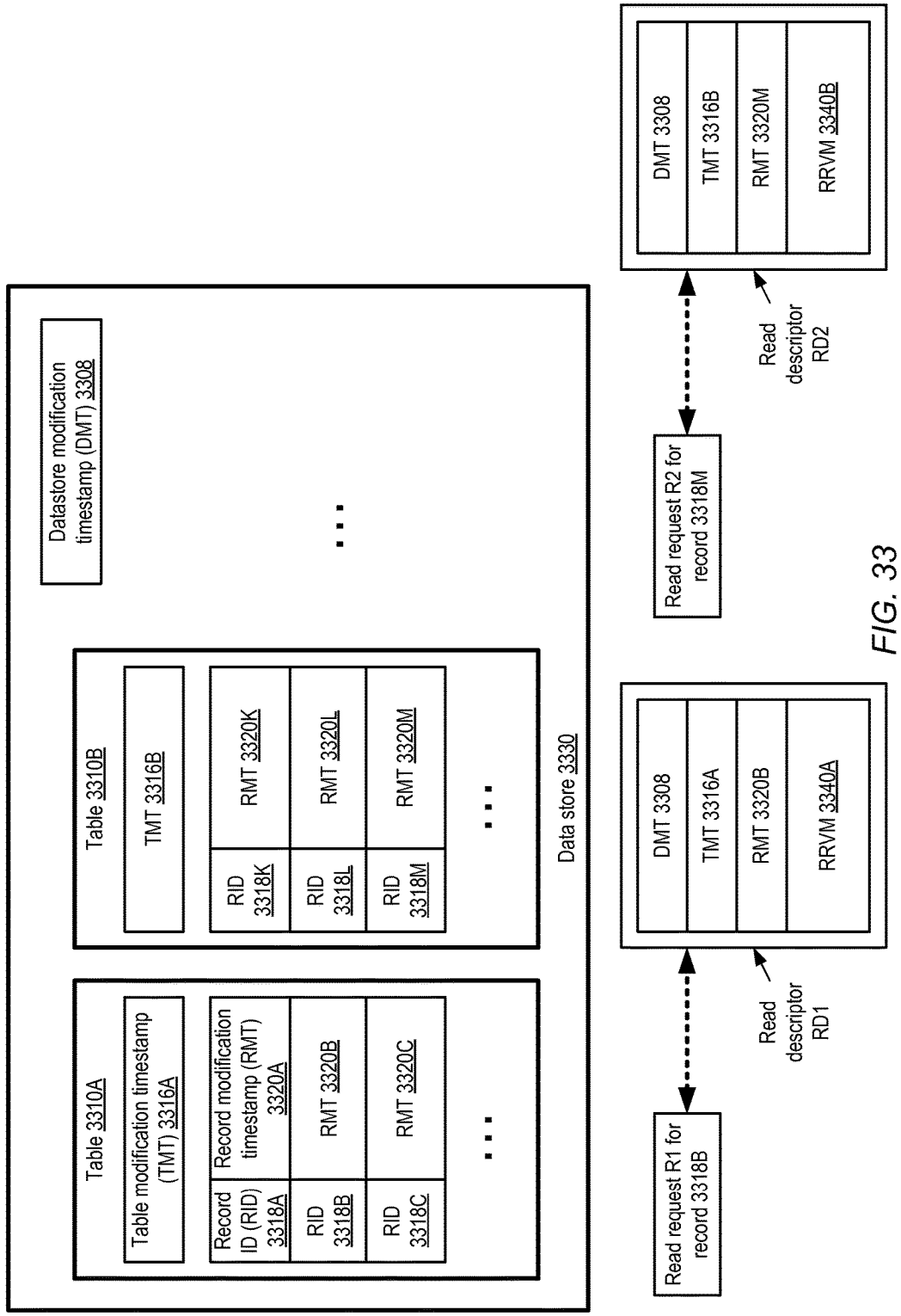
FIG. 33 illustrates example constituent components of read descriptors, according to at least some embodiments.

In at least some embodiments, a data store may store information about state transitions at several different granularities, and more than one state transition indicator may be included in a read descriptor. FIG. 33 illustrates example constituent components of read descriptors, according to at least some embodiments. In the depicted embodiment, an example data store 3330 comprises a plurality of tables 3310, such as table 3310A and 3310B. Each table includes a number of data records, each with a respective record identifier or RID (which may serve as a location indicator for the record) 3318 and a respective record modification timestamp (RMT) 3320 indicative of the latest update or write applied to the record. Thus, for example, table 3310A comprises records with RIDs 3318A, 3318B, and 3318C, while table 3310B comprises records with RIDs 3318K, 3318L and 3318M. Each record may comprise other data columns or attributes, which are not shown. The RMTs 3320 may represent logical timestamps (instead of wall-clock-based timestamps) in at least some embodiments, e.g., expressed in terms of output values of a logical clock accessible to the data store that generates monotonically increasing timestamp values. When a record is inserted into a table 3310, its RMT may be set to the logical timestamp value corresponding to the insertion in the depicted embodiment; later, if the same record is updated, the RMT may be updated to indicate the logical timestamp of the update. A logical clock may be responsible for providing a monotonically increasing sequence of timestamp values (which may not correspond to wall-clock time values) in some embodiments. In one implementation, for each storage group, a single source of logical timestamps may be identified (e.g., a clock associated with a transaction manager of the group). In other embodiments, different data stores may use different logical clocks.

In addition to record-level modification time information, table-level modification time information may be maintained in the depicted embodiment as well, in the form of table modification timestamps (TMTs) such as TMT 3316A for table 3310A and TMT 3316B for table 3310B. The TMT of a table 3310 may indicate the most recent RMT among the RMTs of records of that table in the depicted embodiment. Thus, for table 3310, if at a given point in time the record with RID 3318C is the most recently-written-to record within the table, TMT 3316A may also contain the same logical timestamp value as RMT 3320C. Similarly, at an even higher granularity, a data store modification timestamp (DMT) 3308 may be set to the most recent TMT value among the TMTs of the tables, indicative of the most recent change among any of the records stored at the data store 3330.

In the embodiment shown in FIG. 33, a read descriptor for a read directed to a given record within data store 3310 may indicate the modification logical timestamps for all three levels of the hierarchy—the record level (e.g., indicating the last time at which the record being read was modified), the table level, and the data store level. As shown, in response to a read request R1 whose result set comprises record 3318B of table 3310A, the read descriptor RD1 generated may include RMT 3320B, TMT 3316A, and DMT 3308 (in addition to read repeatability verification metadata (RRVM) 3340A). Similarly, in response to read request R2 whose result set comprises record 3318M of table 3310B, the read descriptor RD2 may include RMT 3320M, TMT 3316B, DMT 3308, and different RRVM 3340B. If a result set of a read comprises several different records, the minimum of the RMTs of those records may be included in some implementations, while the RMTs of all the records may be included in the read descriptor in other implementations. Similarly, if the result of a given read request comprises records from more than one table, the minimum TMT among the tables' TMTs may be indicated in the read descriptor in some embodiments, while a vector comprising all the tables' TMTs may be included in other embodiments. Other hierarchies of state transition records may be used in different implementations, and for different types of data stores. For example, in an embodiment in which a data store table is divided into partitions, partition modification timestamps may be included in the read descriptors (e.g., in addition to or instead of TMTs). For data stores that implement file systems, logical timestamps for writes to files, directories and file systems may be used as the hierarchy of state transition indicators in some embodiments. Inclusion of a hierarchy of state transition indicators (instead of just a single value such as the DMT) in read descriptors may enable log-based transaction managers to make concurrency control decisions at different levels of conservativeness in some embodiments. For example, in one conservative approach, the transaction manager may identify any writes that have been directed to any of the records of the data store since the DMT as conflicting writes, while in a less conservative approach, only writes that have been directed to the specific record(s) read since its RMT may be considered conflicts.

Figure 34:
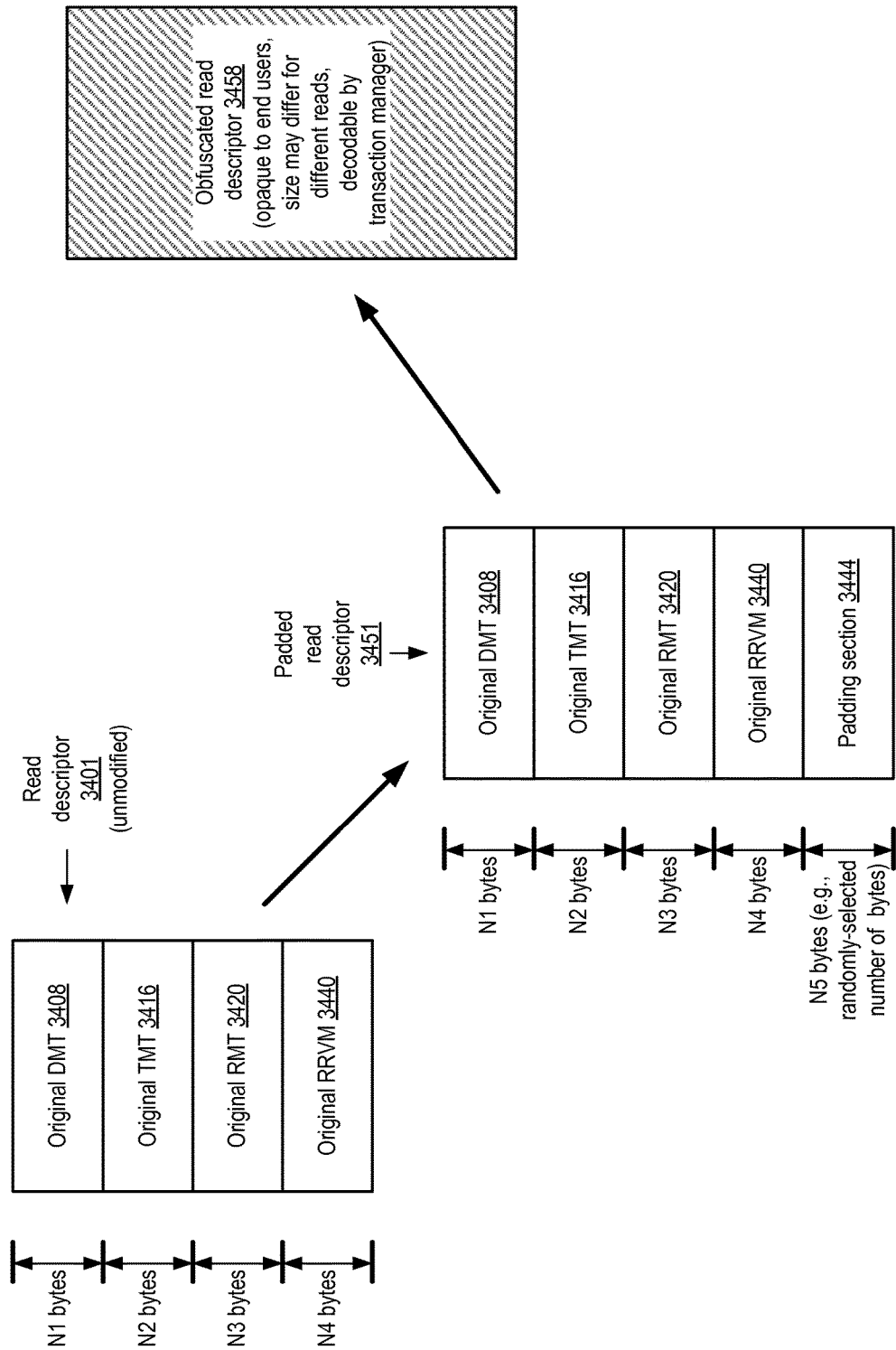
FIG. 34 illustrates example transformations that may be applied to read descriptors before the read descriptors are provided to client-side components of a storage system, according to at least some embodiments.

As indicated in FIG. 32, read descriptors may be provided by data stores of a storage group to client-side components of the system in at least some embodiments. The read descriptors may be incorporated within transaction commit requests generated at the client-side components in some such embodiments, and examined by transaction managers for concurrency control purposes. For a number of reasons, while the read descriptors may have to be decipherable by transaction managers, the operator of a logging service or the provider network may not want the internal details of the read descriptors to be visible to end users that submit the read and write requests in at least some embodiments. For example, the service operator may wish to retain the ability to change the format or contents of read descriptors, which may be harder to do if end users have become used to expecting end-user-readable read descriptors of a fixed size. Accordingly, the contents of read descriptors may be subjected to one or more transformations before they are transmitted to the client-side components in some embodiments. FIG. 34 illustrates example transformations that may be applied to read descriptors before the read descriptors are provided to client-side components of a storage system, according to at least some embodiments. Respective modification logical timestamps for three levels of a storage hierarchy (data store, table and record) are included in the read descriptors generated in the depicted embodiment. As shown a read descriptor 3401 in unmodified or pre-transformation state may comprise N1+N2+N3+N4 bytes, with N1 bytes used for an original DMT 3408, N2 bytes for the original TMT 3416, N3 bytes for the original RMT 3420, and N4 bytes for the RRVM 3440.

In a first transformation, a number (N5) of bytes may be added to the read descriptor as "padding" in the depicted embodiment. Different numbers of bytes may be added to different read descriptors generated at the same data store in some embodiments, e.g., using a random number generator to select the number of padding bytes from within some selected range of padding sizes. In some embodiments, the padding bytes may be populated with randomly-selected data as well. Such randomly-generated padding elements may help ensure that end users do not assume that all read descriptors will have the same size.

In addition to the padding transformation, the read descriptor may also or instead be encoded or obfuscated in some embodiments, so that its elements are no longer interpretable or understandable without decoding. Thus, for example, padded read descriptor 3451 may be encrypted or encoded into obfuscated read descriptor 3458 before transmission to the client-side component. Server-side components of the storage service (such as the transaction manager at which the read descriptor may have to be decoded) may have the necessary metadata (e.g., decryption credentials, or an indication of the function or method to be used for decoding the read descriptor) in the depicted embodiment, but information required to undo the obfuscation may not be made accessible to end users. Different sequences of the two transformations (padding and obfuscation) may be performed in various embodiments—e.g., the original versions of the read descriptor elements may be encoded first in some embodiments, before the padding bytes are added. In some embodiments, only padding or only obfuscation may be used. In at least some embodiments, other transformations may be applied as well before the read descriptors are transmitted to client-side components—e.g., the descriptors may be compressed.

Stateless Data-Store-Independent Transactions

Figure 35:
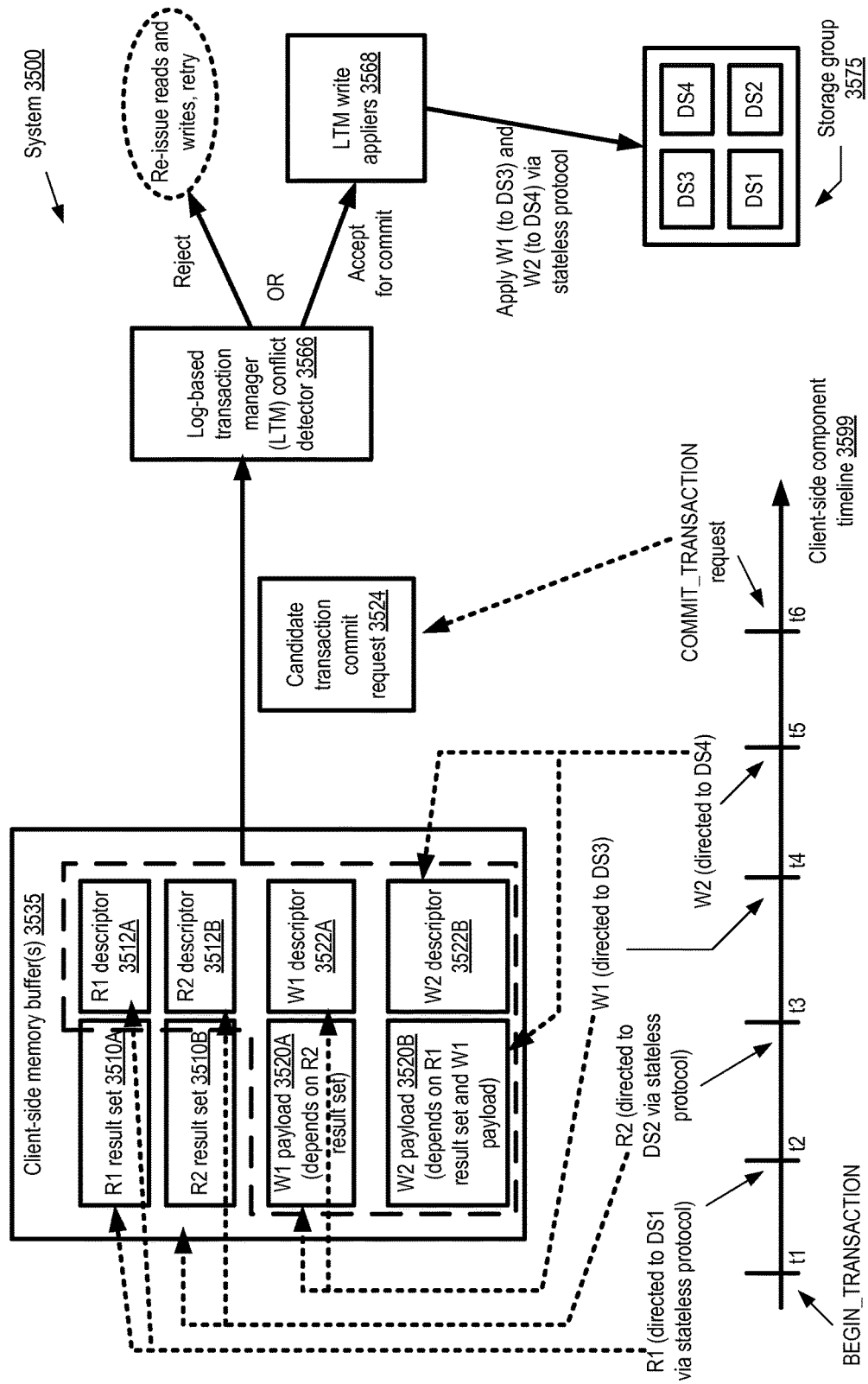
FIG. 35 illustrates an example sequence of events that may lead to a generation of a candidate transaction commit request at a client-side component of a storage system, according to at least some embodiments.

FIG. 35 illustrates an example sequence of operations leading to a submission of a candidate transaction commit request from a client-side component of a storage system, according to at least some embodiments. The client-side component may, for example, comprise a process running at a front-end request handler of a storage service, or a component of a storage-service-provider library installable at a client-owned computing device. A BEGIN_TRANSACTION request may be received at the client-side component, e.g., from an end user, at time t1 on client-side component timeline 3599. The client-side component may allocate or reserve memory buffers 3535 for preparing a candidate transaction request in response to the BEGIN_TRANSACTION request in some embodiments. In other embodiments, memory buffers 3535 may be allocated dynamically as different reads and/or writes of the transaction are completed.

At time t2 on timeline 3599, a read request R1 may be directed from the client-side component (e.g., in response to an end-user read request received at a service front-end request handler or library component) to a data store DS1 of a heterogeneous storage group 3575 via a stateless protocol. The heterogeneous storage group 3575 may include member data stores DS1, DS2, DS3 and DS4 in the depicted embodiment, each of which may have been registered as a member of the storage group whose write operations are to be managed via a log-based transaction manager (LTM). The members of the storage group 3575 may also be required to generate and transmit read descriptors (e.g., descriptors comprising state transition indicators and RRVMs of the kinds described above) in response to read requests. At least some members of the storage group may implement different data models in some embodiments (e.g., relational versus non-relational, structured versus unstructured records), with corresponding read interfaces and record/object storage formats. As mentioned earlier, a number of different categories of data stores may be included in a storage group, including for example instances of relational databases, non-relational databases, in-memory databases, distributed caches, collections of storage objects accessible via web-service interfaces implemented by a provider network service, a queueing service implemented at a provider network, or a notification service implemented at a provider network. The protocol used for the read request R1 may be stateless in that, after the result set 3510A and read descriptor 3512A corresponding to R1 are transmitted to the client-side component, DS1 may not retain any session metadata pertaining to the client-side component in the depicted embodiment. Any of various stateless application-layer protocols may be used for the read request and response in different embodiments, such as any of various HTTP (HyperText Transfer Protocol) variants in accordance with a REST (representational state transfer) architecture. The result set 3510A and the read descriptor 3512A may be stored in the memory buffers 3535.

At time t3 of timeline 3599, a second read request R2 within the scope of the transaction may be submitted to a second data store DS2 of storage group 3575 via stateless protocol, e.g., in response to another read request of the end user. Once again, after providing the result set 3510B and the read descriptor 3512B to the client-side component, the data store DS2 may not retain any session state metadata pertaining to R2 or the client-side component. In the depicted embodiment, none of the member data stores of the storage group 3575 may be aware of the fact that a transaction has been begun at the client-side component; to the data stores, each read request may appear simply as a standalone request that is unrelated to any other read or write.

At time t4, a write W1 whose payload 3520A depends on R2's result set and is ultimately to be applied to data store DS3 (if the candidate transaction being prepared is eventually committed) may be performed locally, e.g., to a portion of memory within the client-side buffers 3535 in the depicted embodiment. A write descriptor 3522A for W1, indicative of the target address to which W1 is directed, may also be created in the buffers. For example, a hash signature of the target address may be used as the write descriptor 3522A in some implementations. At time t5, write W2, whose payload 3520B is dependent on R1's result set and is directed towards DS4 may similarly be performed in local memory of the client-side component. A second write descriptor 3522B for W2 may also be prepared in the client-side component's memory buffer 3535 in the depicted embodiment.

At time t6, a COMMIT_TRANSACTION request may be received from the end user. Accordingly, the read descriptors 3512A and 3512B, the write descriptors 3522A and 3522B, and the write payloads 3520A and 3520B may all be packaged into a candidate transaction commit request 3524 for submission to the LTM of the storage group 3575. The conflict detector 3566 of the LTM may determine, based on analysis of the read descriptors and contents of a selected subset of the LTM's commit record log (where the subset is selected based at least in part on the read descriptors), whether to accept or reject the candidate transaction. If a read-write conflict is detected (e.g., as a result of a determination using an RRVM included in one of the read descriptors) that either R1 or R2 is not repeatable because a subsequent write has changed the result set that would be returned if the read request were re-submitted, the candidate transaction may be rejected. In such a scenario, the client-side component may re-try the reads R1 and R2 in the depicted embodiment, obtaining new results sets and read descriptors, and generate a new candidate transaction commit request for submission to the LTM. Such retries may be attempted some threshold number of times before one of the attempts succeeds, or before the end-user on whose behalf the transaction is being requested is informed that the transaction failed.

If the conflict detector 3566 accepts the commit request 3524, the write descriptors and payloads of W1 and W2 may be stored in the LTM's log in the depicted embodiment. In at least some embodiments, the write descriptors may be considered the logical "duals" of the read descriptors included in the commit requests, in that in order to detect conflicts, writes indicated by previously-stored write descriptors may have to be checked for potential or actual overlaps with reads indicated by the read descriptors. Thus, at a high level, the manner in which writes are indicated in the write descriptors in a given implementation may have to be logically compatible with the manner in which reads are indicated in the read descriptors. Write appliers 3568 of the LTM may, either synchronously or asynchronously with respect to the accept decision, apply the writes W1 and W2 to their target data stores DS3 and DS4. In some embodiments, the write appliers may also utilize stateless protocols, and the targeted data stores DS3 and DS4 may not have to store any session-related metadata pertaining to the write appliers or to the write requests issued by the write appliers.

Thus, in the embodiment shown in FIG. 35, multiple writes (such as W1 and W2) may be committed as part of an atomic transaction prepared at a client-side component, without any transaction-related metadata being generated or stored at the data stores involved. Such client-side multi-write transactions may be implemented in some embodiments even though the underlying data stores may not natively support multi-write transactions, and/or even though the underlying data stores may only support stateless read and write operations. That is, transactional atomicity and consistency may be provided to the users of a heterogeneous storage group even though member data stores do not retain session information (or transaction state information) between the time of occurrence of a given read and the time of occurrence of a write that depends on the results of the given read.

Figure 36:
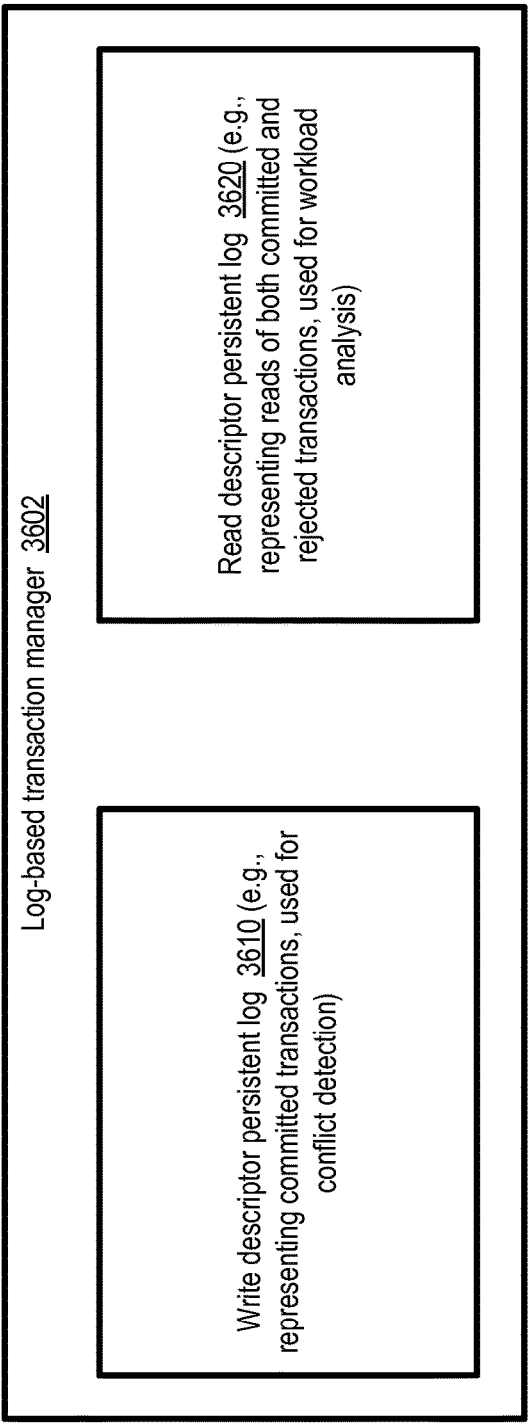
FIG. 36 illustrates an example transaction manager that stores write descriptors and read descriptors in respective logs, according to at least some embodiments.

As described earlier, a log-based transaction manager may store write descriptors (such as 3522A and 3522B) corresponding to committed writes in a persistent change log (such as a log implemented using the replication DAGs described above). In some embodiments, the contents of read descriptors may also be saved by a transaction manager, even though the read descriptors of a committed transaction may not be required for making future commit decisions. FIG. 36 illustrates an example transaction manager that stores write descriptors and read descriptors in respective logs, according to at least some embodiments. As shown, log-based transaction manager 3602 uses two separate persistent logs: a write descriptor log 3610 and a read descriptor log 3620. In other embodiments, both types of descriptors may be stored in a shared persistent log. The contents of read descriptor log 3610 may be used to check for read-write conflicts as part of the optimistic concurrency control approaches described earlier, and/or for logical constraint management as also described earlier. Read descriptor log 3620 may be used, for example, for workload analysis, e.g., to determine the distribution of reads across different portions of the heterogeneous storage group. In some embodiments, the read descriptors of both committed and rejected transactions may be retained for workload analysis purposes. The read descriptors of rejected transactions may also be analyzed to identify the causes of transaction rejections—e.g., to determine whether any actions should be taken (such as partitioning a particular data object that is read frequently enough and updated frequently enough to cause a lot of transaction rejections) to reduce the frequency of transaction rejection.

Figure 37:
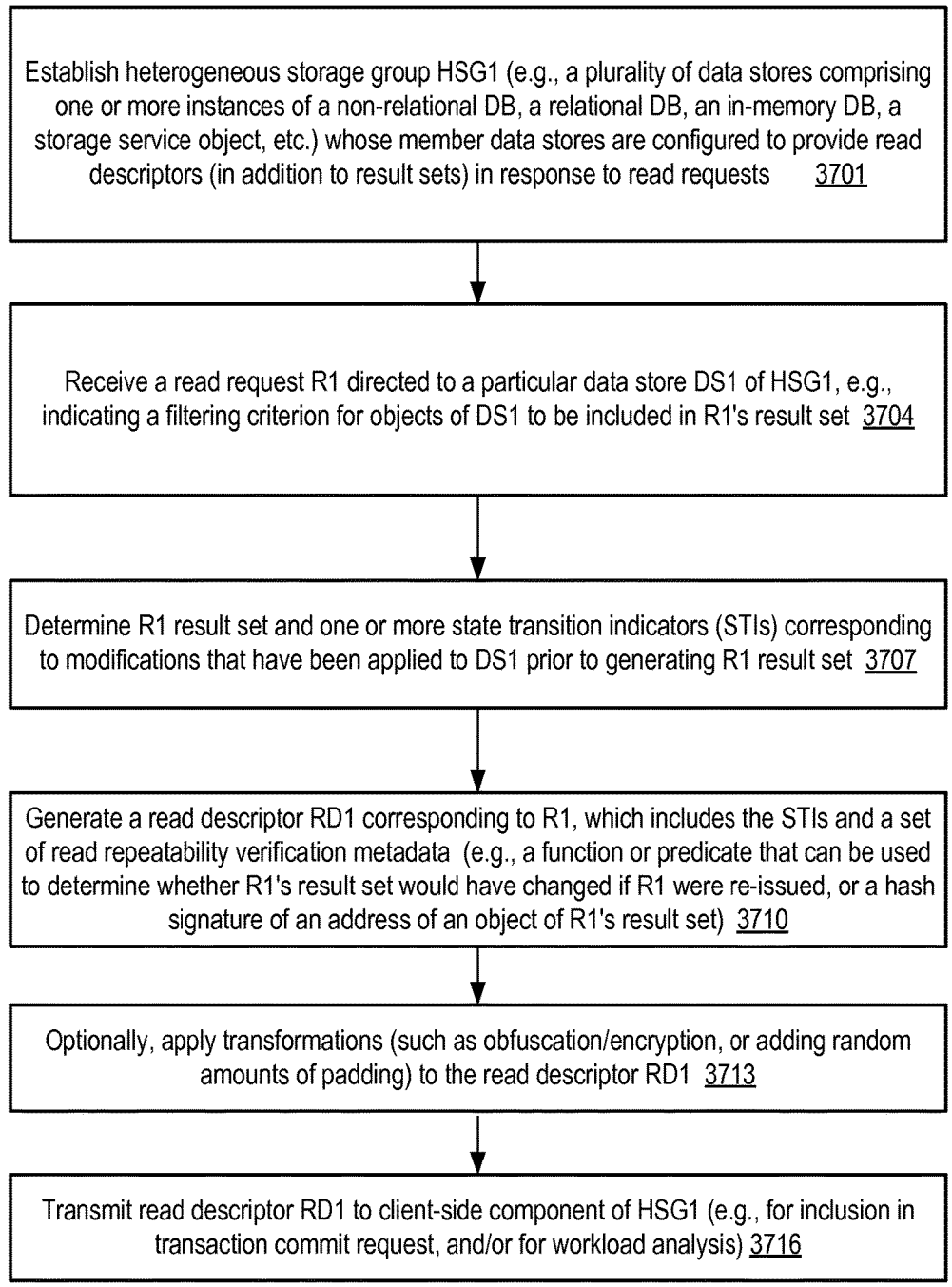
FIG. 37 is a flow diagram illustrating aspects of operations that may be performed at a storage system in which read descriptors are provided in response to read requests, according to at least some embodiments.

FIG. 37 is a flow diagram illustrating aspects of operations that may be performed at a storage system in which read descriptors are provided in response to read requests, according to at least some embodiments. As shown in element 3701, a heterogeneous storage group HSG1 comprising a plurality of data stores may be established. Different data models and/or read interfaces may be supported by the member data stores of the group—e.g., the group may comprise one or more instances of a relational database, a non-relational database, an in-memory database, a distributed cache instance, a file store or file system, a storage service that comprises unstructured data objects accessible via a web service interface, and so on. Clients of the service implementing HSG1 may register (add) data stores to the group or remove data stores from the group programmatically. In at least some embodiments, all the member data stores of the group HSG1 may be required to respond to read requests with (in addition to the read result sets) read descriptors in accordance with a common read descriptor format indicated by the service.

A particular read request R1, directed to a data store DS1 of HSG1 may be received (element 3704). R1 may include an indication of a filtering criterion to be used to determine its result set. The nature of the filtering criterion may differ, depending on the type of data store targeted. For example, if R1 is a database that supports SQL (Structured Query Language) or SQL-like interfaces, the filtering criterion may be expressed as an SQL select clause. If DS1 is a storage service that presents a web service interface, the filtering criterion may be expressed as one or more URLs (Universal Resource Locators). For key-value data stores, the filtering criterion may comprise a set of unique keys which in turn correspond to specific record locations/addresses within the data store. The result set of the read request may be identified, together with one or more state transition indicators (STIs) of the data store DS1 that represent a previously-committed state of DS1 (element 3707). The STIs may comprise logical timestamps corresponding to the application of committed writes to the data stores in some embodiments, such that the results of the committed writes were visible at the time that the result set is generated. In one implementation, for example, the STIs may include one or more of: a data-store-level modification logical timestamp, a table-level modification logical timestamp, or a record-level modification logical timestamp (e.g., the DMTs, TMTs and RMTs illustrated in FIG. 33). In some embodiments, wall-clock-based timestamps may be used instead of or in addition to logical timestamps.

A read descriptor RD1 corresponding to R1 may be generated (element 3710). The read descriptor may include, for example, the STI(s) and at least some read repeatability verification metadata (RRVM). The RRVM may be used, for example, to determine whether R1 is a repeatable read, i.e., whether, at some point after the result set is obtained the first time, R1's result set would remain unchanged if R1 were re-issued. The format and content of the RRVM may differ in different embodiments, e.g., based on the types of reads for which repeatability is to be determined, the nature of the data store involved, and so on. In some embodiments, for example, the RRVM may include an encoding of a location from which an object of the R1 result set is obtained, such as a hash signature of at least one such location. For reads with more complex filtering/selection criteria, such as range queries or queries similar to the read discussed in the context of FIG. 31, an encoding of the query predicate or select clause may be included in the RRVM. In some embodiments, a function that can be executed to determine whether the results of R1 have changed may be indicated in the RRVM. In one implementation, the entire read request R1 may be included in the RRVM, e.g., in an encoded or compressed format. In some embodiments in which several different types of RRVM may be generated (e.g., address-based signatures versus query predicate encodings versus functions), the type of RRVM may be indicated by a field within the read descriptor RD1. RD1 may be transmitted to a client-side component of HSG1 (e.g., a front-end request handler node of the service at which HSG1 is implemented, or a library component of the service). RD1 may be used at the client-side component for constructing a transaction commit request in some embodiments, or for other purposes such as workload analysis.

Figure 38:
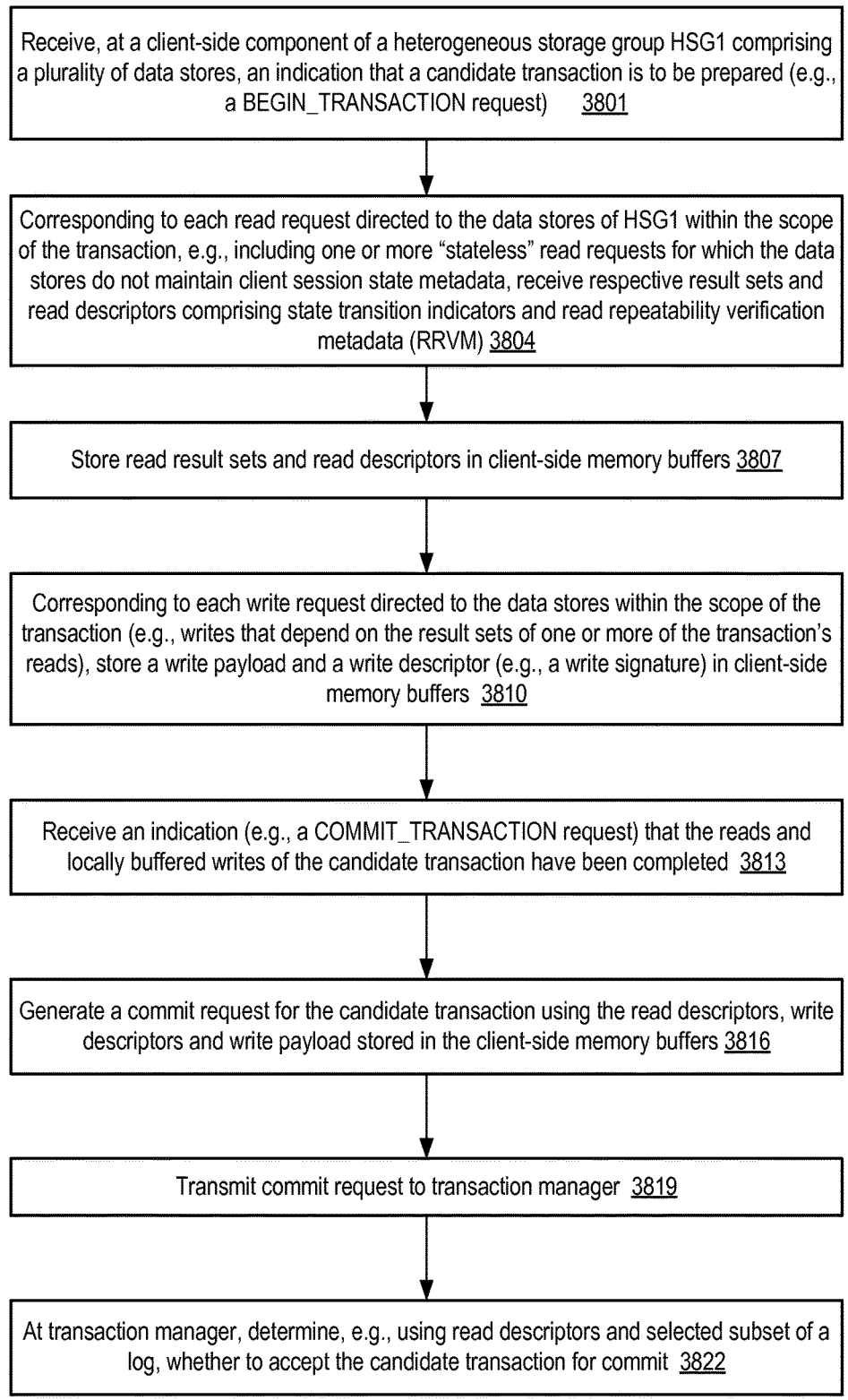
FIG. 38 is a flow diagram illustrating aspects of operations that may be performed at a storage system in which candidate transaction requests are generated at a client-side component, according to at least some embodiments.

FIG. 38 is a flow diagram illustrating aspects of operations that may be performed at a storage service in which candidate transaction commit requests are generated at a client-side component, according to at least some embodiments. The client-side component may comprise, for example, one or more processes running at a front-end request handler node of the storage service, or within a library provided by the storage service to a customer. As shown in element 3801, an indication that a candidate transaction is to be prepared may be received at a client-side component of a heterogeneous storage group HSG1 from an end-user, such as a BEGIN_TRANSACTION request received via an application programming interface (API) of the service. In some implementations, the set of operations performed at the client-side component between a BEGIN_TRANSACTION request and a COMMIT_TRANSACTION request (or an END_TRANSACTION request) may be considered to be within the scope of the transaction, e.g., in the sense that the repeatability of the reads issued within that interval may have to be verified before the writes of the transaction are committed.

One or more read requests may be directed to the data stores of the storage group HSG1 within the scope of the transaction by the client-side component, e.g., in response to read API calls made by the end-user. At least some of the reads may be performed using a stateless protocol in the depicted embodiment—that is, the data store to which a read is directed may not be required to maintain client session information, or retain any other persistent metadata pertaining to the read request. The data store may have no information indicating that the results of the read are going to be used for a write operation or transaction, for example. Corresponding to each such read request, a result set and a read descriptor may be provided by the targeted data store (element 3804). A given read descriptor may include one or more state transition indicators (STIs) indicative of a committed state of the data store (or a committed state of a subset of the data store, such as a table or a record in the case of a database instance) as of the time the result set is obtained. In addition, a read descriptor may also contain at least one element of read repeatability verification metadata (RRVM)—e.g., information such as an encoding of a read query or predicate, a function, or a hash signature representing a read target location, which can be used to check whether the results of the read would have changed if the read were re-submitted. The read result sets and read descriptors may be stored in memory buffers accessible by the client-side component (element 3807), e.g., in local memory at the front-end request handler node or at a client-owned computing device.

One or more writes whose write payloads may be dependent upon at least one of the read result sets may be performed using local memory—e.g., the write payloads may be stored in buffers writable by the client-side component. In at least one embodiment, the target location at a data store of HSG1 that is eventually to be written to as a result of a write within the transaction's scope may also be dependent on a read result set. A write descriptor (e.g., a hash signature based on the target HSG1 location of a write) may also be stored for at least some of the writes in client-side memory buffers in some embodiments (element 3810). It is noted that in some embodiments, write descriptors may not be required—e.g., a write payload may include an indication of a write location, and the location indication may suffice for read-write conflict detection. After all the reads and writes of the transaction are performed locally, an indication that the transaction's local operations have been completed (such as a COMMIT_TRANSACTION or END_TRANSACTION request) may be received at the client-side component (element 3813).

A commit request for the candidate transaction may be generated at the client-side component, comprising the read descriptors, write payloads and write descriptors in the depicted embodiment (element 3816). It is noted that in some embodiments, one or more writes included within the scope of a transaction may not necessarily depend on results of a read indicated in the transaction. In some embodiments, in which for example logical constraints of the kind described earlier (e.g., de-duplication constraints or commit sequencing constraints) are to be checked before the candidate transaction is accepted for commit, additional data signatures may be generated for the logical constraints and incorporated into the commit request. The commit request may be transmitted to a transaction manager responsible for making commit decisions for HSG1 (element 3819), such as a log-based transaction manager configured to use an optimistic concurrency control mechanism of the kind described above. A decision as to whether to commit or reject the candidate transaction may be made at the transaction manager (element 3822), e.g., using the read descriptors and a selected subset of a log to identify read-write conflicts as described earlier. If a decision to accept the candidate transaction is made (e.g., if read-write conflicts are not detected in accordance with the concurrency control protocol being used), a new commit record may be added to the transaction manager's log. In at least some embodiments, the log may be implemented using a replication directed acyclic graph (DAG) as described earlier.

Using Multiple Log-Based Transaction Managers for Scalability

In some embodiments, a single log-based transaction manger (LTM) may not be able to cope with the rate at which transactions are requested for a storage group comprising one or more data stores of the kinds described above. For example, in at least some implementations, as the rate of requested commits or transactions increases, the CPU resources available for inserting commit records into a persistent log (e.g., at a host at which a given node of a replication DAG used for the persistent log is implemented) may become a bottleneck. In some cases, in addition to or instead of the CPUs, the storage devices used for the log records and/or the network pathways to or from the logs may become bottlenecks. Any single such bottleneck, or a combination of such bottlenecks, may result in a cap on the transaction throughput that can be supported by a given LTM. Deploying faster individual servers, faster storage devices or faster network components to support increased throughput by a given LTM may eventually become impractical, e.g., for cost reasons, availability reasons, and/or simply because even the fastest available components may be unable to handle some workloads.

Accordingly, in at least some embodiments, the data of one or more data stores of a storage group for which optimistic log-based concurrency control is to be used may be logically divided into partitions, with respective LTMs assigned to different partitions for partition-level conflict detection. For example, in the case of a database with a set of table T1, T2, T3, T4 and T5, one LTM may be assigned to a partition comprising T1, T2 and T3, and a different LTM may be assigned to a partition comprising T4 and T5. Each such LTM may be able to perform local conflict detection with respect to its own persistent log in which commit records for one particular partition are stored. Commit decisions for transactions whose reads and writes are all directed to a single partition may be dealt with by a single LTM, in a manner similar to that described earlier. However, some transaction may involve reads from (and/or writes to) multiple partitions. Such transactions may be termed multi-partition transactions herein. In embodiments in which multi-partition transactions are supported, a client-side component (such as a process at a front-end request handler of a storage service at which log-based transaction management is being implemented, or a component of a library provided by such a service for installation at a client-owned device) may have to participate in committing the multi-partition transactions as described below, together with respective LTMs assigned to detect local conflicts for the partitions involved.

Consider a simple example multi-partition transaction MPT1 which includes (a) a write W1 to a partition P1 of a storage group, where W1 depends on a result of an earlier read R1 directed to P1, and (b) a write W2 to a partition P2, where W2 depends on a result of an earlier read R2 directed to P2. In this example, log-based transaction managers LTM1 and LTM2 are designated to detect read-write conflicts with respect to P1 and P2 respectively. In one embodiment, a commit request CR1 (which includes a write descriptor for W1 and a read descriptor RD1 for R1) may be sent by a client-side component CSC1 to LTM1. In at least some embodiments, the read descriptor RD1 may include the kinds of read repeatability verification metadata and state transition indicators discussed earlier, e.g., with respect to FIG. 32-FIG. 38. Using RD1 and LTM1's log of committed writes, LTM1 may determine whether CR1 has locally-detectable conflicts, i.e., conflicts that can be identified using the information available at LTM1. If no conflicts are found by LTM1 using its log and RD1, LTM1 may designate CR1 as conditionally committable, and insert a conditional commit record in LTM1's log. The client-side component CSC1 may be informed that W1 has been designated as conditionally committable. For the second write W2 of MPT1, CSC1 may similarly send a second commit request CR2 to LTM2. If CSC1 is informed by LTM2 that W2 is also locally committable (e.g., that a conditional commit record has been stored for W2 in LTM2's log), CSC1 may determine that MPT1 is globally or unconditionally committable. CSC1 may then insert an unconditional commit record for MPTR1 into a multi-partition commit decision repository (MCDR), e.g., at a location to which a pointer is stored within the conditional commit records corresponding to CR1 and CR2. A write applier WA1 assigned to propagate committed writes to P1 may examine the commit record generated in response to CR1, indicating that W1 was found conditionally committable. Upon determining that W1 was conditionally committed, WA1 may search for a corresponding unconditional commit record in the MCDR. In some embodiments, if such an unconditional commit record is found (e.g., within a timeout period as described below), W1 may be propagated to P1. Similarly, a write applier (either WA1 or a different write applier WA2) designated to propagate writes to P2 may examine the conditional commit record corresponding to CR2 and W2, look up the unconditional commit record of MPT1, and propagate W2 to P2. If the unconditional commit record is not found by the write applier(s), the writes may be abandoned (e.g., neither W1 nor W2 mat be propagated to their respective destination partitions) in at least some embodiments.

Figure 39:
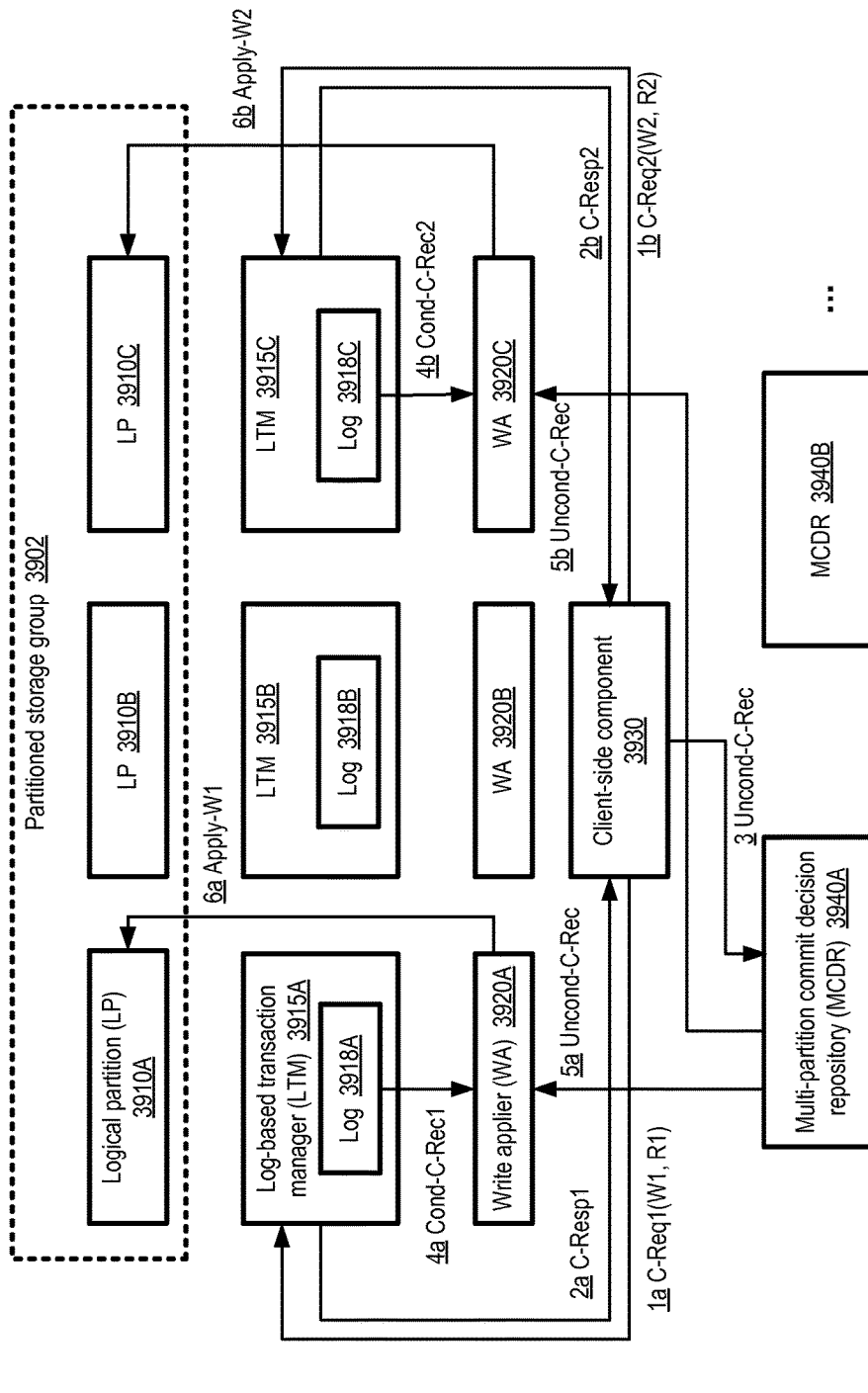
FIG. 39 illustrates an example system environment in which respective log-based transaction managers may be established for different partitions of a storage group, according to at least some embodiments.

FIG. 39 illustrates an example system environment in which respective log-based transaction managers (LTMs) may be established for different partitions of a storage group, according to at least some embodiments. As shown, in system 3900, a partitioned storage group 3902 may comprise three logical partitions (LPs): LP 3910A, 3910B and 3910C. In general, a storage group comprising one or more data stores of the kinds described earlier (e.g., relational database instances, non-relational database instances, storage service objects, in-memory database instances, distributed cache instances, file systems, and the like) may be logically subdivided into any desired number of partitions in various embodiments, depending on various factors such as the target performance requirements of the storage group as described below. In some embodiments, the logical partitions may also be stored in respective physical storage devices—e.g., a table T1 in a partition P1 may be stored on a disk D1, a table T2 in a partition P2 may be stored on a different disk D2, and so on, although such physical separation of logical partitions may not be a requirement. Each logical partition has a corresponding LTM and a corresponding write applier (WA) configured in the depicted example, although such 1:1 mappings between LTMs and WAs may not be required in at least some embodiments. LP 3910A has LTM 3915A with a persistent log 3918A, LP 3910B has LTM 3915B with persistent log 3918B, and LP 3910C has LTM 3915C with persistent log 3918C in system 3900. The persistent logs 3918 may each be implemented using a replication DAG similar to the replication DAGs described earlier in some embodiments. WA 3920A is configured to examine commit records in log 3918A and propagate at least some of the writes indicated therein to LP 3910A; similarly, WA 3920B is configured to examine commit records of log 3918B and propagate at least some writes to LP 3910B, and WA 3920C is configured to examine commit records of log 3918C and propagate at least some writes to LP 3910C.

As indicated by arrows 1a and 1b, client-side component 3930 of the storage group 3902 may submit respective commit requests C-Req1 and C-Req2 of a multi-partition transaction MPT1 to LTM 3915A and LTM 3915C respectively. C-Req1 may include at least one write W1 that depends on an earlier read R1 directed to LP 3910A, while C-Req2 may include at least one write W2 that depends on an earlier read R2 directed to LP 3910C. Using (a) read descriptors included in the commit requests and (b) logs 3918A and 3918C, LTMs 3915A and 3915C may respectively determine whether the writes W1 and W2 are conditionally committable (e.g., whether any read-write conflicts with the writes can be detected using the respective local logs and the respective read descriptors). A write such as W1 or W2 of a multi-partition transaction may be deemed conditionally (rather than unconditionally) committable by a given LTM in the depicted embodiment because the LTM may not have sufficient information to make a decision regarding the commit of the multi-partition transaction as a whole—in fact, in at least some implementations an LTM may not even be aware of other writes of the multi-partition transaction. If no conflicts are detected using locally available information, for example, a conditional commit record Cond-C-Rec1 corresponding to C-Req1 may be stored in log 3918B by LTM 3910A, and a conditional commit record Cond-C-Rec2 corresponding to C-Req2 may be stored in log 3918C by LTM 3910C. In addition, in at least some embodiments, a respective response indicating that the requested write was conditionally committed may be provided to the client-side component 3930 by each of the LTMs 3915A and 3915B. Thus, as indicated by arrow 2a, response C-Resp1 may be provided to client-side component 3930 by LTM 3915A, and response C-Resp1 may be provided by LTM 3915B as indicated by arrow 2b. It is noted that the commit requests C-Req1 and C-Req2 may be sent in parallel in at least some implementations, and similarly, the processing of the commit requests may also be performed in parallel. In at least some embodiments, the different commit requests of a multi-partition transaction may be sent in any order or in parallel, the corresponding conditional commit records may be stored by the respective LTMs in any order or in parallel, and responses to the commit requests may be received by client-side components in any order or in parallel.

In response to confirmation that the writes W1 and W2 are both conditionally committable in the depicted example, the client-side component 3930 may store an unconditional commit record Uncond-C-Rec in a multi-partition commit decision repository (MCDR) 3940A (arrow 3). In general, the client-side component may store such unconditional commit records after verifying that all the writes of a given multi-partition transaction such as MPT1 have been designated as conditionally committable in at least some embodiments. In the depicted example, two MCDRs 3940A and 3940B have been established for storage group 3902. In general, any desired number of MCDRs may be established in various embodiments, e.g., based on an expected or targeted throughput of multi-partition transaction requests as discussed below. In embodiments in which multiple MCDRs are established, the decision as to which MCDR is to be used for a given unconditional commit record may be made based on various factors—e.g., based on the specific partitions involved in the transaction, based on a load-balancing criterion implemented by the client-side component, and so on. In at least some embodiments, an indication of the location at which the unconditional commit record will be stored may be included in the commit requests sent by the client-side component to the LTMs, and may also be included in the conditional commit records stored in logs 3918. In some implementations, an MCDR may be implemented as an instance of a persistent log (similar to the logs 3918, for example).

At some point after the conditional commit record Cond-C-Rec1 has been stored in log 3918A, write applier 3920A may examine the record (as indicated by arrow 4a). In some cases such an examination may be synchronous (e.g., as soon as a conditional commit record is written to a log 3918, it may be read by a write applier responsible for pushing committed writes to a data store of the storage group), while in other cases a write applier may examine commit records asynchronously with respect to the conditional commit decision. Upon examining Cond-C-Rec1, WA 3920A may determine that the commit is conditional, and may therefore try to find a corresponding unconditional commit record. In at least some embodiments, an indication of a location of the unconditional commit record Uncond-C-Rec may be included in the conditional commit record Cond-C-Rec1. In other embodiments, the write appliers may learn about the location of unconditional commit records from other sources, e.g., by looking up an identifier of the multi-partition transaction in a database. As indicated by arrow 5a, WA 3920A may locate Uncond-C-Rec in MCDR 3940A in the depicted embodiment, and thereby confirm that the write indicated in the conditional commit record Cond-C-Rec1 is actually to be applied to its targeted destination. As indicated by arrow 6a, write W1 may therefore be propagated to partition LP 3910A. Write applier 3920C may perform a similar procedure as WA 3920A in the depicted embodiment—e.g., it may synchronously or asynchronously examine the conditional commit record Cond-C-Rec2 (arrow 4b), determine the location at which a corresponding unconditional commit record is expected to be stored, and look up Uncond-C-Rec (arrow 5b). After confirming that the multi-partition transaction of which W2 is a part has been unconditionally committed, WA 3920C may accordingly propagate W2 to its intended destination, LP 3910C.

As described below in further detail, in at least some embodiments, a timeout mechanism may be implemented such that if either WA 3920 is unable to confirm that the unconditional commit record Uncond-C-Rec has been written within some time interval, the propagation of the corresponding write(s) such as W1 or W2 may be abandoned. In some embodiments, if an LTM 3915 does find a conflict that renders a write of a multi-partition transaction un-committable, the client-side component 3930 may store an unconditional abort record instead of an unconditional commit record in the MCDR 3940A. Consider a scenario in which LTM 3915A designates W1 as conditionally committable, but LTM 3915B designates W2 as un-committable based on a conflict. In the latter scenario, if and when WA 3920A tries to find an unconditional commit record for the multi-partition transaction of which W1 is a part, it may instead find that the multi-partition transaction has been abandoned/aborted, and may accordingly abandon propagation of write W1. In at least some embodiments, if a decision to abandon/abort a multi-partition transaction is made, the conditional commit records in the logs 3918 may be modified (e.g., to indicate the abort) or removed. Similarly, in some embodiments, if a decision to unconditionally commit a multi-partition transaction is made, the corresponding conditional commit records in logs 3918 may be modified to indicate that the parent multi-part-transaction was unconditionally committed. Since at least some of the conflict detection operations for commit decisions may be made based on the contents of the logs 3918, resolving the ambiguity of the conditionality of the commits may be helpful in making subsequent commit decisions in such embodiments.

Figure 40:
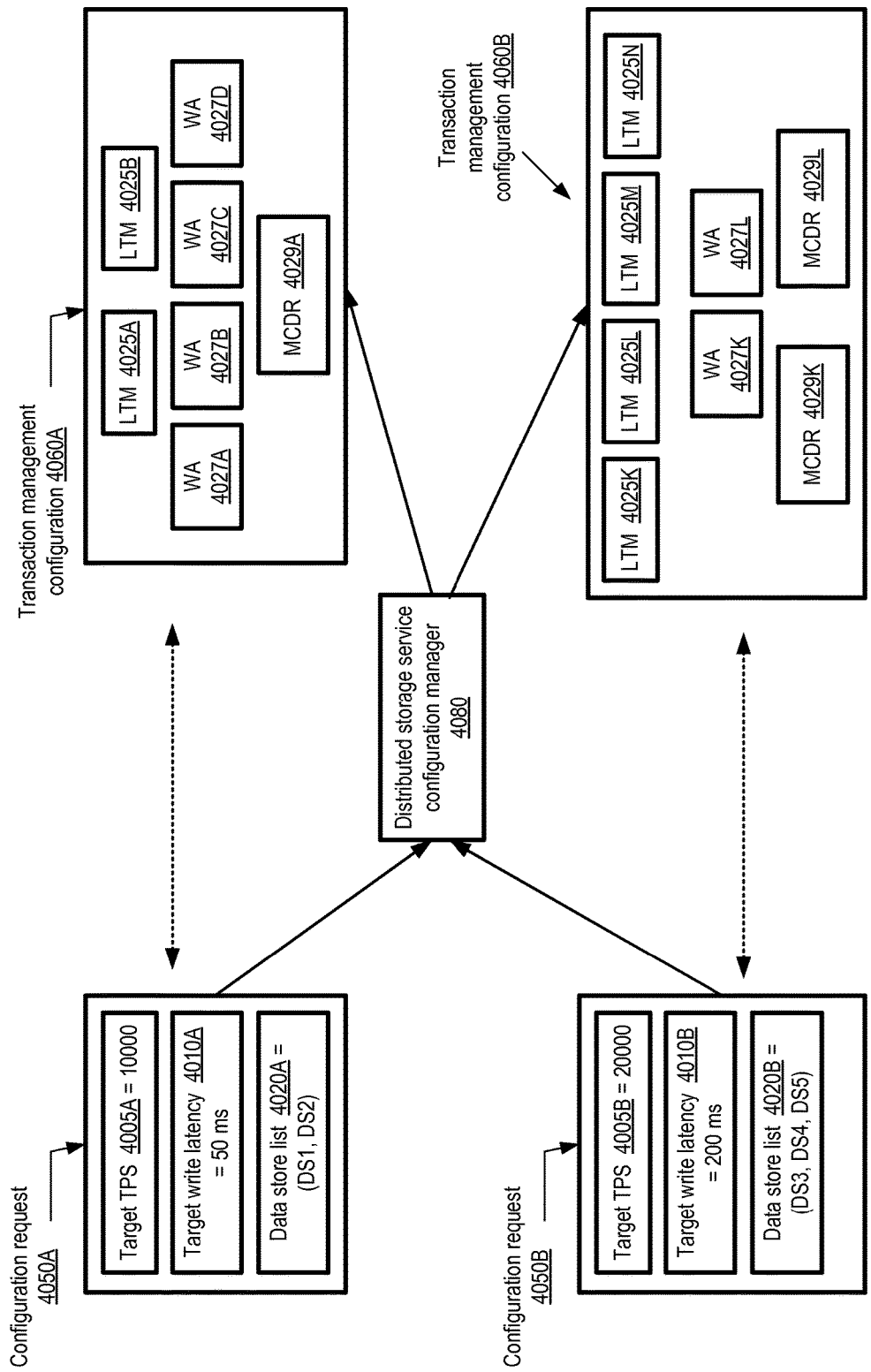
FIG. 40 illustrates examples of performance-based transaction management configurations for storage groups, according to at least some embodiments.

Decisions regarding the number of LTMs, WAs, and MCDRs to be included in a configuration for a storage group may be based on a variety of factors in different embodiments. FIG. 40 illustrates examples of performance-based transaction management configurations for storage groups, according to at least some embodiments. As shown, a distributed storage service configuration manager 4080 may receive respective configuration requests 4050A and 4050B for two storage groups. Configuration request 4050A may indicate that the client has a target transaction throughput rate or TPS (transactions per second) 4005A of 10000 and a target write latency 4010A of 50 milliseconds (e.g., the delay between a write request and the propagation of the corresponding write to the targeted data store is not to exceed 50 milliseconds on average). The list of data stores 4020A (e.g., data stores DS1 and DS2) of the client's storage group may also be provided, indicating for example the types of data stores included, the maximum sizes of the stores, etc. Similarly, configuration request 4050B may indicate a client's data store list 4020B (e.g., data stores DS3, DS4, DS5), a target TPS 4005B (e.g., 20000), and a target write latency 4010B (e.g., 200 milliseconds).

Based at least in part on the contents of the configuration requests, the configuration manager 4080 (which may be a component of the administrative/control plane of the distributed storage service) may generate candidate transaction management configurations for each of the requests 4050. Transaction management configuration 4060A, generated in response to configuration request 4050A, may include two LTMs 4025A and 4025B, four write appliers 4027A-4027D, and one MCDR 4029A in the depicted example. In some embodiments, the number of LTMs of a proposed transaction management configuration may correspond to a suggested or recommended partitioning of the client's storage group (e.g., one LTM may be set up for each logical partition). If the client approves of the proposed partitioning, either the client or the storage service may determine an appropriate partitioning plan in such embodiments. In other embodiments, the client may be required to partition their storage group, e.g., based at least in part on the client's targeted TPS, and provide the partitioning plan to the configuration manager as part of the configuration request.

In the depicted example of FIG. 40, the number of LTMs selected for a given configuration is proportional to the target TPS. Thus, for a target of 10000 TPS indicated in request 4050A, two LTMs are suggested in configuration 4060A; and for a target of 20000 TPS indicated in request 4050B, four LTMs (4025K-4025N) are recommended. The number of write appliers recommended is based on the target write latency, with more appliers being recommended for smaller target latencies. Thus, four write appliers are included in configuration 4060A for a target write latency of 50 milliseconds, while only two write appliers 4027K and 4027L are included in configuration 4060B for a write latency of 200 milliseconds indicated in request 4050B. The number of MCDRs may also be selected based on a variety of factors such as the target TPS, the target fraction of multi-partition transactions, and so on, in different embodiments. In the illustrated example, two MCDRs 4029K and 4029L are recommended for the parameters indicated in request 4050A.

The types of parameters included in the configuration requests 4050, and the relationship between the parameters and the recommended component counts of the transaction management configurations 4060, may differ from those illustrated in FIG. 40 in different embodiments. For example, in some embodiments, the clients may also have to indicate a target ratio of multi-partition transactions to single-partition transactions in their configuration requests, and such a ratio may be used by the configuration manager to determine the recommended number of MCDRs. In at least some embodiments, after the configuration manager provides a recommended configuration to a client, the client may have to approve the recommendation before the configuration manager deploys/instantiates the LTMs, WAs and/or MCDRs. In some embodiments, the number of MCDRs, LTMs and/or WAs set up for a storage group may be adjusted dynamically as the workload changes, e.g., without requiring a pause on the transaction processing.

Figure 41:
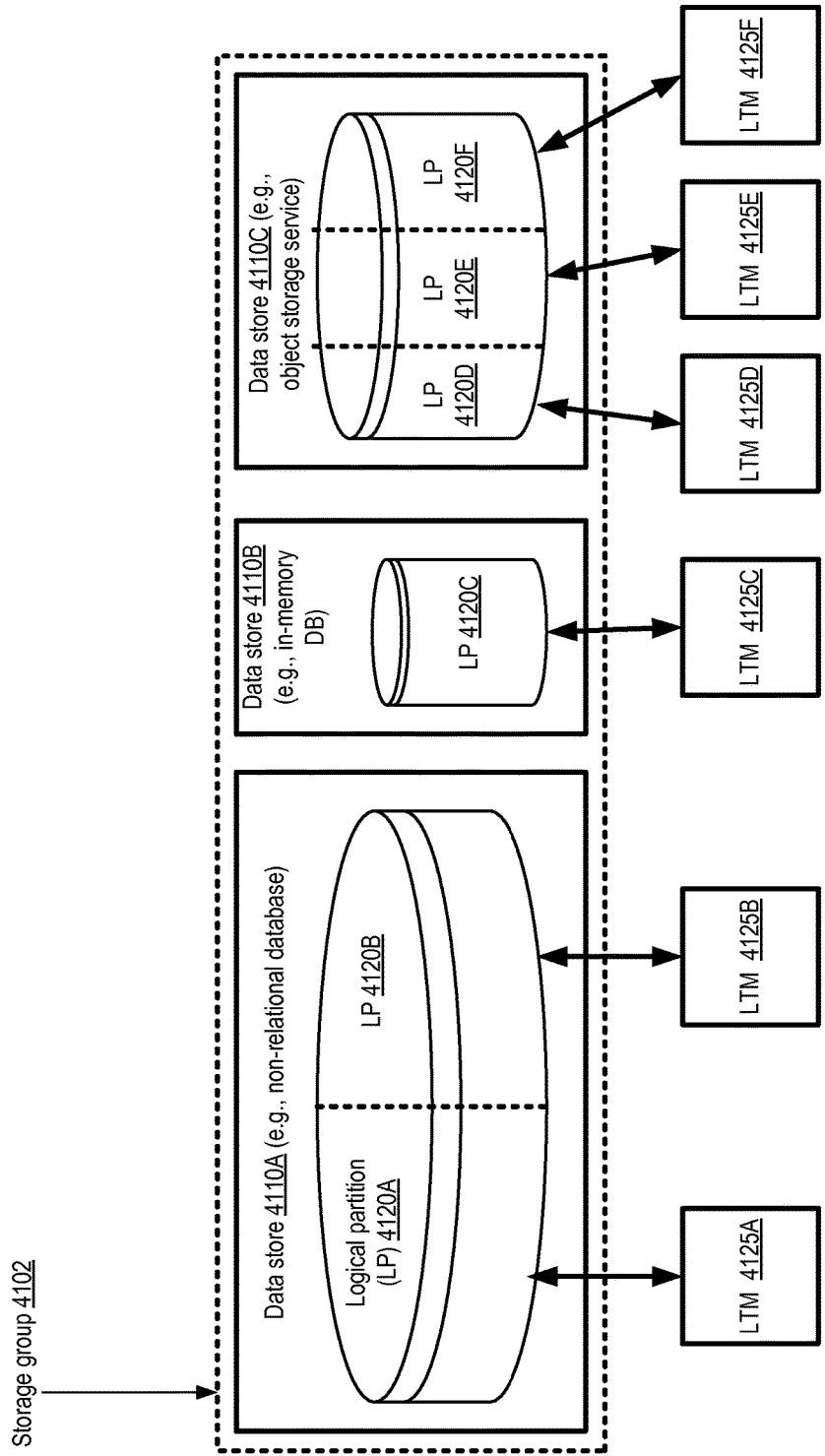
FIG. 41 illustrates an example configuration in which multiple log-based transaction managers may be established for a given data store, according to at least some embodiments.

In at least some implementations, a given data store may be divided into several logical partitions for log-based transaction management; that is, an LTM may be established to handle conflict detection and conditional commit decisions for a subset of a single data store. FIG. 41 illustrates an example configuration in which multiple log-based transaction managers may be established for a given data store, according to at least some embodiments. As shown, storage group 4102 may include data stores 4110A (which may, for example, comprise an instance of a non-relational database), 4110B (an instance of an in-memory database, for example) and 4110C (e.g., a set of objects of a storage service that presents a web services interface to unstructured objects) in the depicted scenario.

Storage group 4102 has been divided into six logical partitions (LPs) 4120A-4120F in the depicted embodiment. Data store 4110A comprises LPs 4120A and 4120B, data store 4110B comprises LP 4120C, and data store 4120C comprises LPs 4120D, 4120E and 4120F. Each logical partition 4120 has a corresponding LTM 4125 established, e.g., LP 4120A has LTM 4125A, LP 4120B has LTM 4125B, and so on. The number of logical partitions and/or LTMs instantiated for a given data store may not necessarily be proportional to the amount of data expected in the data store in at least some implementations, although expected data set size may be factor when determining the number of partitions. Other factors may also be used to determine partitioning in various embodiments, such as the expected rate of transactions (e.g., single-partition, multi-partition, or cross-data-store transactions) of various types, the native performance capabilities of the data stores and/or the servers used for the LTMs 4125 (e.g., how quickly writes can be applied to LTM logs), the availability or data durability goals for the data stores, client budget goals, pricing policy differences with respect to different data stores, and so on.

In at least some embodiments, several LTMs 4125 may have to collaborate in order to implement certain types of transactions. For example, consider a scenario in which LP 4120A comprises a table T1, and LP 4120B comprises another table T2. A commit request CR1 of a multi-partition transaction is directed to LTM 4125A by a client-side component. CR1 indicates a read descriptor for a read R1 directed to T1, and includes two writes based on results of R1: write W1 directed to T1, and write W2 directed to T2. In such a scenario, if LTM 4125A does not find any conflicts based on its local log and R1's read descriptor, both W1 and W2 may be designated as committable. However, W2 is directed to a different partition than the one comprising T1. In such a scenario, in at least some embodiments, a respective conditional commit record may be written in the logs of both LTM 4120A and LTM 4120B (e.g., as a result of a request sent from LTM 4120A to LTM 4120B). Similar collaborations may be implemented among LTMs established for different data stores of a storage group in some embodiments—e.g., if W2 were directed to LP 4120D, LTM 4120A may send a request to include a conditional commit for W2 to LTM 4120D.

Figure 42:
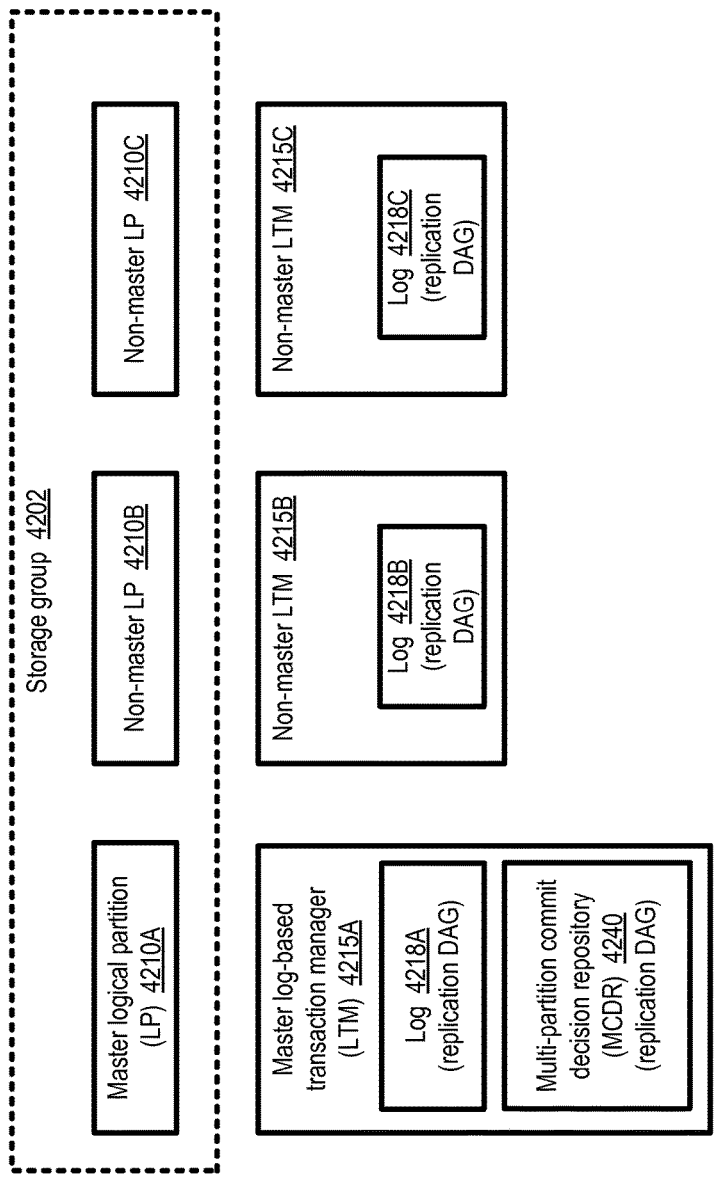
FIG. 42 illustrates an example configuration in which a multi-partition commit decision repository is co-located with a log of a log-based transaction manager established for a primary partition of a storage group, according to at least some embodiments.

As mentioned earlier, in some implementations, multi-partition commit decision repositories (MCDRs) may be implemented using persistent logs similar to those used by LTMs. Thus, in one such implementation, a given MCDR may be implemented using a replication DAG similar to that shown in FIG. 1, just as a log used by an LTM may be implemented using a replication DAG. FIG. 42 illustrates an example configuration in which a multi-partition commit decision repository is co-located with a log of a log-based transaction manager established for a master partition of a storage group, according to at least some embodiments. A storage group 4202 has been subdivided into a master logical partition 4210A and non-master logical partitions 4210B and 4210C in the depicted embodiment. The designation of one of the partitions as master or primary may be based, for example, on the relative importance (from the perspective of the client on whose behalf the storage group 4202 is established) of the data stored in the partition, the target performance, availability or data durability goals for a data store whose contents are included in the partition, and/or on other factors in different embodiments.

A respective LTM 4215 may be configured for each of the logical partitions 4210 in the depicted embodiment. The LTM 4215A that has been instantiated for the master LP 4210A may be designated a master LTM in the depicted embodiment, while the remaining LTMs such as 4215B and 4215C may be designated non-master LTMs. In at least one implementation, the master LTM 4215A may be implemented using one or more servers with greater compute, storage, memory and/or networking capacity than the servers deployed for the non-master LTMs, although such asymmetry in resource capacity may not be a requirement. The master LTM's log 4218A may be co-located (e.g., share the same server resources for computing, networking, storage and/or memory) with an MCDR 4240 used for the storage group 4202 in the depicted embodiment. The MCDR 4240 and/or the log 4218A may each be implemented as a respective plurality of replication DAG nodes in some embodiments with some of the nodes being co-located. For example, nodes N1, N2, N3 and N4 of replication DAG RD1 may be used for log 4218A, nodes Nk, Nl, Nm and Nn of a different replication DAG may be used for MCDR 4240, with N1 being co-located with Nk on a given server, N2 being co-located with Nl on a different server, and so on. The number of nodes of the replication DAG used for the MCDR 4240 need not be identical with the number of nodes of the replication DAG used for the master LTM's log 4218A in at least some embodiments. In one embodiment, the same replication DAG may be used for the records of log 4218A and MCDR 4240. It is noted that the designation of one of the LTMs as master may not necessarily be accompanied by the sharing of resources of that LTM with an MCDR in some embodiments. In another embodiment, more than one LTM log may be co-located with respective MCDRs of a storage group.

Figure 43:
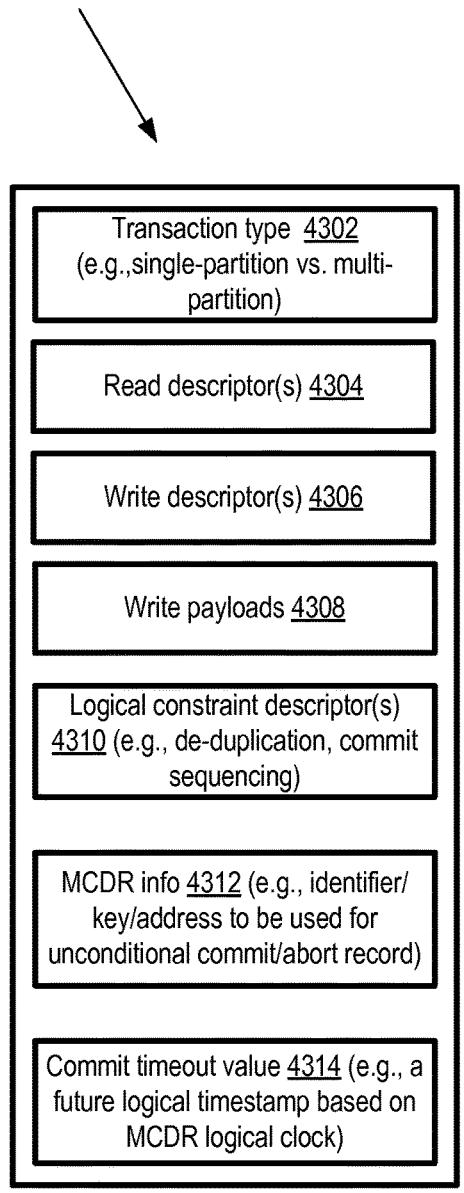
FIG. 43 illustrates example constituent elements of a commit request that may be generated at a storage group supporting multi-partition transactions, according to at least some embodiments.

FIG. 43 illustrates example constituent elements of a commit request that may be generated at a storage group supporting multi-partition transactions, according to at least some embodiments. As shown, commit request 4344 may comprise an indication of the transaction type 4302 (e.g., whether the write(s) for which a commit is being requested are part of a single-partition transaction or a multi-partition transaction). In some implementations, instead of the transaction type 4302, a commit type may be indicated in the commit request, e.g., with a "conditional" commit type being indicated for a multi-partition transaction's write(s), and an "unconditional" commit type being indicated for a single-partition transaction's write(s). The commit request may include one or more read descriptors 4304 indicative of the reads on which the writes represented by one or more write descriptors 4306 depend. In some embodiments, the read descriptors may include RRVM (read repeatability verification metadata) and/or one or more state transition indicators representing a committed state of the partition to which the reads were directed, analogous (at a partition level) to the RRVM and state transition indicators described earlier.

The write descriptors 4306 (which may be similar to the write set descriptors discussed earlier in the context of FIG. 17-25), may include, for example, an indication of the locations to which the writes of the commit request are directed. Write payload(s) 4308 may indicate the data or content to be written to the addresses indicated in the write descriptors. In some embodiments, logical constraints such as the de-duplication constraints and/or the commit sequencing constraints described earlier with reference to may be indicated via respective logical constraint descriptors 4310 (which may be similar to the logical constraint descriptors discussed with reference to FIG. 22-25). Logical constraints may be indicated at the partition level in some such embodiments, and at the storage group level in other embodiments. If logical constraints are indicated at the storage group level, the LTM that receives the commit request 4344 may in some embodiments have to collaborate with other LTMs to ensure that the constraints have been met prior to conditionally (or unconditionally) committing the requested writes.

In the embodiment depicted in FIG. 43, MCDR information 4312 may be included in a commit request for a multi-partition transaction. MCDR information may include, for example, an identifier, key or address that can be used to access the unconditional commit record (or abort record) expected to be created corresponding to the commit request. A unique identifier or key representing the multi-partition transaction may be used to look up the unconditional/commit record in a hash table or similar structure in some embodiments, for example. The MCDR information 4312 may be included in conditional commit records stored at the LTM logs, e.g., so that the write appliers are able to determine the location of the unconditional commit/abort records.

A commit timeout value 4314 may be indicated in the commit request 4344 in some embodiments. The commit timeout value may indicate the maximum amount of time that a write applier WA1, which has examined a conditional commit record CCR1 of a multi-partition transaction MT1, needs to wait for an unconditional commit record UCR corresponding to MT1 to be written to the MCDR, before abandoning propagation of the write(s) of CCR1. Thus, the commit timeout value may provide a way to resolve the problem of hung or failed client-side components, which may otherwise potentially lead to indeterminacy with respect to the fate (commit or abort) of multi-partition transactions in some implementations. In at least some embodiments, an MCDR may implement a logical clock that provides monotonically increasing logical timestamp values, and the timeout value may be expressed as a future logical timestamp value of such a clock. For example, in one scenario a client-side component preparing the commit request 4344 may read a current logical timestamp value LTS1 from an MCDR logical clock, and add some selected offset (e.g., 1000) to LTS1 to obtain a timeout value. The timeout value (LTS1+1000) may be stored in the conditional commit record generated by the LTM that receives the commit request 4344. In some embodiments, a write applier responsible for propagating the writes indicated in that commit request may periodically check to see whether an unconditional commit record (or an unconditional abort record) is present in the appropriate MCDR. The write applier may obtain the current logical timestamp from the MCDR's logical clock if it fails to find the unconditional commit/abort record. If the current timestamp exceeds the timeout value of LTS1+1000 in this example, the write applier may abandon propagation/application of the writes of the conditional commit record. It is noted that not all the components shown in FIG. 43 may be incorporated within commit requests in some embodiments, and other components not shown in FIG. 43 may be included in other embodiments. MCDR information 4312 and commit timeout value 4314 may be regarded as examples of multi-partition transaction metadata that may be included in a commit request record 4344.

Figure 44:
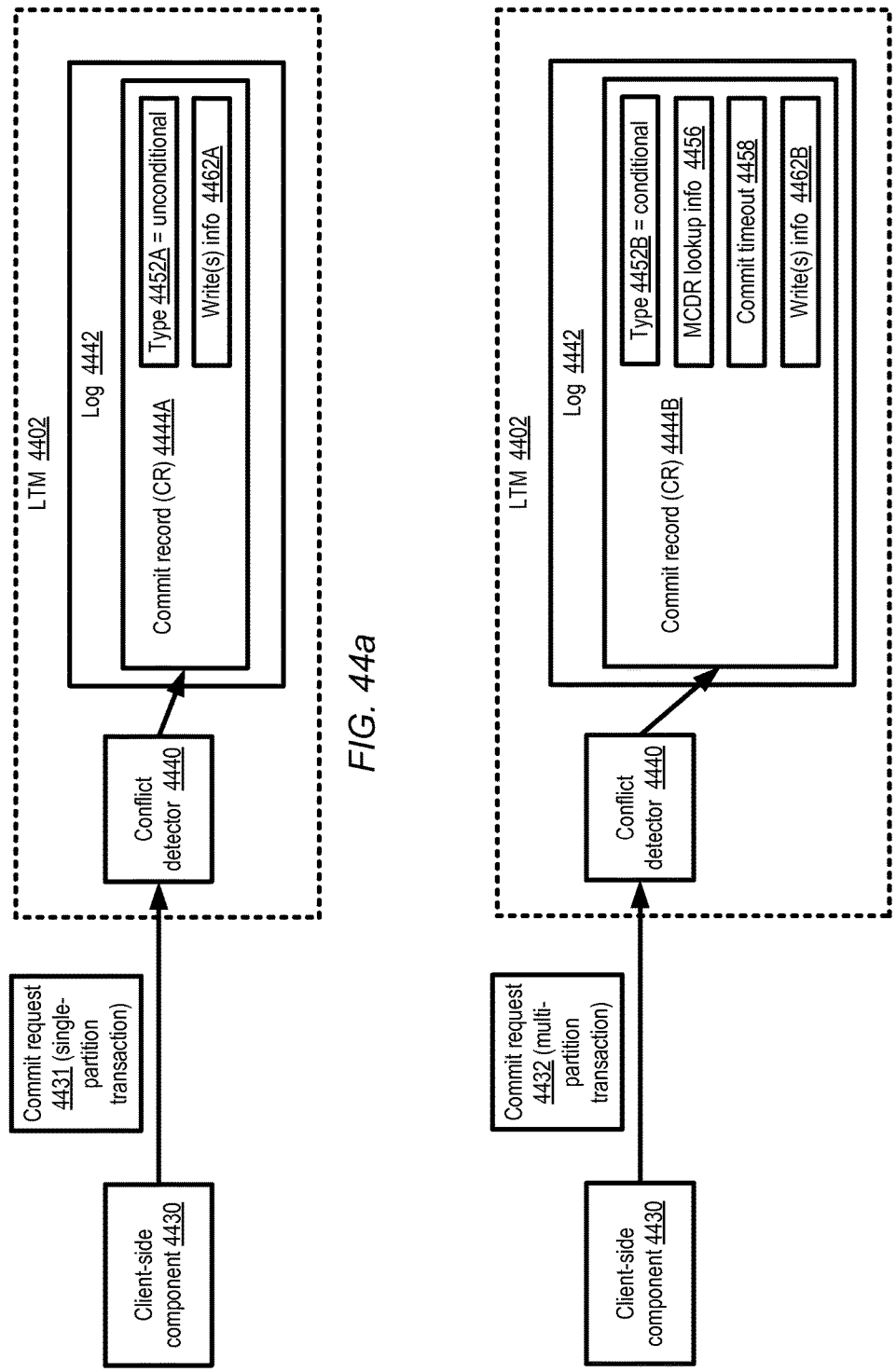
FIGS. 44a and 44b illustrate example constituent elements of commit records that may be stored for single-partition transactions and multi-partition transactions respectively by log-based transaction managers, according to at least some embodiments.

In some embodiments, single-partition transactions may represent a significant fraction (or even the majority) of the total workload handled at a storage group, and the writes of committed single-partition transactions may be propagated by write appliers to the partitions without consulting MCDRs. The reads on which the writes of a single-partition transaction depend, as well as the writes themselves, may be directed to no more than one partition, so only a single LTM may be required to perform conflict detection for such transactions. In some such embodiments, the kinds of information stored in the LTM logs may differ for single-partition transactions than the kinds of information stored for multi-partition transactions. FIGS. 44a and 44b illustrate example constituent elements of commit records that may be stored for single-partition transactions and multi-partition transactions respectively by log-based transaction managers, according to at least some embodiments. As shown in FIG. 44a, a commit request 4431 for a single-partition transaction may be submitted by a client-side component 4430 to the LTM 4402 designated for that partition. The conflict detector 4402 of LTM 4402 may use one or more read descriptors included in the commit request 4431, together with a selected set of previously-stored commit records in persistent log 4442, to determine whether the reads indicated in commit request 4431 conflict with subsequent committed writes. If no conflict is detected, a commit record 4444A corresponding to the commit request 4431 may be added to log 4442. Because the request 4431 was for a single-partition transaction, no additional coordination may be required (e.g., coordination similar to that performed by the client-side component in the case of multi-partition transactions) to designate the commit as unconditional. Accordingly, in at least some embodiments, the commit record 4444A may indicate, e.g., using a type field 4452A as shown, that the commit is unconditional. The commit record 4444A for the single-partition commit request may also include write(s) information 4462A, including for example an indication of one or more write payload(s) and the locations to which the writes are directed within the partition.

In response to a commit request 4432 for a write of a multi-partition transaction, as shown in FIG. 44b, the conflict detector 4440 may perform the same kind of local conflict detection (e.g., based on the read descriptor(s) of the request 4432 and a selected set of earlier-stored commit records in log 4442) as was performed for a single-partition transaction's commit request. However, in the event that no conflict is detected locally, the new commit record 4444B that is stored in the log 4442 may differ in several respects from commit record 4444A in the depicted embodiment. The type of the commit, indicated in field 4452B, for example, may be set to conditional instead of being set to unconditional. In addition to the commit type field and the write information 4462B, in some embodiments MCDR lookup information 4456 may be included in the commit request. The MCDR lookup information (which may be based at least in part on contents of the commit request 4432) may allow a write applier to determine where an unconditional commit/abort record corresponding to conditional commit record 4444B is expected to be located. Depending on the implementation, different types of entries may be included in MCDR lookup information 4456—for example, the address or identifier of an unconditional commit record may be provided in one implementation, or a key that can be used to look up the address may be provided, or a function that can be invoked to obtain the address may be provide. In at least some embodiments, a commit timeout 4458 may be included in a conditional commit record 4444B, indicating for example the latest time by which the unconditional commit/abort record should be available within the MCDR, such that if no such unconditional commit/abort record is found after the timeout has expired, the write(s) of the conditional commit record 4444B may not have to be propagated to their target partition. As mentioned earlier, in at least some embodiments such a timeout value 4458 may be expressed in terms of a logical timestamp value expected to be obtained from a logical clock of an MCDR. MCDR lookup information and commit timeout 4458 may be regarded as examples of multi-partition transaction metadata that is stored in the conditional commit record 4444B, e.g., for consumption by a write applier.

In some embodiments, the contents of the commit records for single-partition or multi-partition commit records may differ from those illustrated in FIGS. 44a and 44b. For example, in one embodiment, instead of commit type fields, the commit records may include transaction type fields (e.g., single-partition or multi-partition), and write appliers may determine whether an examination of MCDR contents is required for a given commit record based on the transaction type field contents. In some implementations, the MCDR lookup information 4456 may not be required—e.g., a protocol that allows write appliers to use the contents of write descriptors to determine where the unconditional record for a conditional commit can be found may be used. In one embodiment, timeout values may not be indicated in the commit records—instead, for example, a write applier may set its own timeout when it first reads a commit record, and decide to abandon write propagation when that timeout expires.

Figure 45:
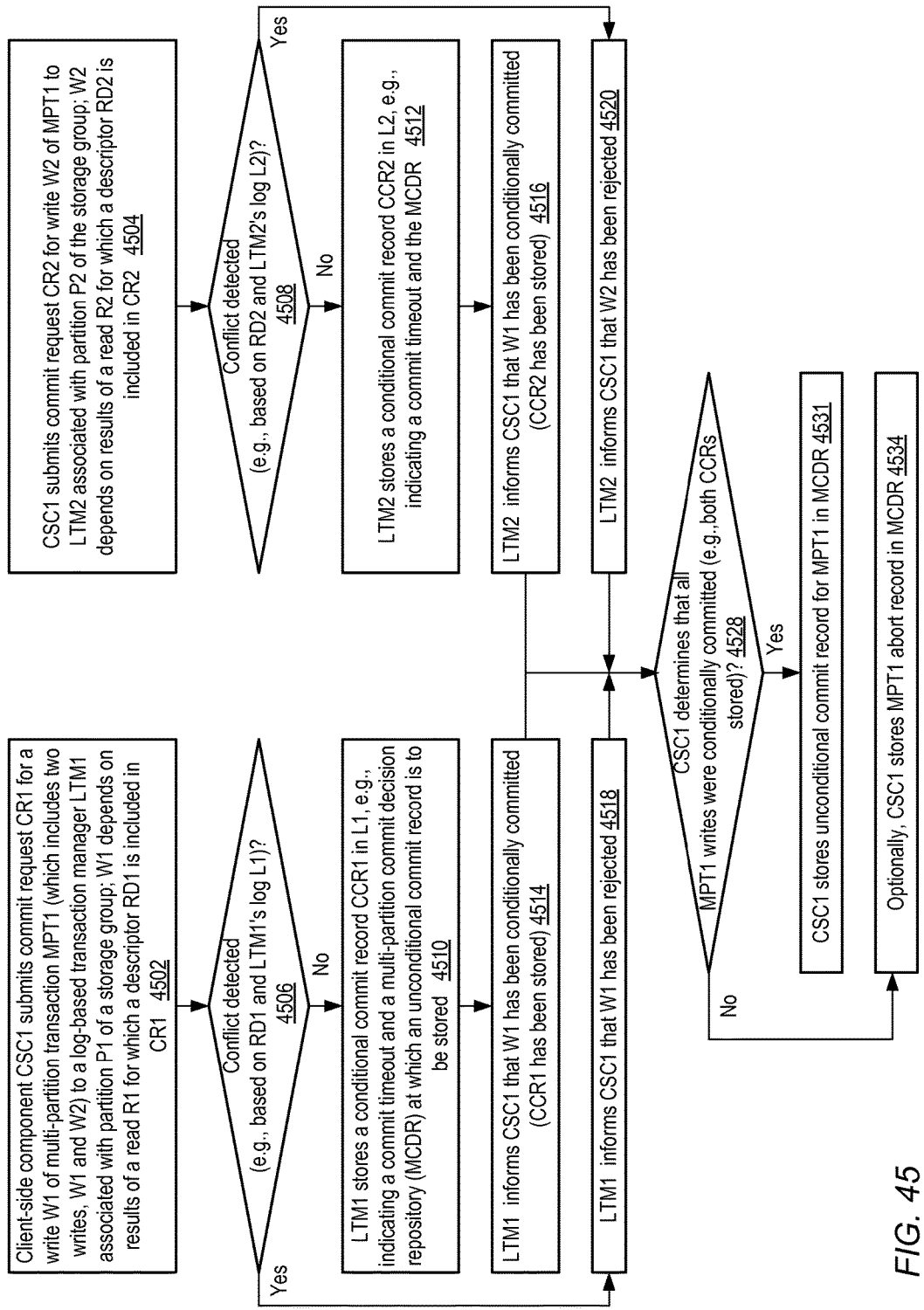
FIG. 45 is a flow diagram illustrating aspects of operations that may be performed by client-side components and log-based transaction managers for respective partitions of a storage group at which multi-partition transactions are supported, according to at least some embodiments.

FIG. 45 is a flow diagram illustrating aspects of operations that may be performed by client-side components and log-based transaction managers for respective partitions of a storage group at which multi-partition transactions are supported, according to at least some embodiments. As shown in element 4502, a client-side component CSC1 of a storage group may submit a commit request CR1 for a write W1 of a multi-partition transaction MPT1 to a first log-based transaction manager LTM1 associated with a partition P1 of the storage group. The transaction may be designated as multi-partition by CSC1 if the transaction depends on reads directed to more than one partition of the storage group, for example, and thus the commit decision for the transaction as a whole may require individual commit decisions to be made (e.g., respective R-W conflict detection to be performed) by more than one LTM. In the simplified scenario illustrated in FIG. 45, MPT1 may comprise two writes, W1 and W2. Write W1 may depend on the result of read R1 (directed to partition P1) for which a read descriptor RD1 is included in CR1 in the depicted embodiment. LTM1 may perform conflict detection, e.g., using its persistent log L1 and RD1, to determine whether W1 is committable with respect to the kinds of read-write conflicts that are locally detectable by LTM1. If no conflicts are found (as determined in element 4506), a new conditional commit record CCR1 may be stored in L1, indicating that W1 has been designated as conditionally or locally committable by LTM1 (element 4510). In some embodiments, CCR1 may also include a commit timeout value and/or an indication of an MCDR at which an unconditional commit record is expected to be written if/when MPT1 is found to be unconditionally committable. LTM1 may inform CSC1, e.g., in a response to CR1, that W1 has been found conditionally committable and that CCR1 has been written to L1. If W1 is not locally committable, e.g., if one or more conflicts were detected by LTM1 in operations corresponding to element 4506, CCR1 would not be stored in L1, and CSC1 may be informed that W1 has been rejected (element 4518) in the depicted embodiment.

CSC1 may also submit a commit request CR2, corresponding to a different write W2, to the log-based transaction manager LTM2 responsible for conflict detection for a different partition P2 (element 4504) in the depicted embodiment. CR2 may also include its own set of read descriptors indicative of the read(s) on which W2 depends. LTM2 may perform its own conflict detection with respect to W2, using LTM2's log L2 and the read descriptors of CR2, to determine whether W2 is committable. If no conflicts are found that would prevent an acceptance of W2 by LTM2 (element 4508), a conditional commit record CCR2 for W2 may be stored in LTM2's log L2 (element 4512). In the depicted embodiment, CCR2 may also include a commit timeout value (e.g., the same value that was stored in CCR1, or a different value determined by LTM2) and an indication of the MCDR location at which an unconditional commit record for W2 is to be expected. CSC1 may be informed, e.g., in a response generated by LTM2 to CR2, that W2 has been designated as conditionally or locally committable and that CCR2 has been written to L2 (element 4516). If W2 is not locally committable, e.g., if one or more conflicts were detected by LTM2 in operations corresponding to element 4508, CCR2 would not be stored in L2, and CSC1 may be informed that W2 has been rejected (element 4520).

In the depicted embodiment, if CSC1 determines that both W1 and W2 were conditionally committed (element 4528), e.g., based on a determination that both LTM1 and LTM2 have written respective conditional commit records CCR1 and CCR2 to their respective logs, CSC1 may generate and store an unconditional commit record for MPT1 in an MCDR (element 4531). If one or both of W1 and W2 were rejected as un-committable (as also detected in element 4528), e.g., if CSC1 determines that at least one of the conditional commit records CCR1 or CCR2 was not written, CSC1 may not store an unconditional commit record for MPT1 in the MCDR. In some embodiments, an abort record may optionally be stored in the MCDR instead (element 4534), e.g., in the same location at which the unconditional commit record would have been written has both writes been designated as committable. It is noted that in general, although only two writes have been discussed with respect to MPT1, a multi-partition transaction may comprise any desired number of writes, and the CSC may ensure that all the writes have been designated as locally committable by their respective LTMs before storing an unconditional commit record in at least some embodiments. In some scenarios, several different writes (e.g., Wx, Wy and Wz) of a given multi-partition transaction may be directed to a single partition (e.g., LP1). In some implementations, several such writes to a given partition may be included in a single commit request—e.g., one commit request indicating Wx, Wy and Wz may be sent by CSC1 to LTM1. In other implementations, each write request may be handled using a separate commit request. In some embodiments, instead of waiting to be informed as to whether a requested write was conditional committed or not, the CSC may play a more active role to determine a write's status—e.g., the CSC may read an LTM log directly (e.g., using a log read interface similar to interface 1513 shown in FIG. 15), or may query an LTM to determine the result of a commit request.

In at least one embodiment, a client-side component may treat single-partition transactions as a special case of a multi-partition transactions—e.g., upon determining that a write of a single-partition transaction has been accepted for commit by an LTM, an unconditional commit record for the single-partition transaction may also be stored in a commit decision repository (CDR) that is used for both single-partition and multi-partition transactions. The CDR may be examined by a write applier for single-partition transactions as well as for multi-partition transactions in such an embodiment. In other embodiments, commit decision repositories may be used only for multi-partition transactions.

Figure 46:
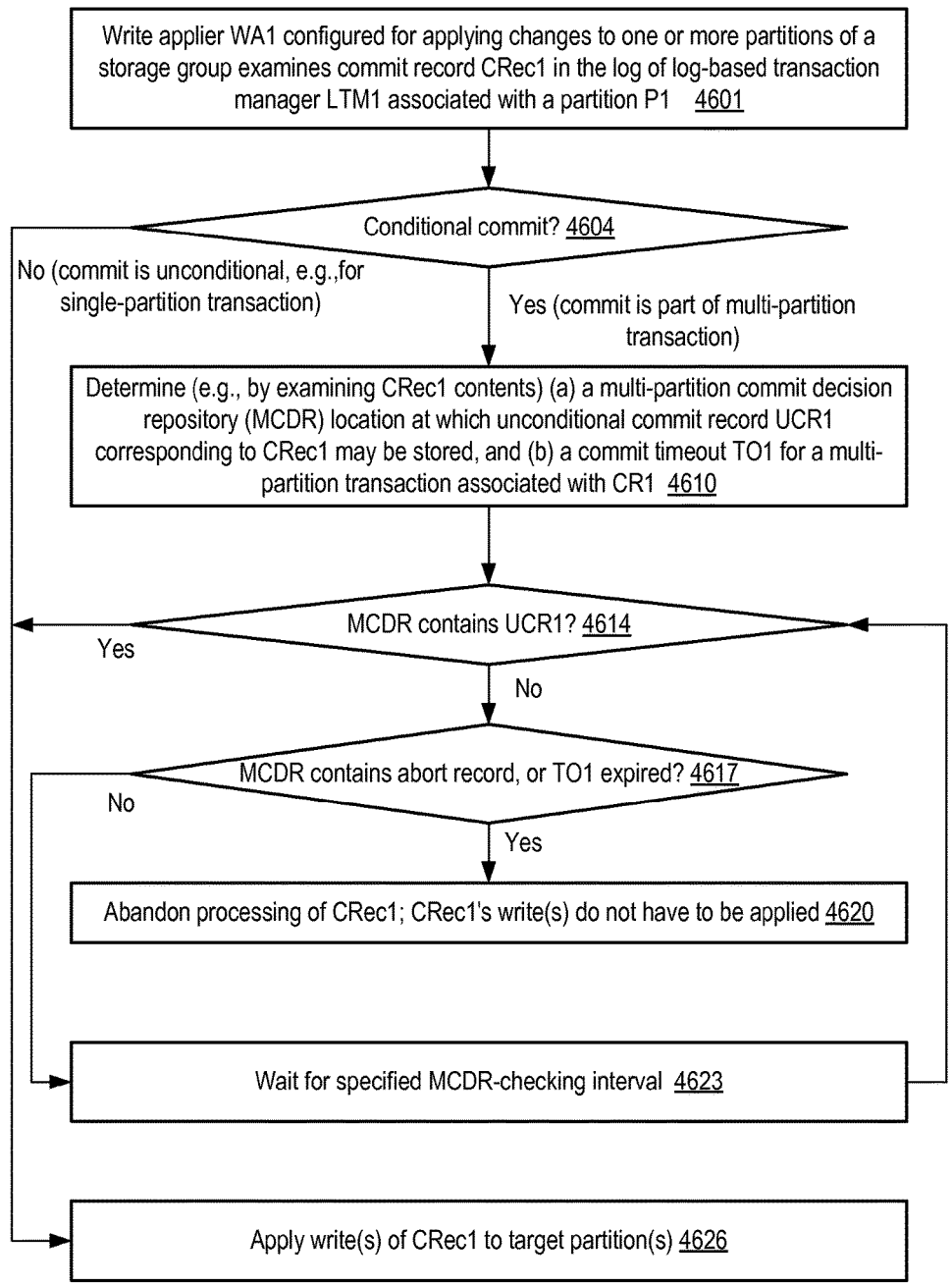
FIG. 46 is a flow diagram illustrating aspects of operations that may be performed by a write applier of a storage group at which multi-partition transactions are supported, according to at least some embodiments.

FIG. 46 is a flow diagram illustrating aspects of operations that may be performed by a write applier of a storage group at which multi-partition transactions are supported, according to at least some embodiments. As shown in element 4601, a write applier WA1 configured to apply changes to one or more partitions of a storage group may examine a commit record CRec1 stored in a persistent log of a log-based transaction manager LTM1 associated with a partition P1 of the storage group. If CRec1 indicates that the corresponding commit is conditional (as detected in element 4604), WA1 may deduce that the write(s) indicated in CRec1 are part of a multi-partition transaction and that an unconditional commit record must be found before the writes are propagated to their target destinations. Accordingly, as indicated in element 4610, WA1 may determine (a) a location within an MCDR at which an unconditional commit record UCR1 corresponding to CRec1 is expected to be stored and (b) a commit timeout value TO1 indicating the latest time by which UCR1 should appear in order for the multi-partition transaction not to be abandoned.

WA1 may check whether UCR1 has already been stored in the MCDR (element 4614). If UCR1 has already been stored, WA1 may propagate or apply the write(s) indicated in CRec1 to their destinations in the depicted embodiment (element 4626). If UCR1 is not present in the MCDR (as also detected in element 4614), WA1 may check whether (a) the timeout indicated by TO1 has expired or (b) an abort record corresponding to CRec1 has been stored in the MCDR (element 4617). In implementations in which the timeout is expressed in logical timestamp units of the MCDR's logical clock, for example, WA1 may submit a query to the MCDR for the current logical timestamp to determine whether the timeout has expired. If WA1 determines that the timeout has expired or that the multi-partition transaction corresponding to CRec1 has been explicitly aborted, write propagation and/or further processing for CRec1 may be abandoned by WA1, i.e., the writes of CRec1 need not be applied to their destination locations (element 4620). If the timeout has not expired and no abort record has been found (as also detected in element 4617), WA1 may wait for a specified or tunable MCDR-checking interval (element 4623) before re-checking the MCDR to see whether an unconditional commit record corresponding to CRec1 has been written yet (element 4614). The MCDR may be checked at intervals in the depicted embodiment in accordance with elements 4614 onwards until one of three events occur: either (a) an unconditional commit record UCR1 corresponding to CRec1 is found, (b) an abort record corresponding to CRec1 is found or (c) the timeout expires.

If (a) occurs, the writes of CRec1 may be propagated (element 4626); otherwise the writes may eventually be abandoned. In some implementations, if the propagation of the writes is abandoned, the commit record CRec1 may be modified or removed from LTM1's log to indicate the abandonment (e.g., by WA1 or by LTM1 in response to a request from WA1).

In the embodiment depicted in FIG. 46, if CRec1 indicated that its commit was unconditional (e.g., if the write(s) indicated in CRec1 were part of a single-partition transaction instead of a multi-partition transaction), as also detected in element 4604, the writes may be propagated to their intended destinations by WA1 (element 4626) without any examination of the MCDR. In other embodiments, as mentioned above, both single-partition and multi-partition transactions may be handled in a uniform manner, in that unconditional commit records may be stored in a commit decision repository for both types of transactions, and write appliers may have to verify that such an unconditional commit record has been written before propagating a write for either type of transaction.

It is noted that in various embodiments, operations other than those illustrated in the flow diagram of FIGS. 6, 7, 8, 9, 10, 12, 13, 14, 19, 20, 25, 30, 37, 38, 45 and 46 may be used to implement at least some of the techniques described above. Some of the operations shown in the flow chart may not be implemented in some embodiments, may be implemented in a different order, or may be performed in parallel rather than sequentially.

Use Cases

The techniques described above, of managing application state changes using replication DAGs, including log-based transaction management using read descriptors and client-side transaction preparation, may be useful in a variety of embodiments. As more and more organizations migrate their computing to provider network environments, a larger variety of distributed storage applications with respective consistency semantics and respective interfaces has been developed. Some large applications may span multiple data store instances, and the replication DAGs and log-based transaction management techniques may represent a unified, flexible, scalable, and highly-available approach to distributed storage application management. The ability of the replication DAG nodes to make progress on application state transitions even though the respective views of the DAG configuration may at least temporarily diverge may reduce or eliminate at least some of the "stop-the-world" pauses in handling application requests that may arise if less dynamic replication techniques are used. Log-based transaction management may not only allow cross-data-store transactions (as well as multi-item transactions for data stores that may not support atomic multi-write transactions), but may also facilitate features such as automated query response generation, snapshot generation, and the like. Entirely new ways of performing data analysis across multiple data stores may be enabled using the logging service's own read interfaces. Pricing policies that clarify the costs of such new types of cross-data-store operations may be implemented, enabling users to make informed budgeting decisions for their data transformation requirements. Optimistic log-based transaction management may be scaled up for very high throughput applications using the approach described above, in which log-based transaction managers are set up for respective partitions of a given storage group, and the commit of any given multi-partition transaction is coordinated by a client-side component that interacts with a plurality of such transaction managers.

In some provider network environments, log-based transaction management via replication DAGs may be used to store control-plane configuration information of another network-accessible service implemented at the provider network, such as a virtualized computing service, a storage service, or a database service. In such scenarios, the transactions managed using the log may represent changes to the configurations of various resources of the network-accessible service (such as compute instances or virtualization hosts in the case of a virtual computing service).

Illustrative Computer System

Figure 47:
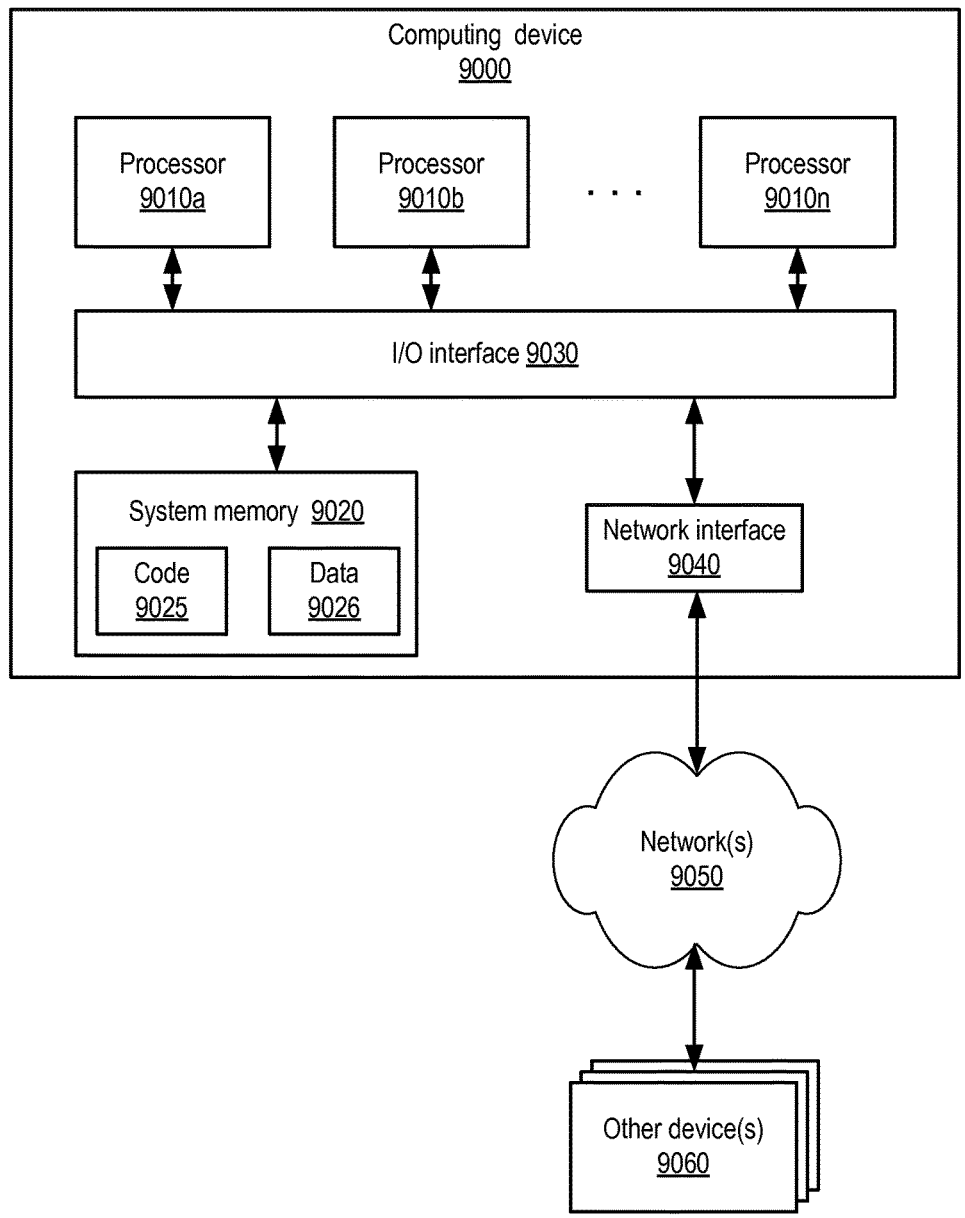
FIG. 47 is a block diagram illustrating an example computing device that may be used in at least some embodiments.

In at least some embodiments, a server that implements a portion or all of one or more of the technologies described herein, including the techniques to implement the various components of a replication DAG, a logging service for transaction management, or a heterogeneous storage system (including client-side components such as front-end request handlers as well as multi-partition commit decision repositories) may include a general-purpose computer system that includes or is configured to access one or more computer-accessible media. FIG. 47 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 46, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 46 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 47 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
receive configuration data from a client to configure a log-coordinated storage group of a provider network, the configuration data indicating:
a plurality of data stores including a first data store and a second data store to be included as members of the log-coordinated storage group, wherein the first data store responds to read requests formatted in accordance with a first read interface, wherein the second data store responds to read requests received in accordance with a different read interface, and a transaction manager of the log-coordinated storage group that determines whether to accept write requests directed to one or more data stores of the plurality of data stores based at least in part on contents of a write record log; and
a cross-data-store operation for the log-coordinated storage group, wherein the cross-data-store operation comprises propagating a write of the first data store to the second data store; and
configure the log-coordinated storage group according to the configuration data, wherein the configuration comprises determining a write transformer for the log-coordinated storage group used to transform a first representation of data stored in the first data store to a representation of data stored in the second data store.

2. The system as recited in claim 1, wherein the one or more computing devices is configured to register the write transformer as a listener to be notified when the write is applied to the first data store.

3. The system as recited in claim 1, wherein the one or more computing devices is configured to receive code to extend functionality of the write transformer.

4. The system as recited in claim 1, wherein the one or more computing devices is configured to trigger the write transformer based on one or more time-based triggering conditions.

5. The system as recited in claim 1, wherein the first and second data stores comprise one of: a non-relational database system, a relational database system, a storage service that implements a web services interface to allow access to unstructured data objects, an in-memory database, or an instance of distributed cache.

6. A method, comprising:
performing, by one or more computing devices:
receiving configuration data from a client to configure a log-coordinated storage group of a provider network, the configuration data indicating:
a plurality of data stores including a first data store and a second data store to be included as members of the log-coordinated storage group, wherein the first data store responds to read requests formatted in accordance with a first read interface, wherein the second data store responds to read requests received in accordance with a different read interface, and a transaction manager of the log-coordinated storage group that determines whether to accept write requests directed to the plurality of data stores based at least in part on contents of a write record log; and
a cross-data-store operation for the log-coordinated storage group, wherein the cross-data-store operation comprises propagating a write of the first data store to the second data store; and
configuring the log-coordinated storage group according to the configuration data, wherein the configuring comprises determining a write transformer for the log-coordinated storage group used to transform a first representation of data stored in the first data store to a representation of data stored in the second data store.

7. The method as recited in claim 6, wherein configuring the log-coordinated storage group comprises registering the write transformer as a listener to be notified when the write is applied to the first data store.

8. The method as recited in claim 6, further comprising extending functionality of the write transformer based on code received from the client.

9. The method as recited in claim 6, wherein configuring the log-coordinated storage group comprises configuring the write transformer to be triggered based on one or more time-based triggering conditions.

10. The method as recited in claim 6, wherein configuring the log-coordinated storage group comprises configuring the write transformer to be performed as part of a lifecycle workflow operation to transition data from the first data store to the second data store based on elapsed time.

11. The method as recited in claim 6, further comprising
collecting metrics data associated with client operations directed to members of the log-coordinated storage group during a time period, wherein the metrics data classify the client operations into a plurality of categories including a cross-data-store category and a single-data-store category; and
determining a usage metric for the client based at least in part on the metrics data.

12. The method as recited in claim 11, wherein the metrics data includes of a number of client operations performed during the time period for each category, and the usage metric is based at least in part on the number of client operations for each category.

13. The method as recited in claim 11, wherein the metrics data includes of an amount of network traffic generated for client operations, and the usage metric indicates a network bandwidth usage for the client.

14. The method as recited in claim 6, wherein configuring the log-coordinated storage group is based least in part on one or more of a latency requirement, a data durability requirement, or a data availability requirement specified in the configuration data.

15. The method as recited in claim 6, wherein configuring the log-coordinated storage group is based least in part on one or more of an expected request rate for the cross-data-store operation.

16. The method as recited in claim 6, wherein configuring the log-coordinated storage group is based least in part on a mode of resource allocation specified in the configuration data.

17. A non-transitory computer-accessible storage medium storing program instructions that when executed on one or more processors:
receive configuration data from a client to configure a log-coordinated storage group of a provider network, the configuration data indicating:
a plurality of data stores including a first data store and a second data store to be included as members of the log-coordinated storage group, wherein the first data store responds to read requests formatted in accordance with a first read interface, wherein the second data store responds to read requests received in accordance with a different read interface, and a transaction manager of the log-coordinated storage group that determines whether to accept write requests directed to the plurality of data stores based at least in part on contents of a write record log; and
a cross-data-store operation for the log-coordinated storage group, wherein the cross-data-store operation comprises propagating a write of the first data store to the second data store; and
configure the log-coordinated storage group according to the configuration data, wherein the configuring comprises determining a write transformer for the log-coordinated storage group used to transform a first representation of data stored in the first data store to a representation of data stored in the second data store.

18. The non-transitory computer-accessible storage medium storing program instructions as recited in claim 17, wherein to configure the log-coordinated storage group, the program instructions when executed cause the one or more processors to register the write transformer as a listener to be notified when the write is applied to the first data store.

19. The non-transitory computer-accessible storage medium storing program instructions as recited in claim 17, wherein to configure the log-coordinated storage group, the program instructions when executed cause the one or more processors to configure the write transformer to be triggered based on one or more time-based triggering conditions.

20. The non-transitory computer-accessible storage medium storing program instructions as recited in claim 17, wherein the program instructions when executed cause the one or more processors to:
collect metrics data associated with client operations directed to members of the log-coordinated storage group, wherein the metrics data classify the client operations into a plurality of categories including a cross-data-store category and a single-data-store category; and determine a usage metric for the client based at least in part on the metrics data.

21. The non-transitory computer-accessible storage medium storing program instructions as recited in claim 17, wherein the program instructions when executed cause the one or more processors to configure the log-coordinated storage group based least in part an expected request rate specified in the configuration data.

* * * * *